United States Patent [19]
Tominaga et al.

[11] Patent Number: 5,295,169
[45] Date of Patent: Mar. 15, 1994

[54] REACTOR CONTAINMENT FACILITIES

[75] Inventors: Kenji Tominaga; Tetsuo Horiuchi; Tsuyoshi Niino; Shouichiro Kinoshita; Shozo Yamanari; Masanori Naitoh; Tohru Fukui, all of Hitachi; Michio Murase, Mito; Yoshiyuki Kataoka, Ibaraki; Masataka Hidaka, Katsuta; Isao Sumida, Ibaraki, all of Japan

[73] Assignee: Hitachi, Ltd., Tokyo, Japan

[21] Appl. No.: 775,850

[22] Filed: Oct. 15, 1991

[30] Foreign Application Priority Data

| Oct. 15, 1990 [JP] | Japan | 2-273351 |
| Oct. 19, 1990 [JP] | Japan | 2-279042 |
| Nov. 30, 1990 [JP] | Japan | 2-333599 |
| Mar. 20, 1991 [JP] | Japan | 3-56300 |

[51] Int. Cl.$^5$ .............................................. G21C 9/00
[52] U.S. Cl. ........................... 376/293; 376/283; 376/299
[58] Field of Search ............... 376/283, 293, 282, 299

[56] References Cited

U.S. PATENT DOCUMENTS

| 4,050,983 | 9/1977 | Kleimola | 376/282 |
| 4,753,771 | 6/1988 | Conway et al. | 376/283 |
| 5,011,652 | 4/1991 | Tominaga et al. | 376/283 |
| 5,021,212 | 6/1991 | Kataoka et al. | 376/283 |
| 5,096,659 | 3/1992 | Hidaka et al. | 376/283 |
| 5,106,571 | 4/1992 | Wade et al. | 376/283 |
| 5,120,490 | 6/1992 | Koshieshi et al. | 376/282 |

FOREIGN PATENT DOCUMENTS

| 63-75594 | 4/1988 | Japan |
| 63-191096 | 8/1988 | Japan |
| 63-229390 | 9/1988 | Japan |
| 64-91089 | 4/1989 | Japan |
| 2-176496 | 7/1990 | Japan |
| 2-181696 | 7/1990 | Japan |
| 2-297097 | 12/1990 | Japan |

OTHER PUBLICATIONS

"Simplicity: the key improved safety, performance and economics", Nuc. Eng., Nov. 1989.

*Primary Examiner*—Donald P. Walsh
*Assistant Examiner*—Frederick H. Voss
*Attorney, Agent, or Firm*—Antonelli, Terry, Stout & Kraus

[57] ABSTRACT

A reactor containment facility having a reactor pressure vessel containing a core; a dry well in which the reactor pressure vessel is arranged; a suppression chamber holding suppression-pool water and forming above the suppression-pool water a wet well; and a plurality of vent pipes allowing the dry well to communicate with the suppression-pool water; a steel wall which is in contact with the suppression-pool water of the suppression chamber and which surrounds at least the pool water so as to form a containment vessel which houses the dry well and the suppression chamber; and an outer peripheral pool containing cooling water in contact with the outer peripheral surface of the steel wall. The facility further includes: a dividing structure for dividing the wet well of the suppression chamber into a first space which is in contact with the water surface of the suppression-pool water and a second space which is not in contact therewith; a first passage which allows the first space to communicate with the second space and which has an area smaller than that of the dividing device; and a cooling device for keeping the second space at a temperature lower than that of the first space.

36 Claims, 29 Drawing Sheets

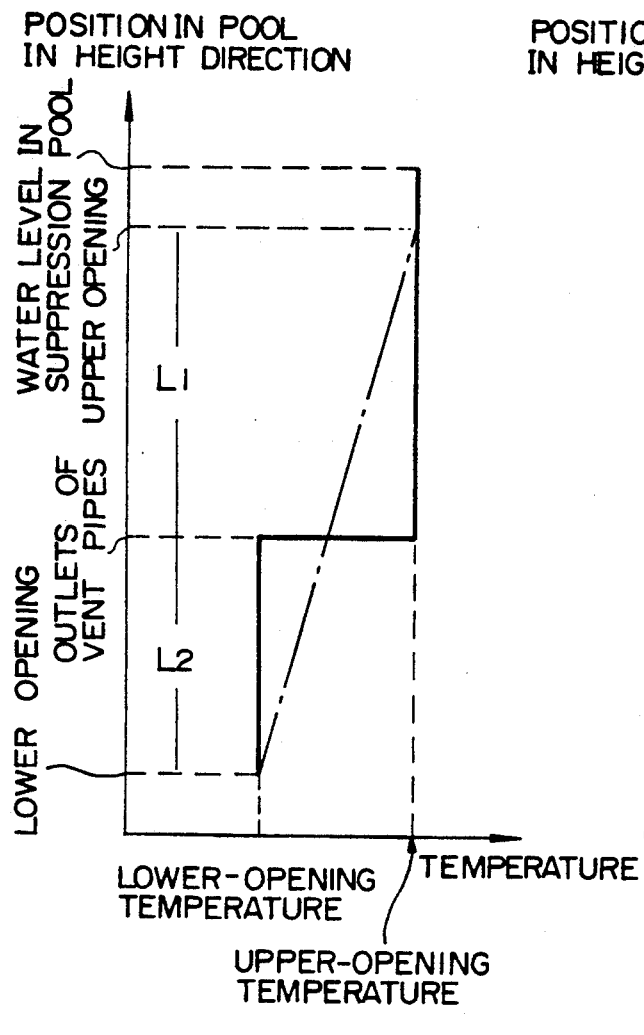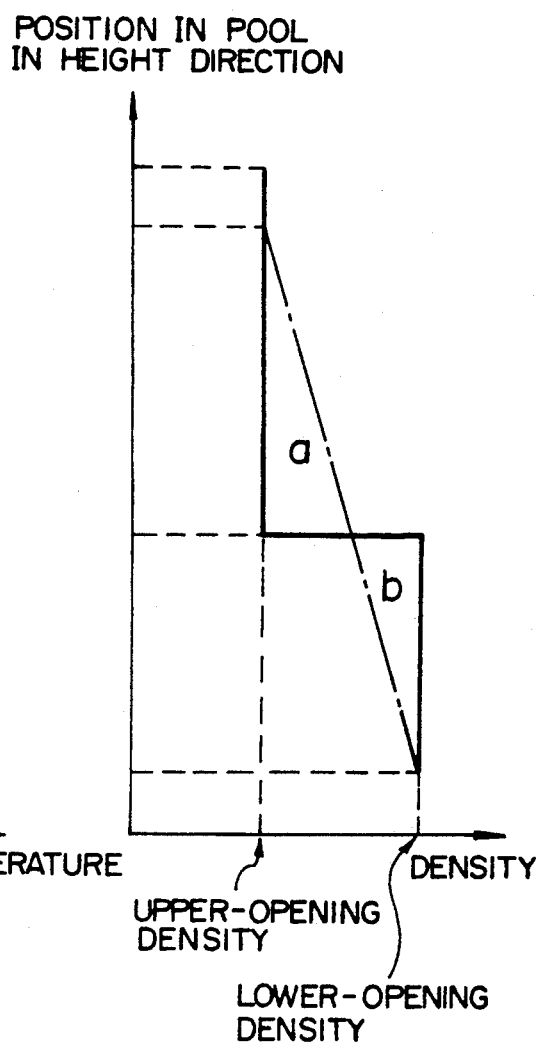
FIG. 8A
FIG. 8B

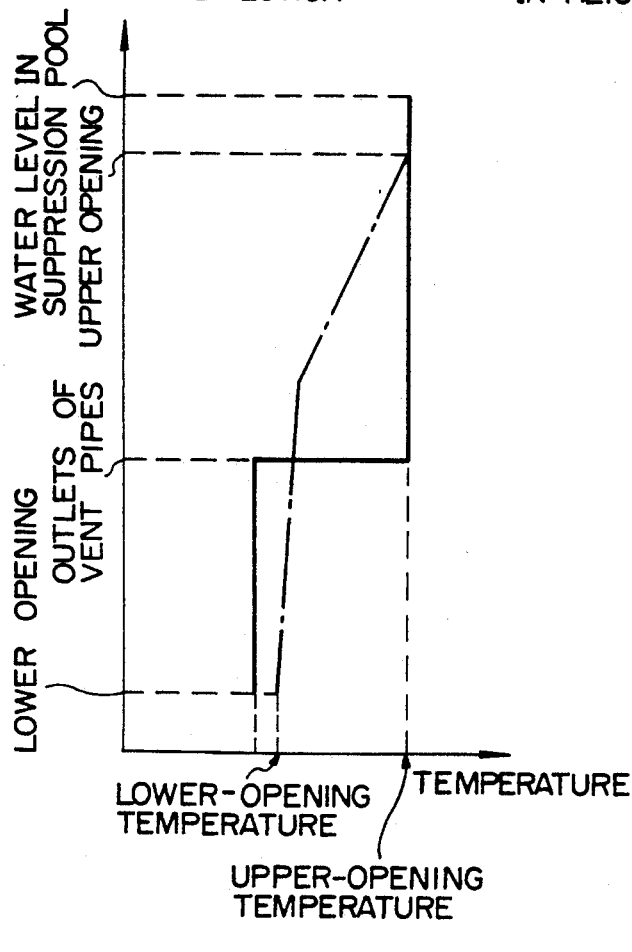
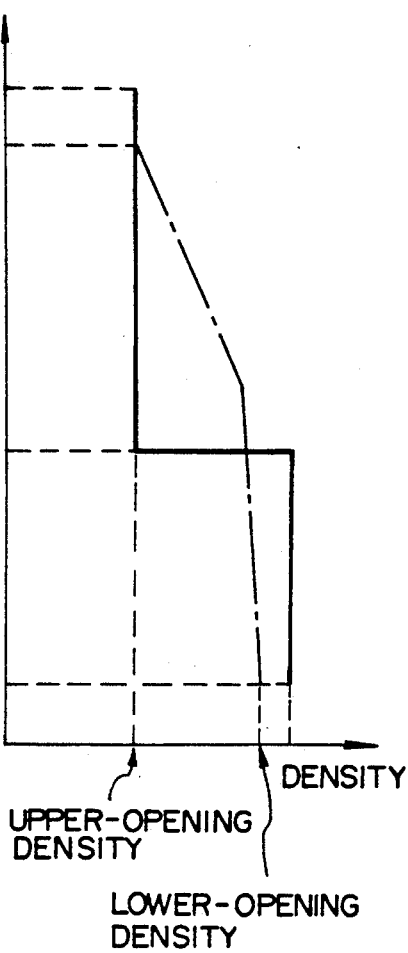
FIG. 14A
FIG. 14B

REACTOR CONTAINMENT FACILITIES

BACKGROUND OF THE INVENTION

This invention relates to reactor containment facilities and, in particular, to reactor containment facilities improved in terms of the heat dissipation characteristic of a reactor containment vessel.

As disclosed in JP.A.63-75594 and JP.A.63-191096, a reactor containment vessel includes a dry well, which defines a space where a reactor pressure vessel containing a core is arranged, and a suppression chamber. The suppression chamber holds suppression-pool water and defines a wet well in the space above it, with the dry well communicating with the suppression-pool water through vent pipes. The outer periphery of this suppression chamber is surrounded by a steel wall, which constitutes the containment vessel, with the steel wall being surrounded by an outer peripheral pool containing a cooling water that is in contact therewith.

In this reactor containment vessel, the coolant in the reactor pressure vessel, turned into steam that is at high temperature and pressure by being heated by the core, is conveyed from the reactor pressure vessel to the exterior of the reactor containment vessel through pipes. Any rupture in the pipes will cause some of the coolant in the reactor pressure vessel to leak into the dry well as steam at high temperature and pressure to occupy the same (a loss-of-coolant accident); then, the coolant steam will be discharged therefrom, along with the nitrogen with which the dry well has been filled, through the vent pipes into the suppression-pool water, where the steam condenses, with the nitrogen being accumulated in the wet well as noncondensing gas. The transfer of the noncondensing gas from the dry well to the wet well is completed in several minutes after the occurrence of the accident; afterwards, it is only the steam discharged from the reactor pressure vessel that flows into the suppression-pool water. The condensation of this steam causes the temperature of the suppression-pool water to be increased, generating a difference in temperature between the suppression-pool water and the outer-peripheral-pool water. Since the containment-vessel wall separating the suppression chamber from the outer peripheral pool is made of steel, which is a good conductor of heat, the above-mentioned difference in temperature causes the heat held by the suppression-pool water to be transferred to the outer-peripheral-pool water through the wall of the reactor containment vessel. Due to this arrangement, the heat in the reactor containment vessel can be discharged to the exterior thereof over a long period of time after the occurrence of the accident, without using any dynamic apparatus, with the result that a rise in pressure in the reactor containment vessel is suppressed, thereby ensuring the soundness of the reactor containment vessel.

Furthermore, since it promotes the heat dissipation from the reactor containment vessel in a natural manner, without using any dynamic apparatus, the above-described containment vessel is referred to as a natural-heat-dissipation-type or natural-cooling-type containment vessel, which provides a high level of reliability since it employs no dynamic apparatus.

Thus, of those reactor containment vessels endowed with a pressure-rise suppressing function to cope with a loss-of-coolant accident, which is to be taken into account from the viewpoint of safety when designing a nuclear reactor, the natural-heat-dissipation-type containment vessel, which is equipped with a cooling water pool in the outer periphery thereof, can be cooled by transferring heat from the suppression chamber to the outer-peripheral-pool water through the containment-vessel wall, thereby suppressing pressure rise in the containment vessel. When applied to a plant of a relatively large output power, this natural-heat-dissipation-type containment vessel entails, at the time of an accident, an increase in decay heat, which is discharged from the reactor core into the space in the containment vessel; this increase in decay heat is in proportion to the output power, so that it is necessary to proportionately increase the quantity of heat that can be dissipated to the exterior of the containment vessel.

One method of increasing the heat dissipation from the natural-heat-dissipation-type containment vessel is to enlarge the area of the heat transfer surface through which heat is transferred from the suppression chamber to the outer-peripheral-pool water.

In the case where the wall of the reactor containment vessel is used as the heat transfer surface, the heat transfer area can be increased by enlarging the diameter of the containment vessel, or increasing the water depth of the vent pipes so as to attain an enlargement in the height direction of the region which is effective in transferring heat to the outer peripheral pool. Enlarging the diameter of the reactor containment vessel, however, is not desirable since it would entail deterioration in the pressure withstanding capacity of the containment vessel, which would lead to a decrease in the allowable temperature of the suppression chamber, resulting in a degeneration in heat dissipation characteristic. Increasing the water depth of the vent pipes, on the other hand, involves an excessive swell of the suppression-pool water when a great amount of steam rapidly enters the suppression chamber at the initial stage of an accident, so that it is necessary to increase the height of the space above the pool water or augment the strength of the structures inside the suppression chamber. Thus, this method is not desirable, either.

Prior-art techniques for enlarging the heat transfer area without enlarging the diameter of the containment vessel or increasing the water depth of the vent pipes, are disclosed in JP.A.64-91089 and JP.A.2-181696, according to which the outer-peripheral-pool water is circulated through pipes running through the interior of the suppression chamber, thus utilizing the heat dissipation from the pipes running through the suppression chamber as well as the natural heat dissipation through the containment-vessel wall.

Another prior-art technique in this regard was presented in the "Fall Meeting of Atomic Energy Society of Japan in the Year 1989". According to the technique presented, a convection promoting plate is provided in the suppression pool to promote the pool water circulation in the lower region of the suppression pool, thereby mitigating the temperature stratification in the suppression pool; due to this arrangement, that region of the suppression pool which is effective in absorbing the heat from the nuclear reactor and the heat transfer area for heat dissipation can be enlarged in the vertical direction.

According to still another prior-art technique, not only the suppression-pool water but also the wet well is cooled by utilizing the containment-vessel wall; in this prior-art technique, which is shown in JP.A.2-227699, the entire containment vessel is surrounded by a flow passage, through which air is circulated to effect cooling.

The prior-art techniques mentioned above, however, have the following problems:

In the prior-art techniques described in JP.A.64-91089 and JP.A.2-181696, the outer-peripheral-pool water which has been heated to high temperature by the heat released from the suppression-pool water, is allowed to circulate, so that, in the region below the vent-pipe outlets, it is always the temperature on the side of the outer peripheral pool that rises first. As a result, heat transfer takes place in that region from the outer peripheral pool toward the suppression chamber, so that the heat which has been released to the outer peripheral pool in the region above the vent-pipe outlets is again absorbed in the lower region by the suppression chamber. Thus, while an increase in heat reserve can be expected in the region below the vent-pipe outlets, the heat dissipation area for releasing heat to the outer peripheral pool is not increased; on the contrary, it rather decreases. Further, in this prior-art technique, no consideration is given to the continuity of the water circulation in the heat transfer pipes, which circulation is based on the difference in density due to the difference in temperature between the heat transfer pipes and the outer peripheral pool. The water in the heat transfer pipes and that in the outer peripheral pool are heated by the heat released from the suppression chamber and are reduced in density to be accumulated in the upper section of the pool. Since this accumulation takes place both in the heat transfer pipes and in the outer peripheral pool, and the outer peripheral pool is open to the atmospheric air, these two regions are eventually filled with water at the saturation temperature thereof (100° C.), so that the requisite temperature difference cannot be secured between the two regions, resulting in the water circulation being stopped.

With the prior-art technique for increasing heat dissipation presented in the Atomic Energy Society of Japan, the water in the suppression pool is circulated by the convection promoting plate installed in the suppression pool; due to this arrangement, that problem to which no consideration was given in the above prior-art technique can be solved, making it possible to utilize the region below the vent-pipe outlets and attain continuity in circulation. Since, however, only the containment-vessel wall is used as the heat transfer surface for releasing heat from the suppression chamber to the outer peripheral pool, the transfer area can only be enlarged in proportion to enlargement of the high-temperature region of the suppression pool, which means the suppression pool has to be enlarged if a further increase in heat dissipation is desired. That would entail an increase in the size of the reactor containment vessel.

In the prior-art technique described in JP.A.2-227699, in which air cooling is effected, the rate of the heat transfer by the air circulation is lower than that of the convection heat transfer in the pool water, so that a large heat transfer area is needed to attain the requisite heat dissipation characteristic. Further, in this prior-art technique, no consideration is given to the above-mentioned necessity of raising the allowable temperature for the suppression pool.

To attain a further improvement in heat dissipation characteristic in these prior-art reactor containment vessels so that they may be adapted to a nuclear plant of a larger output power, the heat dissipation area might be increased by enlarging the size of the reactor containment vessel. However, such an increase in the size of the reactor containment vessel would be a problem.

In the reactor containment vessels described in JP.A.63-75594 (exclusive of FIG. 4) and JP.A.63-191096, which have been mentioned above, any rupture occurring, for example, in the main steam piping, will, as described above, cause the coolant in the reactor pressure vessel to enter the dry well as steam at high temperature and pressure, which steam will further flow through the vent pipes into the suppression-pool water to condense therein. In this process, part of the coolant in the reactor containment vessel will be drawn down in the dry well. It should be noted here that reactor containment facilities are generally equipped with emergency core cooling systems; when the pressure in the reactor pressure vessel has become lower than a predetermined value, the emergency core cooling system operates to cause water to be fed into the reactor pressure vessel for the purpose of submerging the core. This water further overflows from the rupture opening to be discharged into the dry well, with the result that the water level in the dry well is raised by the draw-down water and this overflow water. When the water level in the dry well has been raised up to the dry-well-side openings of the vent pipes, these hot waters flow into the suppression pool through the vent pipes.

In the above prior-art techniques, however, the positions of the dry-well-side openings of the vent pipes are at high level, so that a large amount of water accumulates in the dry well at the time of an a loss-of-coolant accident as mentioned above; accordingly, the water level in the suppression pool only rises to a small degree, with the result that the contact area with the outer peripheral pool of the containment vessel cannot be greater than a fixed value. Further, since a large amount of hot water accumulates in the dry well, the temperature rise of the suppression-pool water is correspondingly dull and the difference in the temperature thereof and that of the outer-peripheral-pool water is small, with the result that the heat transfer from the suppression pool to the outer peripheral pool only occurs to a small degree. In other words, the cooling capacity of the containment vessel has to remain rather poor.

By lowering the level of the dry-well-side openings of the vent pipes, the amount of water accumulating in the dry well is reduced and the amount of suppression-pool water is augmented, with the heat transfer to the outer pool of the containment vessel increasing. However, depending on the degree to which their level is lowered, it may happen that the dry-well-side openings of the vent pipes are immersed in water. In that case, it is difficult for the water level in the dry well to be smoothly lowered even if the pressure in the dry well is raised by the hot water accumulated therein (Pascal's principle), so that the pressure in the dry well rises to an excessive degree, resulting in the containment vessel being deteriorated in terms of safety.

Thus, it is necessary to ascertain the degree to which the level of the dry-well-side openings of the vent pipes can be lowered without involving any problems.

A prior-art technique for reducing the amount of water accumulated in the dry well is described in JP.A.63-229390, according to which a return line is provided, which extends through the wall in which the vent pipes are formed, i.e., the vent wall, and the opening on the dry well side of this return line is situated higher than the water surface of the suppression pool in the normal condition, whereby the suppression-pool water is prevented from flowing backwards to the dry well. Apart from this, shown in FIG. 4 of JP.A.63-75594, which has been mentioned above, is a structure which includes a core submerging hole allowing the dry well to communicate with the vent-pipes; this core submerging hole is provided in that portion of the vent wall which is on the dry well side, and at a height which is above the normal water level of the suppression pool and which allows the reactor core to be submerged.

When, in these prior-art techniques, core coolant is drawn down into the dry well through any rupture opening, the water level in the dry well rises; when the water level has reached the height of the return line or that of the core submerging hole, the drawdown water flows into the suppression-pool water through the return line or the core submerging hole, thereby preventing the water level in the dry well from being raised. Further, since the drawdown water enters the suppression chamber, the water level of the suppression-pool water rises, thereby increasing the area of the heat transfer surface through which heat is transferred from the suppression chamber to the outer peripheral pool and improving the rate of heat dissipation from the containment vessel, which is required for a medium or long period of time after accident.

In these prior-art techniques, however, the return line or the submerging hole is provided in the vent wall, so that the diameter of the return line or the submerging hole cannot be made large because of the necessity of retaining the requisite level of strength of the vent wall. Therefore, the amount of flow from the dry well to the suppression pool through the return line or the submerging hole is limited, so that, while the water amount in the dry well is increasing at high rate, it is impossible to completely prevent the water-level in the dry well from rising. Thus, the uppermost and hottest portion of the water in the dry well is not transferred to the suppression pool, so that, for a short period after the occurrence of an accident, the containment vessel suffers deterioration in its ability to transfer heat from the dry well to the suppression pool, resulting in the vessel being deteriorated in safety.

Further, there are prior-art techniques in which the reactor core is cooled at the occurrence of a loss-of-coolant accident by supplying water into the core by a static means, as disclosed in "Simplicity; the key improved safety, performance and economics", Nuc. Eng. November 1989, and JP.A.63-229390 mentioned above.

According to the prior-art technique described in Nuc. Eng. November 1989, the cooling of the reactor core for a short period after the occurrence of any loss-of-coolant accident is effected by means of a gravity-driven water pool in an emergency core cooling system, and the cooling of the reactor core for a long period after the occurrence of the same is achieved by returning the pool water in the suppression pool to the pressure vessel through an equalizing system. For this purpose, the equalizing system comprises an equalizing line which connects the suppression-pool water with the pressure vessel, a blasting valve provided in this equalizing line such as to remain closed during normal operation and as to be opened only at the time of an accident, and a check valve for preventing the coolant in the pressure vessel from flowing into the suppression pool.

For a long period after the occurrence of an accident, the water in the containment vessel fills the lower dry well to the full by the gravity-driven water pool, and further fills dry well to the height of the inlets of the vent pipes (or the height of the return line leading to the suppression pool), with drawdown water flowing into the suppression-pool water to raise the water level thereof. As a result, the area of the heat transfer surface through which heat is transferred from the suppression chamber to the outer peripheral pool is augmented, thereby improving the rate of heat dissipation from the containment vessel as required for a medium or long period of time. In this case, it is necessary for the water in the containment vessel to fill the same up to the height of the inlets of the vent pipes (or the height of the return line leading to the suppression pool), with the result that a large amount of gravity-driven-pool water is required.

In the prior-art technique described in JP.A.63-229390, the core cooling for a short period after the occurrence of a loss-of-coolant accident is effected by means of an accumulator water tank provided in the emergency core cooling system, and the core cooling for a long period after the occurrence of the accident is attained by the equalizing system connecting the suppression pool with the pressure vessel, as in the prior-art technique described in Nuc. Eng. November 1989. Also in this case, the water in the containment vessel for a long period in the containment vessel has to fill the dry well up to the height of the return line leading to the suppression pool, so that an accumulator water tank of a large capacity is required.

Thus, in both of the prior-art techniques described in Nuc. Eng. November 1989 and JP.A.63-229390, it is necessary to previously set the water amount of the gravity-driven water pool or the accumulator water tank at a high level, with the result that the wall of the building structure supporting the same must be made thick. In addition, there is the problem that a more strict requirement is imposed on the structure in terms of earthquake-proof property.

SUMMARY OF THE INVENTION

It is a first object of this invention to provide a reactor containment facility in which an improvement is attained in terms of the heat dissipation characteristic of the reactor containment vessel for a long period of time after the occurrence of a loss-of-coolant accident while avoiding, as far as possible, augmentation in the size of the reactor containment vessel, so as to be suitable for use in a nuclear plant of a larger output power.

A second object of this invention is to provide a reactor containment facility which realizes an improvement in the heat dissipation characteristic of the reactor containment vessel by increasing the allowable temperature for the suppression chamber.

A third object of this invention is to provide a reactor containment facility in which an improvement is attained in terms of safety for a short period of time after the occurrence of a loss-of-coolant accident as well as in terms of the heat dissipation characteristic of the reactor containment vessel.

A fourth object of this invention is to provide a reactor containment facility in which a reduction can be attained in the volume of the water source for the emergency core cooling system as well as an improvement in the heat dissipation characteristic of the reactor containment vessel.

To achieve the above first and second objects, there is provided, according to a first aspect of this invention, a reactor containment facility comprising: a reactor pressure vessel containing a core; a dry well in which the reactor pressure vessel is arranged; a containment vessel housing the dry well; a suppression chamber holding a suppression-pool water and forming above it a first wet well; and passage means allowing the dry well to communicate with the pool water; wherein the facility further comprises: (a) means for defining a second wet well communicating with the first wet well; and (b) cooling means for keeping the second wet well at a temperature lower than that of the first wet well at the time of a loss-of-coolant accident.

The reactor containment facility in accordance with the first aspect of this invention operates as follows: At the time of a loss-of-coolant accident, the high-temperature/pressure steam leaked into the dry well is transferred in a pressurized condition to the pool water in the suppression chamber along with the non-condensing gas in the dry well, and the steam is condensed in the pool water, with the noncondensing gas accumulating in the first wet well. The pool water is vaporized by the heat transferred thereto as a result of the condensation of the steam, the first wet well being filled with a mixture fluid of the steam and the noncondensing gas. The second wet well is at a relatively low temperature, so that when the mixture fluid is introduced into the second wet well from the first wet well, the steam in the mixture fluid is condensed into liquid to cause a reduction in pressure, with the second wet well becoming a noncondensing-gas region having practically no steam. The first wet well, in contrast, is brought to a condition in which it is substantially steam only that exists therein. Thus, when considering the pressure-proof property of the containment vessel, it is only necessary to take into account the vapor pressure in the first wet well, which is at a relatively high pressure level. Therefore, it is possible to raise the allowable temperature for the pool water to a saturated-steam temperature corresponding to the withstanding pressure of the containment vessel, which means the difference in temperature between the suppression-pool water and the portion outside thereof can be made so much the larger, thus attaining an improvement in heat dissipation capacity. By thus improving the heat dissipation capacity, the pressure-rise suppression effect of the reactor containment vessel is improved, thereby making it possible to provide a reactor containment vessel suitable for use in a nuclear plant of a larger output power.

The second wet well may be provided separately from the conventional wet well, and the suppression chamber may be divided into a first chamber containing the pool water and a second chamber, the second wet well being defined by said second chamber. In the latter case, the second wet well is formed in the suppression chamber, so that the reactor containment facility of the present invention can be realized in a compact structure.

The reactor containment facility preferably further comprises: (c) a steel wall which is in contact with the suppression-pool water and which surrounds at least the pool water so as to form the above-mentioned containment vessel; and (d) an outer peripheral pool containing a cooling water in contact with the outer peripheral surface of the steel wall. With this construction, the pool water of the suppression pool is in contact with the outer-peripheral-pool water through the intermediation of a wall that is made of steel, which is a good conductor of heat, so that a satisfactory level of heat transfer efficiency can be obtained, thus attaining a further improvement in heat dissipation capacity.

To achieve the above first and second objects, there is provided, according to a second aspect of this invention, a reactor containment facility comprising: a reactor pressure vessel containing a core; a dry well in which the reactor pressure vessel is arranged; a containment vessel housing the dry well; a suppression chamber holding a suppression-pool water and forming above it a first wet well; and a passage means allowing the dry well to communicate with the pool water; wherein the facility further comprises: (a) means for defining a second wet well communicating with the first wet well; and (b) means which separates a mixture fluid consisting of the noncondensing gas in the suppression chamber and the steam from the pool water into the noncondensing gas and the steam and which causes the steam after the separation to remain in the first wet well and the noncondensing gas to be collected in the second wet well.

The operation of the reactor containment facility in accordance with the second aspect of this invention is substantially the same as that of the reactor containment facility in accordance with the first aspect thereof. Also in this case, the reactor containment facility preferably further comprises: (c) a steel wall which is in contact with the suppression-pool water and which surrounds at least the pool water so as to form the above-mentioned containment vessel; and (d) cooling means for cooling the outer peripheral surface of the steel wall.

Further, to achieve the above first and second object of this invention, there is provided, according to a third aspect of this invention, a reactor containment facility comprising: a reactor pressure vessel containing a core; a dry well in which the reactor pressure vessel is arranged; a suppression chamber holding a suppression-pool water and forming, in the space above the same, a wet well; a plurality of vent pipes allowing the dry well to communicate with the pool water; a steel wall which is in contact with the pool water of the suppression chamber and which surrounds at least the pool water so as to form a containment vessel which houses the dry well and the suppression chamber; and an outer peripheral pool containing a cooling water in contact with the outer peripheral surface of the steel wall; wherein the facility further comprises: (a) dividing means for dividing the wet well of the suppression chamber into a first space which is in contact with the water surface of the pool water and a second space which is not in contact therewith; (b) first passage means which allows the first space to communicate with the second space and which has an area smaller than that of the dividing means; and (c) cooling means for keeping the second space at a temperature lower than that of the first space.

The reactor containment facility in accordance with the third aspect of this invention operates as follows: At the time of a loss-of-coolant accident, there exists in the first space a mixture fluid consisting of the steam generated from the pool water and noncondensing gas; in the second space, the steam is condensed and the noncondensing gas accumulates; as a result, the allowable temperature of the suppression chamber is raised, as stated above, thereby improving the heat dissipating characteristic of the reactor containment vessel. Here, the first and second spaces communicate with each other through a narrow passage means, so that the intrusion of the mixture fluid from the first into the second space takes place gradually, whereby the condensation of the steam in the mixture fluid can take place steadily in the second space, leaving no steam to remain uncondensed for a long time. Thus, fractional collection of noncondensing gas and steam can be effected reliably. Further, since the suppression-pool water is water-cooled by the outer peripheral pool, the suppression effect of the reactor containment vessel is improved.

Preferably, the above reactor containment facility further comprises: (d) second passage means allowing the lower section of the second space to communicate with the suppression-pool water. Due to this construction, the water condensed in the second space is returned to the suppression pool through the second passage means, thereby further enhancing the degree of repletion of the noncondensing gas in the second space.

Further, the above-mentioned steel wall preferably further surrounds the first and second spaces, the above-mentioned cooling means including an air passage formed outside the steel wall. The cooling means may include a recess region formed by extending downwards the outer peripheral section of the second space to be in thermal contact with the cooling water of the outer peripheral pool.

The reactor containment facility preferably further comprises: (e) at least one convection promoting pipe which is arranged in the outer peripheral pool and which has at least one upper opening situated below the water surface of the suppression-pool water at a position above the outlets of the vent pipes and at least one lower opening situated in the pool water at a position below the outlets of the vent pipes, with the upper and lower openings communicating with each other to allow the pool water to pass therethrough. With this construction, a further improvement in heat dissipation characteristic can be attained due to the action of the convection promoting pipes described below.

Further, the reactor containment facility may further comprise: (f) a convection promoting plate which is arranged in the suppression-pool water along the stee wall, the upper end of the plate being positioned higher than the outlets of the vent pipes, the lower end of the plate being positioned lower than the outlets of the vent pipes, with the difference in height between the upper end and the outlets of the vent pipes being larger than the difference in height between the outlets of the vent pipes and the lower end. With this construction, the convection promoting plate helps to enlarge the convection region of the pool water to enhance the heat dissipation through the steel wall, thereby attaining a further improvement in terms of heat dissipation characteristic.

Further, to achieve the above first and second objects, there is provided, according to a fourth aspect of this invention, a reactor containment facility comprising: a reactor pressure vessel containing a core; a dry well in which the reactor pressure vessel is arranged; a containment vessel housing the dry well; a suppression chamber holding a suppression-pool water and forming, in the space above the same, a wet well; and passage means allowing the dry well to communicate with the pool water; wherein the facility further comprises: (a) means arranged on the water surface of the pool water of the suppression chamber for serving to restrain the evaporation of the pool water.

The operation of the reactor containment facility in accordance with the fourth aspect of this invention is as follows: At the time of a loss-of-coolant accident, some of the steam at high temperature and pressure is leaked into the dry well and transferred in a pressurized condition to the pool water of the suppression chamber along with the noncondensing gas in the dry well; the steam is condensed, and the noncondensing gas accumulates in the wet well. As a result of this condensation, the temperature of the suppression-pool water is raised; since, however, the evaporation is restrained by the evaporation restraining means, the evaporation of the pool water, which, in the prior art, would start at the saturation temperature corresponding to the vapor partial pressure in the wet well, starts at the saturation temperature corresponding to the total pressure in the wet well. As a result, the temperature of the suppression-pool water can be kept at a higher level under the same wet-well pressure, so that the difference in temperature between the suppression-pool water and the outside of the reactor containment vessel is augmented, thereby attaining an improvement in heat dissipation effect.

The reactor containment facility preferably further comprises: (b) a steel wall in contact with the suppression-pool water and surrounding at least the pool water so as to form the above-mentioned containment vessel; and (c) cooling means for cooling the outer peripheral surface of the steel wall.

Further, to achieve the above first and second objects, there is provided, according to a fifth aspect of this invention, a reactor containment facility comprising: a reactor pressure vessel containing a core; a dry well in which the reactor pressure vessel is arranged; a suppression chamber holding a suppression-pool water and forming, in the space above the same, a wet well; a plurality of vent pipes allowing the dry well to communicate with the pool water; a steel wall which is in contact with the pool water of the suppression chamber and which surrounds at least the pool water so as to form a containment vessel which houses the dry well and the suppression chamber; and an outer peripheral pool containing a cooling water in contact with the outer peripheral surface of the steel wall; wherein the facility further comprises: (a) a hydrophobic-material layer which is formed on the water surface of the suppression-pool water and which has a saturation vapor pressure and a density that are lower than those of the pool water.

The operation of the reactor containment facility in accordance with the fifth aspect of this invention is as follows: When, at the time of a loss-of-coolant accident, the temperature of the suppression-pool water rises as a result of steam condensation, the evaporation of the pool water is restrained since the saturation vapor pressure of the hydrophobic-material layer floating on the pool-water surface is lower than that of water. That is, this hydrophobic-material layer functions as a means of restraining the evaporation of the pool water. Accordingly, the temperature of the suppression-pool water can be kept at a higher level, as stated above, thereby attaining an improvement in heat dissipation effect. Further, since the suppression-pool water is water-cooled by the outer peripheral pool, the suppression effect of the reactor containment vessel is improved.

Further, to achieve the above first and second objects, there is provided, according to a sixth aspect of this invention, a reactor containment facility comprising: a reactor pressure vessel containing a core; a dry well in which the reactor pressure vessel is arranged; a containment vessel housing the dry well; a suppression chamber holding a suppression-pool water and forming, in the space above the same, a wet well; and passage means allowing the dry well to communicate with the pool water; wherein the facility further comprises: (a) circulation passage means which has an intake opening situated in the pool water at a position higher than the outlet of the passage means leading to the pool water and a discharge opening situated in the pool water at a position lower than the same, with at least a part of the circulation passage means being situated outside the suppression chamber.

The reactor containment facility in accordance with the sixth aspect of this invention operates as follows: At the time of a loss-of-coolant accident, the steam at high temperature and pressure is leaked into the dry well and transferred in a pressurized state to the pool water through the passage means along with the noncondensing gas in the dry well, the steam being condensed and the noncondensing gas accumulating in the wet well. The pool water in that portion of the passage means which is higher than the above-mentioned outlet leading to the pool water is at a higher temperature as compared with the pool water in that portion of the passage means which is lower than that. That portion of the pool water which is at a relatively high temperature is taken up by the circulation passage means. Since the circulation passage means is situated outside, the pool water thus taken up is cooled to be increased in density, and descends of its own accord to be returned to the suppression-pool water through the discharge opening of the circulation passage means. This causes a circulation flow to be generated, by means of which the suppression-pool water is moved to promote heat dissipation.

The above reactor containment facility preferably further comprises: (b) cooling means provided in that portion of the circulation passage means which is situated outside the suppression chamber. By cooling the circulation passage means by the cooling means, the heat dissipation capacity of the facility is further enhanced.

Further, to achieve the above first and second objects, there is provided, according to a seventh aspect of this invention, a reactor containment facility comprising: a reactor pressure vessel containing a core; a dry well in which the reactor pressure vessel is arranged; a containment vessel housing the dry well; a suppression chamber holding a suppression-pool water and forming, in the space above the same, a wet well; and passage means allowing the dry well to communicate with the pool water; wherein the facility further comprises: (a) circulation passage means at least a part of which is situated outside the suppression chamber for causing the pool water to be circulated from a position higher than the pool-water side outlet of the passage means to a position lower than the same.

The operation of the reactor containment facility in accordance with the seventh aspect of this invention is substantially the same as that of the facility in accordance with the sixth aspect of this invention. Also in this case, the reactor containment facility preferably further comprises: (b) cooling means provided in that portion of the circulation passage means which is situated outside the suppression chamber.

Further, to achieve the above first and second objects, there is provided, according to an eighth aspect of this invention, a reactor containment facility comprising: a reactor pressure vessel containing a core; a dry well in which the reactor pressure vessel is arranged; a suppression chamber holding a suppression-pool water and forming, in the space above the same, a wet well; a plurality of vent pipes allowing the dry well to communicate with the pool water; a steel wall which is in contact with the pool water of the suppression chamber and which surrounds at least the pool water so as to form a containment vessel which houses the dry well and the suppression chamber; and an outer peripheral pool containing a cooling water in contact with the outer peripheral surface of the steel wall; wherein the facility further comprises: (a) at least one convection promoting pipe which is arranged in the outer peripheral pool and which has at least one upper opening situated below the water surface of the suppression-pool water at a position above the outlets of the vent pipes and at least one lower opening situated in the pool water at a position below the outlets of the vent pipes, with the upper and lower openings communicating with each other to allow the pool water to pass therethrough.

The operation of the reactor containment facility in accordance with the eighth aspect of this invention is substantially the same as that of the facility in accordance with the seventh aspect, except for the fact that the pressure suppression effect of the reactor containment vessel is further improved due to the water-cooling of the suppression-pool water by the outer peripheral pool.

In the above containment facility, the difference in height between the upper opening mentioned above and the outlets of the vent pipes is larger than the difference in height between the outlets of the vent pipes and the lower opening mentioned above. Further, the above-mentioned convection promoting pipe preferably includes upper and lower header pipes respectively arranged at upper and lower positions in the outer peripheral pool and a plurality of heat transfer pipes allowing the upper and lower header pipes to communicate with each other.

To achieve the above first and third objects, there is provided, according to a ninth aspect of this invention, a reactor containment facility comprising: a reactor pressure vessel containing a core; a dry well in which the reactor pressure vessel is arranged; a first suppression chamber holding a suppression-pool water and forming, in the space above the same, a wet well; a plurality of first vent pipes allowing the dry well to communicate with the pool water; a steel wall which is in contact with the pool water of the suppression chamber and which surrounds at least the pool water so as to form a containment vessel which houses the dry well and the first suppression chamber; an outer peripheral pool containing a cooling water in contact with the outer peripheral surface of the steel wall; and an emergency core cooling system adapted to cool the core by supplying a water into the pressure vessel at the time of a loss-of-coolant accident; wherein the height of the dry-well-side openings of the first vent pipes is so determined that when the water level in the dry well, in which water overflowing from the reactor pressure vessel accumulates at the time of a loss-of-coolant accident, has attained a core submerging level which allows submergence cooling of the core, the water in the dry well starts to flow into the first suppression chamber through the first vent pipes.

The operation of the reactor containment facility in accordance with the ninth aspect of this invention is as follows:

If an accident should occur in which some of the coolant in the reactor pressure vessel is lost due to a rupture in the piping, etc., the water in the emergency core cooling system, e.g., that in the accumulator tank, flows into the reactor pressure vessel and enters the dry well through the rupture opening, thereby raising the water level in the dry well. Since the pressure in the reactor containment vessel has been sufficiently reduced by the time the water level in the dry well reaches the rupture opening, the water level in the reactor pressure vessel rises from the time onwards at which the water level in the dry well has exceeded the rupture opening as does the water level in the dry well, and attains a level equal to the submergence level of the dry well. Here, the core submerging level of the dry well, which partly depends on the structure of the reactor containment vessel, is set at a value which is obtained by adding a margin height, e.g., of approx. 50 cm, to the height of the upper end of the core in the reactor pressure vessel, taking some fluctuation in water level into account. Thus, it is also possible to cope sufficiently with the evaporation of the cooling water in the reactor pressure vessel due to the core decay heat after the submergence.

When the water level in the dry well has reached the core submerging level, the water in the dry well flows, starting with the uppermost hot water portion, which is the hottest water portion in the dry well through the vent pipes to the suppression pool, causing the water level and temperature of the suppression-pool water to rise. When the water in the accumulator tank, etc. has been used up, the water level of the suppression-pool water ceases to rise.

As a result, the water level in the suppression pool rises higher than in the normal state and the area of the heat transfer surface through which heat is transferred to the outer peripheral pool is enlarged, thereby attaining an improvement in terms of heat dissipation for a long period of time after accident. Further, when the water level in the dry well has reached the core submerging level, the uppermost hot water portion in the dry well immediately starts to flow through the vent pipes into the suppression pool, so that heat transfer to the suppression chamber is effected in an efficient manner, thereby attaining an improvement in terms of safety for a short period after accident. Further, since the temperature of the suppression-pool water is raised to a maximum, the difference in temperature between the suppression pool and the outer peripheral pool of the reactor containment vessel is augmented, thereby making it also possible to increase the quantity of heat that is transferred.

In the above reactor containment facility, the amount of coolant stored in the water source of the emergency core cooling system is preferably set such as to be substantially equal to the sum of the amount of coolant needed for raising the water level in the dry well up to the core submerging level and the amount of coolant required for making the water level of the suppression-pool water equal to the core submerging level. Due to this arrangement, the water level in the pressure suppression pool can be raised up to the core submerging level for the dry well, thereby making it possible to enlarge to a maximum the heat transfer area between the suppression pool and the outer peripheral pool of the containment vessel.

Further, a structure for reducing the amount of coolant when the water level in the dry well has been raised to the core submerging level is preferably provided in that portion of the space in the dry well which is below the core submerging level. This helps to reduce the time it takes for the water level in the dry well to reach the core submerging level, thereby attaining an improvement in terms of safety. Moreover, since the amount of coolant needed for the submergence may be small, it is possible to reduce the capacity of the accumulator tank, etc. for supplying water to the core.

Further, to achieve the above first and third objects, there is provided, according to a tenth aspect of this invention, a reactor containment facility comprising: a reactor pressure vessel containing a core; a dry well in which the reactor pressure vessel is arranged; a first suppression chamber holding a suppression-pool water and forming, in the space above the same, a wet well; a plurality of first vent pipes allowing the dry well to communicate with the pool water; a steel wall which is in contact with the pool water of the suppression chamber and which surrounds at least the pool water so as to form a containment vessel which houses the dry well and the first suppression chamber; and an outer peripheral pool containing cooling water in contact with the outer peripheral surface of the steel wall; wherein the facility further comprises: (a) a second suppression chamber situated above the first suppression chamber and including a suppression pool and a wet well, the suppression pool communicating with the dry well through a plurality of second vent pipes; and (b) a line equipped with a valve and connecting the second suppression chamber with the reactor pressure vessel to provide an emergency core cooling system.

The operation of the reactor containment facility in accordance with the tenth aspect of this invention is as follows:

If an accident should occur which causes some of the reactor cooling water in the reactor pressure vessel to be discharged into the dry well due to a rupture in the piping, etc., the high-temperature water discharged into the dry well accumulates in the lower section of the dry well; the steam, however, flows through the first and second (the upper and lower) vent pipes and condenses in the suppression pools, so that there is no excessive rise in the pressure in the containment vessel. The valve provided in the line leading from the pool water of the second suppression chamber (the upper-suppression-pool water) to the reactor pressure vessel is opened when the water level in the reactor pressure vessel has been lowered to reduce the drawdown from the rupture opening, and the pressure in the reactor pressure vessel has decreased, or when the pressure in the reactor pressure vessel has been lowered to a sufficient degree by means of a safety relief valve. By thus opening the above valve provided in the line, the water in the upper suppression pool is fed into the reactor pressure vessel to cool the core. The water thus fed flows out through the rupture opening into the dry well, causing the water level in the dry well to rise. When the dry-well water level has reached the dry-well-side openings of the first vent pipes, water flows into the pool water of the first suppression chamber (the lower suppression pool), causing the water level in the lower suppression pool to rise.

Due to this arrangement, the submergence cooling of the reactor core can be performed if there is no drive source such as a pump, and, since the water level in the lower suppression pool rises to a large degree, a large area can be secured for the heat transfer to the outer peripheral pool of the containment vessel. That is, an improvement is attained in terms of heat dissipation for a long period of time after accident. Further, by arranging suppression pools at upper and lower positions, the number of vent pipes can be augmented, so that the overshoot of the pressure in the dry well due to the vent-pipe resistance immediately after accident can be reduced, thereby achieving an improvement in terms of safety. Further, by dividing the requisite coolant amount of the suppression pool into upper and lower portions, the water depth in the suppression pools can be set at the same level as in the prior art, so that it is possible to reduce the size (the area or the outer diameter) of the upper and lower suppression pools, that is, the diameter of the containment vessel.

In the above reactor containment facility, the height of the dry-well-side openings of the first vent pipes is preferably set at a level substantially equal to a core submerging level which is that water-level in the dry well at which submergence cooling of the core can be effected with the water in the dry well, which has overflowed from the reactor pressure vessel and accumulated in the dry well at the time of a loss-of-coolant accident. As in the case of the facility in accordance with the ninth aspect, this arrangement is advantageous in that when the water level in the dry well has reached the core submerging level, the water in the dry well flows, starting with the uppermost hot water portion, which is the hottest water portion in the dry well, to the suppression pool through the vent pipes, and the water level and temperature of the suppression-pool water start to rise, whereby heat transfer to the suppression chamber is effected in an efficient manner, thus attaining a further improvement in terms of safety for a short period of time after accident.

Further, the amount of coolant of the second suppression chamber is preferably set such as to be substantially equal to the sum of the amount of coolant needed for raising the water level in the dry well up to the core submerging level and the amount of coolant required for making the water level of the suppression-pool water equal to the core submerging level. Due to this arrangement, the water level in the lower suppression pool rises to the level of the dry-well-side openings of the vent pipes, so that the heat transfer area between the suppression pool and the outer peripheral pool of the containment vessel can be enlarged to a maximum.

To achieve the above first and fourth objects, there is provided, according to an eleventh aspect of this invention, a reactor containment facility comprising: a reactor pressure vessel containing a core; a dry well in which the reactor pressure vessel is arranged; a suppression chamber holding a suppression-pool water and forming, in the space above the same, a wet well; a plurality of vent pipes allowing the dry well to communicate with the pool water; a steel wall which is in contact with the pool water of the suppression chamber and which surrounds at least the pool water so as to form a containment vessel which houses the dry well and the suppression chamber; an outer peripheral pool containing cooling water in contact with the outer peripheral surface of the steel wall; and an emergency core cooling system adapted to cool the core by supplying water into the pressure vessel at the time of a loss-of-coolant accident; wherein the facility further comprises: (a) equalizing means which, for a long period of time after a loss-of-coolant accident, cools the core by supplying water into the pressure vessel, utilizing the suppression-pool water and the drawdown water accumulated in the dry well as a water source.

The reactor containment facility in accordance with the eleventh aspect of this invention operates as follows:

Due to the provision of an equalizing means which, for a long period of time after a loss-of-coolant accident, supplies water into the pressure vessel by utilizing the suppression-pool water and the drawdown water in the lower section of the dry well as the water source, the drawdown water in the lower dry well can be directly utilized as a new water source, so that there is no need to fill the dry well with drawdown water up to the height of the vent pipes and return it to the suppression pool for the purpose of using the same. Therefore, it is only necessary for the water source of the emergency core cooling system to have a capacity large enough to fill the lower dry well up to the core submerging level, thus making it possible to reduce the capacity of the water source. By the "drawdown water" is meant that portion of the cooling water in the pressure vessel which has outflowed through the rupture opening and that portion of the cooling water which has been leaked out through the rupture opening after being fed into the pressure vessel from the emergency core cooling system.

Further, since it is also possible to transfer the decay heat from the suppression pool to the outer peripheral pool through the wall of the containment vessel, the cooling of the core and the containment vessel can be effected by a static means for a long period of time after the occurrence of an accident.

In the above reactor containment facility, the opening in the suppression-pool water of the equalizing means is preferably at a height near the water surface of the pool water. Due to this arrangement, the water level in the suppression pool can be maintained at a high level when it is so set, so that the area of the heat transfer surface through which heat is transferred to the outer peripheral pool can be enlarged, thereby attaining an improvement in terms of heat dissipation.

Further, the above-mentioned equalizing means preferably includes: a first equalizing line connecting the suppression-pool water with the pressure vessel; a second equalizing line branching off from the first equalizing line and opening at a position below the dry well; an isolation valve provided between the point at which the first equalizing line is connected with the pressure vessel and the branching point at which the second equalizing line branches off; and check valves respectively provided in the first and second equalizing lines, said check valves in the first equalizing line being positioned between the branching point and the point at which the first equalizing line is connected with the suppression-pool water and in the second equalizing line. In this case, the opening in the suppression-pool water of the first equalizing line is preferably at a level near the water surface of the pool water.

The above reactor containment facility preferably further comprises: (b) first detection means for detecting the pressure in the pressure vessel; (c) second detection means for detecting the water level in the pressure vessel; (d) third detection means for detecting the pressure in the dry well; (e) a pressure reducing valve connected with the pressure vessel and adapted to allow the steam in the pressure vessel to escape to the dry well; and (f) control means which is adapted to open the pressure reducing valve in response to a low-water-level signal indicative of low water level in the pressure vessel and supplied from the second detection means and to a high-pressure signal indicative of high pressure in the dry well and supplied from the third detection means so as to allow the steam in the pressure vessel to escape therefrom, and which, afterwards, opens the isolation valve to operate the equalizing means, in response to a low-pressure signal indicative of low pressure in the pressure vessel.

With this construction, the isolation valve of the equalizing means is opened after the pressure reducing valve has been automatically opened in the process during which the pressure in the pressure vessel decreases after the occurrence of an accident. When the isolation valve of the equalizing means has been opened, a reduction to a sufficient degree in the pressure in the pressure vessel after a long time after the occurrence of the accident will cause the pool water in the suppression pool and the drawdown water in the dry well to flow into the pressure vessel due to water head. Since check valves are provided in the first and second equalizing lines of the equalizing means, there is no risk of the water in the pressure vessel flowing backwards to the dry well or the suppression pool, and none of the pool water in the suppression pool will flow into the dry well.

The above-mentioned isolation valve may comprise a blasting valve or an electrically operated valve. Further, the first and second equalizing lines are preferably respectively equipped with each two of isolation valves and check valves as mentioned above that are arranged in parallel; thus, if one of the systems becomes out of order, the equalizing means can be reliably operated by the other one.

BRIEF DESCRIPTION OF THE DRAWINGS

FIGS. 8A and 8B are charts showing the water-temperature/density distribution in a suppression pool and a convection promoting pipe which are in accordance with the third embodiment;

FIGS. 14A and 14B are charts showing the distribution of water-temperature and density in a suppression pool and a convection promoting pipe which are in accordance with the embodiment of FIG. 13;

DETAILED DESCRIPTION OF THE PREFERRED EMBODIMENTS

Preferred embodiments of this invention will now be described with reference to the accompanying drawings.

Figure 2:
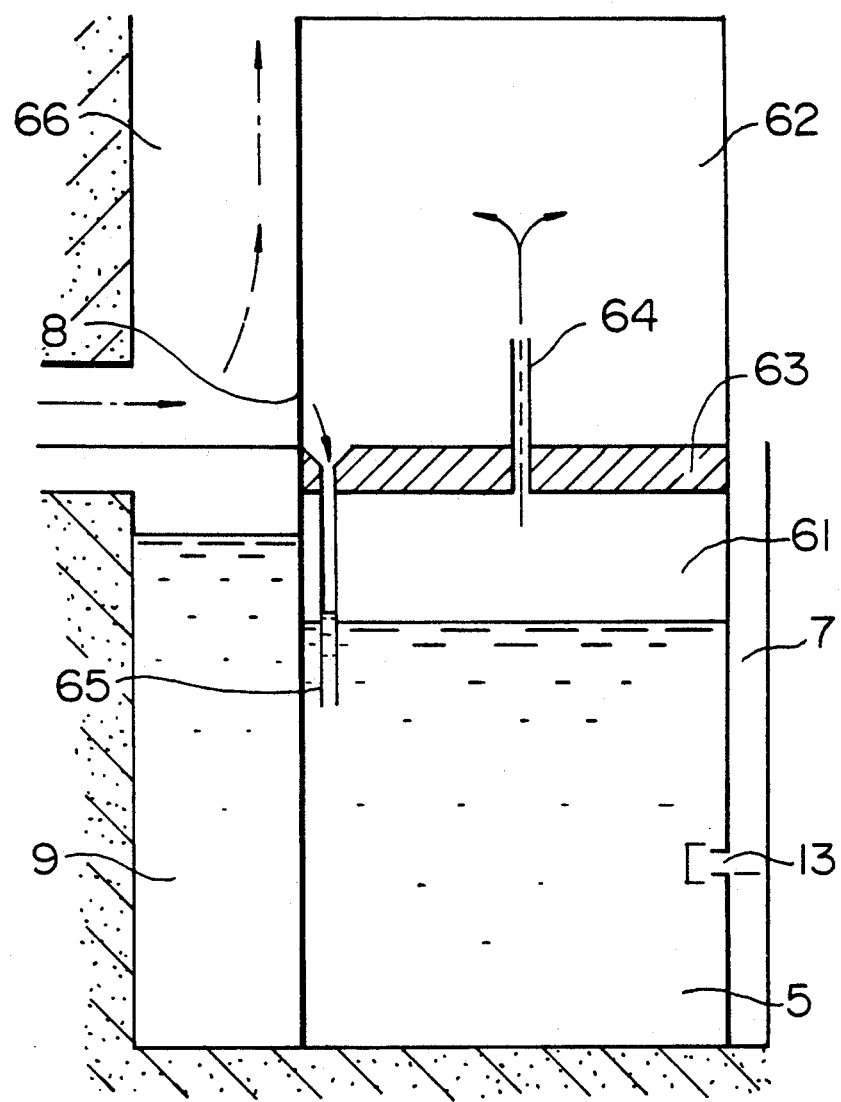
FIG. 2 is a conceptual diagram showing the suppression chamber and the outer peripheral pool in FIG. 1.
Figure 3:
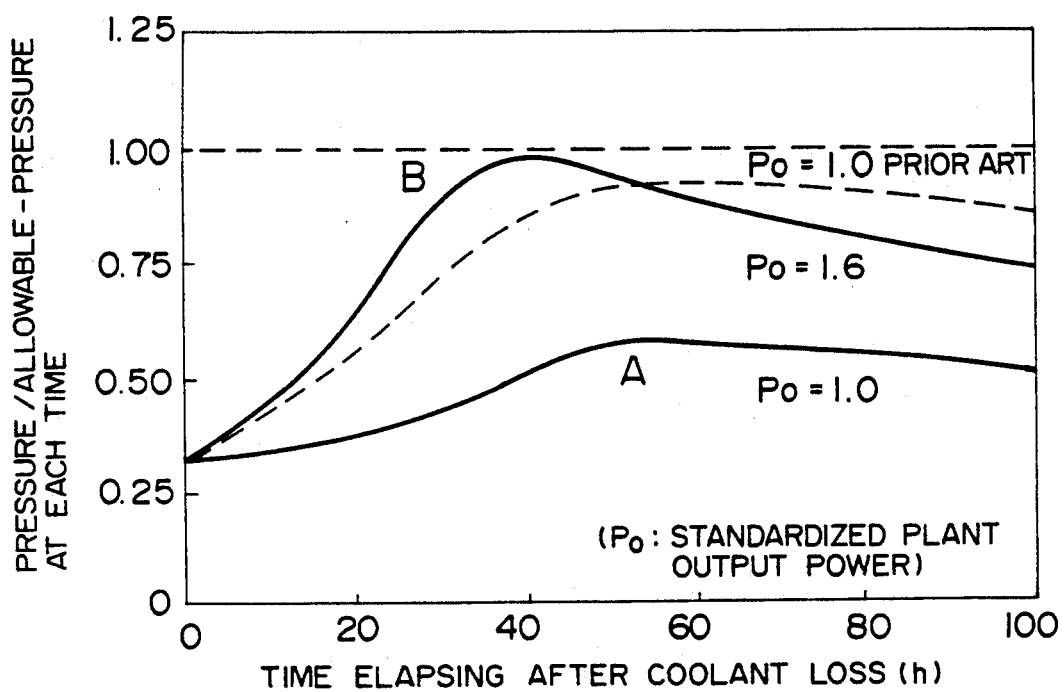
FIG. 3 is a graph showing the results of pressure analysis on a reactor containment vessel in accordance with the first embodiment.

First, the first embodiment of this invention will be described with reference to FIGS. 1 to 3. This embodiment is shown as applied to a facility including a steel reactor containment vessel having a diameter of 34 m. The reason for the containment-vessel diameter of 34 m is that this dimension will allow the reactor vessel, the piping system, and the requisite equipment for operation to be housed in the containment vessel in the case of a plant whose output electrical power ranges from 600 to 1500 MW. In the other embodiments described below, containment vessels of the same diameter are adopted.

Figure 1:
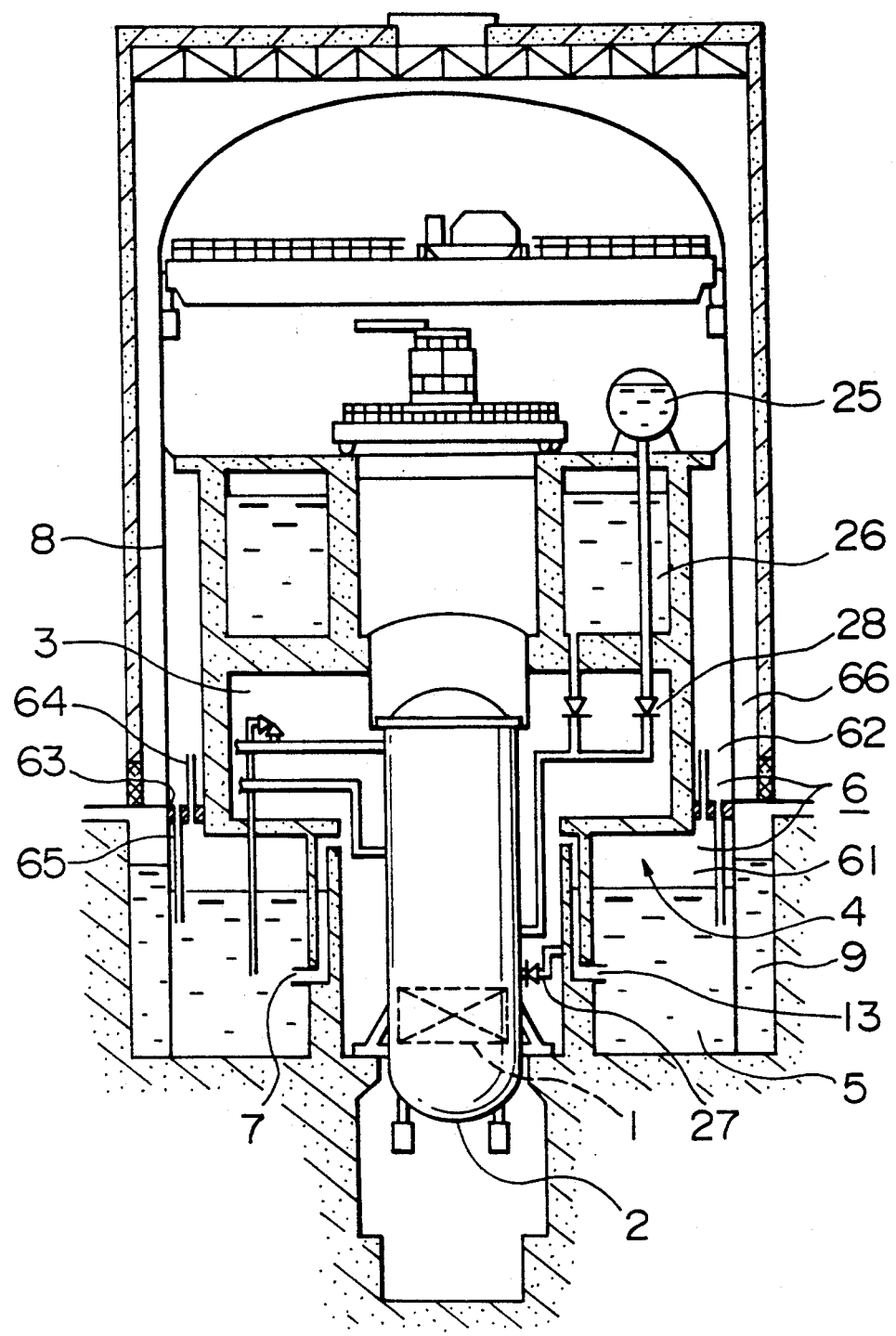
FIG. 1 is a longitudinal sectional view of a reactor containment facility in accordance with a first embodiment of this invention.

In FIG. 1, the reactor containment facility of this embodiment comprises: a reactor pressure vessel 2 containing a reactor core 1; a dry well 3 providing a space in which the core 1 is arranged; a suppression chamber 4 consisting of suppression-pool water (hereinafter referred to simply as "suppression pool" or "pool water") 5 and a gaseous-phase-space wet well 6 defined above the suppression pool; a plurality of vent pipes 7 connecting the dry well 3 and the suppression pool 5 to each other; a reactor-containment-vessel wall 8 made of steel; and an outer peripheral pool 9 arranged outside the suppression pool 5. The facility further comprises: an accumulator water tank 25 and a gravity-driven water tank 26, which are situated above the reactor pressure vessel 2 and connected thereto through check valves 28; and a submerging system 27 connecting the suppression pool 5 and the reactor pressure vessel 2 to each other through a check valve. By "reactor containment vessel" is implied here the steel reactor-containment-vessel wall 8 and the structures integrally built therein, i.e., the suppression chamber 4, etc. This reactor containment vessel is formed as a vessel of natural-cooling type, with the outer peripheral pool 9 being arranged around it.

The components featuring this embodiment will be described. The wet well 6 is divided by a partition 63 into first and second spaces 61 and 62, with the first space 61 being in contact with the surface of the suppression pool water. The two spaces communicate with each other through a plurality of pipes 64 extending through the partition 63. Further, provided in the partition 63 are a plurality of pipes 65, which allows the bottom section of the second space to communicate with the suppression pool water. Provided outside that portion of the steel reactor-containment-vessel wall 8 which is adjacent to the second space of the wet well, is an air passage 66, which sucks in air through an inlet in the lower section of the building and discharges it through an outlet in the upper section of the same. FIG. 2 is an enlarged view of a part of the portion around the suppression chamber.

The allowable temperature for the suppression chamber 4 of the reactor containment vessel is determined as follows: The pressure in the wet well 6 (61), which is in contact with the vessel wall 8 constituting the pressure boundary of the reactor containment vessel, is the sum of the noncondensing-gas partial pressure and the vapor partial pressure, in the wet well. At the time of an accident, all the noncondensing gas that exists in the reactor containment vessel in normal operation is accumulated in the wet well, so that the maximum value of the noncondensing-gas partial pressure in the wet well in this condition is determined from the ratio of the total gaseous-phase volume of the reactor containment vessel to the wet-well volume. Further, the vapor partial pressure in the wet well is determined as the saturation vapor pressure corresponding to the surface temperature of the suppression pool 5. The temperature of the suppression pool must be limited such that, at the time of an accident, the pressure in the wet well, which is the sum of the above two categories of pressure, is not higher than the withstanding pressure of the vessel, i.e., such that the vapor partial pressure is not larger than the difference between the withstanding pressure of the vessel and the noncondensing-gas partial pressure. The temperature limit thus obtained constitutes the allowable temperature for the suppression pool.

In this embodiment, the allowable temperature for the suppression chamber is raised by the following principle to increase the difference in temperature between the suppression chamber and the outer periphery thereof, and, due to the large temperature difference thus attained, it is possible to dissipate a large quantity of heat to the exterior. At the time of a loss-of-coolant accident, the noncodensing gas in the dry well 3 is forced out by the steam discharged from the reactor pressure vessel and flows through the vent pipes 7 to the suppression pool 5, accompanied by the steam. At this time, the noncondensing gas is first accumulated in the first space 61, which is in contact with the surface of the suppression-pool water, and, after raising the pressure of that region, flows into the second space 62 due to the pressure difference. Afterwards, as a result of the steam flowing through the vent pipes 7 into the suppression pool to condense therein, the water temperature of the suppression pool rises, and the vapor partial pressure in the first space 61 is raised, with the total pressure also rising. Since gaseous-phase circulation/mixing is not restricted in the first space 61, the noncondensing gas and the steam are evenly mixed with each other. Due to the pressure difference between the first and second spaces 61 and 62, this gaseous phase flows from the first space 61 into the second space 62. Since the second space 62 is cooled and the steam flowing into it accompanied by noncondensing gas due to the above action is partly or entirely condensed therein, the pressure in the second space 62 becomes lower than that in the first space 61. As a result, the steam accompanied by noncondensing gas again flows from the first space 61 to the second space 62. As this operation is repeated, the noncondensing gas in the wet well is entirely accumulated in the second space 62. Since the returning of the gaseous phase from the second space 62 to the first space 61 is restricted, the first space 61 is filled with steam only, so that when considering the pressure in this space, it is only necessary to take into account the vapor pressure. The cooling amount required at this time in the second space 62 is that required for making the temperature of the steam flowing into the second space through the passages 64 connecting the two spaces lower than the temperature when it is in the first space 61, so that it need not be a large one. Further, since the wet well is divided into upper and lower sections, the size of the reactor containment vessel is not influenced. As a result of the above operation, the saturation steam temperature corresponding to the withstanding pressure of the vessel is obtained as the allowable temperature for the suppression pool. Due to this arrangement, it is possible to raise the allowable water temperature for the suppression pool under the condition of the same withstanding pressure of the pressure vessel, without changing the thickness of the reactor-containment-vessel wall 8; furthermore, the difference in temperature between the suppression pool and the outer peripheral pool increases, thus attaining an improvement in heat dissipation characteristic. Accordingly, this reactor containment facility can be applied to a plant of a higher output power with the same containment-vessel configuration.

Next, the operation of this embodiment will be explained, partly repeating what has been described above. At the time of a loss-of-coolant accident, which is taken into account from the viewpoint of safety when designing a nuclear reactor, the coolant in the reactor pressure vessel 2 flows out into the dry well 3 as steam at high temperature and pressure. Control rods (not shown) are inserted into the reactor core 1 to stop the nuclear fission; in the reactor core, however, the generation of decay heat continues for a long period after that. As the pressure in the reactor pressure vessel decreases, cooling water is supplied thereto from the accumulator water tank 25, the gravity-driven water tank 26 and the core submerging system 27, due to the difference in pressure and gravitation, thereby maintaining the submergence of the reactor core 1. The decay heat in the reactor core 1 is removed by the evaporation of this cooling water and steam is discharged through the rupture section to the dry well 3, whereby the pressure in the dry well 3 is raised to force the water level in the vent pipes 7 downwards, with the steam flowing into the suppression pool 5 to be condensed in the pool water. In this process, the noncondensing gas which has been in the dry well is forced out by the discharged steam and flows, accompanied by it, into the suppression pool, where it ascends to be accumulated in the first space 61. As a result of this accumulation, the pressure in the first space 61 is raised, so that the noncondensing gas flows through the pipes 64 into the second space 62. The transfer of the noncondensing gas from the dry well to the wet well is completed in several minutes after the occurrence of an assumed accident; afterwards, only the steam discharged from the reactor pressure vessel 2 flows into the suppression pool. Because of the decay heat generated during the steam condensation in the suppression pool 5, that portion of the pool water around the vent-pipe outlets 13 is heated, and, due to convection, the temperature of that portion of the pool water which is above the vent-pipe outlets 13 is raised in a substantially uniform fashion. With this rise in temperature, evaporation takes place at the surface of the pool water, and the vapor partial pressure in the first space 61 also rises to cause the pressure in the space to be raised. And the generated steam flows into the second space 62 along with the noncondensing gas remaining in the first space 61. The steam which has entered the second space 62 releases heat to the outer passage 66 through the steel containment-vessel wall 8 and condenses on the wall surface; afterwards, it returns to the suppression pool 5 through the pipes 65. Though its cooling capacity per unit area is small, the natural air-cooling action for cooling the second space 62 is effective since the area of the containment-vessel wall 8 serving as the heat transfer surface is large and the amount of steam flowing in through the pipes 64 is small; thus it is capable of condensing the steam entering the second space 62 and keeping the space at a temperature lower than that of the first space 61. Here, in the pipes 64, the noncondensing gas which has once entered the second space 62 is prevented from flowing back to the first space 61 by the gas flow from the first space 61, and, in the pipes 65, it is prevented by the suppression-pool water in which the pipes are immersed. By repeating the operations described above, substantially the total noncondensing gas is accumulated in the second space 62, with the first space 61 being filled with steam at a temperature equal to the surface temperature of the suppression-pool water.

On the other hand, the heat dissipation from the containment vessel at the time of an assumed accident is basically effected by the heat release from the suppression pool 5, which has attained high temperature, to the outer peripheral pool 9 through the steel containment-vessel wall.

The improvement in heat dissipation characteristic attained in this embodiment will be explained with reference to FIG. 3, which is a diagram comparing a case where this embodiment is applied with a case where it is not, in terms of the changes in the pressure in the containment vessel with respect to the time elapsing after the occurrence of an assumed accident. In the case where this embodiment is not applied, which is represented by the broken line, the temperature of the suppression-pool water rises in process of time; as the temperature of the suppression-pool water rises, however, the quantity of heat released to the outer peripheral pool is also augmented, until it exceeds the quantity of decay heat generated in the reactor core, with the result that the pressure in the containment vessel starts to decrease, thus keeping the pressure in the containment vessel below the withstanding pressure of the vessel. This established plant output power will be defined as a standardized output power 1.0, which is represented by the solid line A in the drawing. In the case of this standardized output power of 1.0, where this embodiment is applied, it is not the sum of the noncondensing-gas partial pressure and the vapor partial pressure but the vapor partial pressure only that is to be considered to be the pressure in the containment vessel, as stated in the description of the principle. Accordingly, the maximum pressure at the time of an assumed loss-of-coolant accident is relatively low. That is, in this embodiment, the temperature of the suppression-pool water is allowed to rise in correspondence with this lowered pressure, and the difference in temperature between the suppression pool and the outer peripheral pool, which is open to the atmospheric air and, consequently, whose temperature cannot be higher than 100° C., can be augmented, whereby an improvement is attained in terms of heat dissipation characteristic, making it possible for a containment vessel of the same size to be applied to a plant of a larger output power. In the case of this embodiment, the allowable temperature for the suppression pool can be raised from approx. 122° C. to approx. 144° C. By applying this embodiment, the pressure suppression in the containment vessel is established at a standardized plant output power of 1.6, as indicated by the solid line B of the drawing, thus making it possible to make the applicable plant output power 1.6 times larger. When the pressure in the containment vessel begins to exhibit an inclination to decrease, the pressure in the second space 62 becomes higher than that in the first space 61, and part of the noncondensing gas accumulated in the second space 62 returns to the first space 61 through the pipes 64; at this time, however, the quantity of heat dissipated is in excess of that of decay heat, so that no serious problem is involved in terms of heat dissipation characteristic. If it is desired to prevent this returning of noncondensing gas, it is only necessary to provide check valves in the pipes 64. Further, while in this embodiment return pipes 65 for the condensed water in the second space 62 are provided, such pipes are not absolutely necessary; if they are not provided, water will accumulate in the second space, which, however, will entail no problem in terms of operation.

Figure 4:
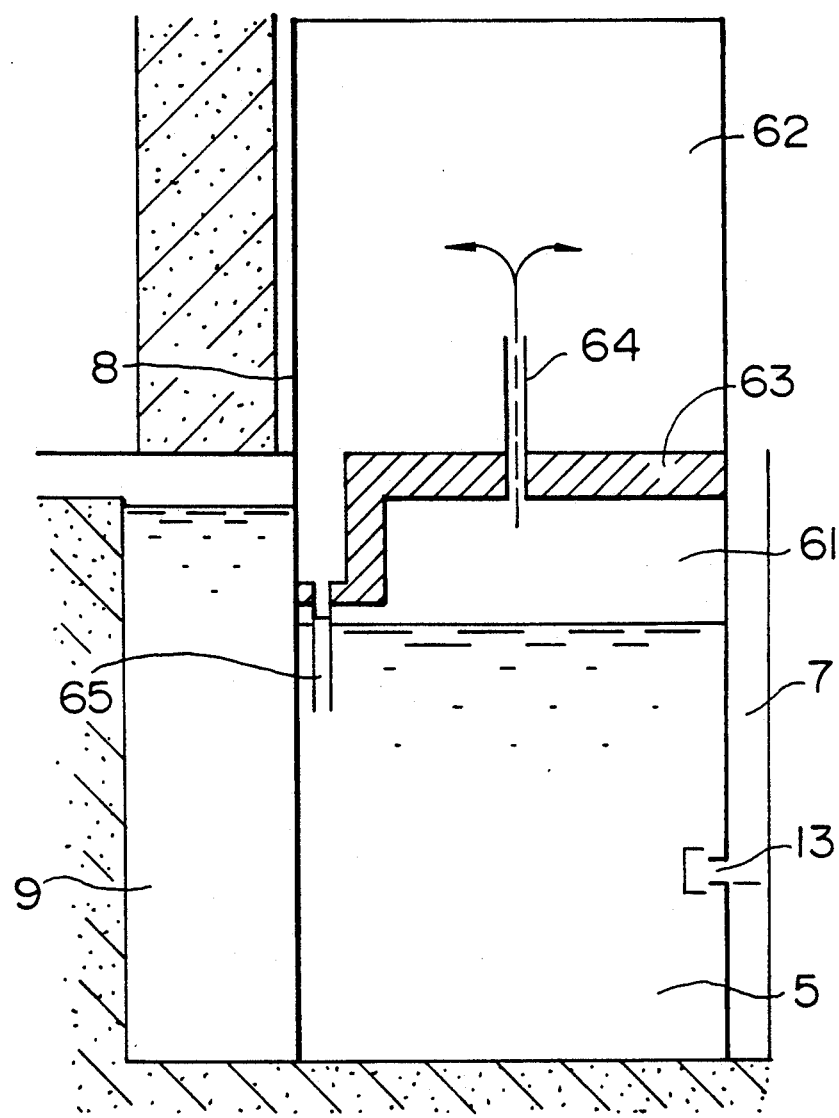
FIG. 4 is a longitudinal sectional view of a suppression chamber and an outer peripheral pool which are in accordance with a modification of the first embodiment.

A modification of this embodiment will be described with reference to FIG. 4. This modification differs from the above-described embodiment in that the partition 63 exhibits a stepped section at its end on the side of the containment-vessel wall 8, such that the second space 62 is extended downwards, with the extended region being in thermal contact with the outer-peripheral-pool water situated above the water level in the suppression pool 5; and, further, the pipes 65 for returning condensed water are provided in the bottom section of that region of the second space 62 extended downwards. Cooling which is effected by pool water, as in this embodiment, provides a better heat dissipation as compared with the natural air cooling described above, so that the requisite heat transfer area for cooling the second space 62 can be reduced. Accordingly, an air-cooling means which requires a large heat transfer area and which has to be installed and maintained at a relatively high position above the containment vessel, can be dispensed with. The heat dissipation characteristic which is obtained by this modification as a whole is the same as that described with reference to FIG. 3.

Figure 5:
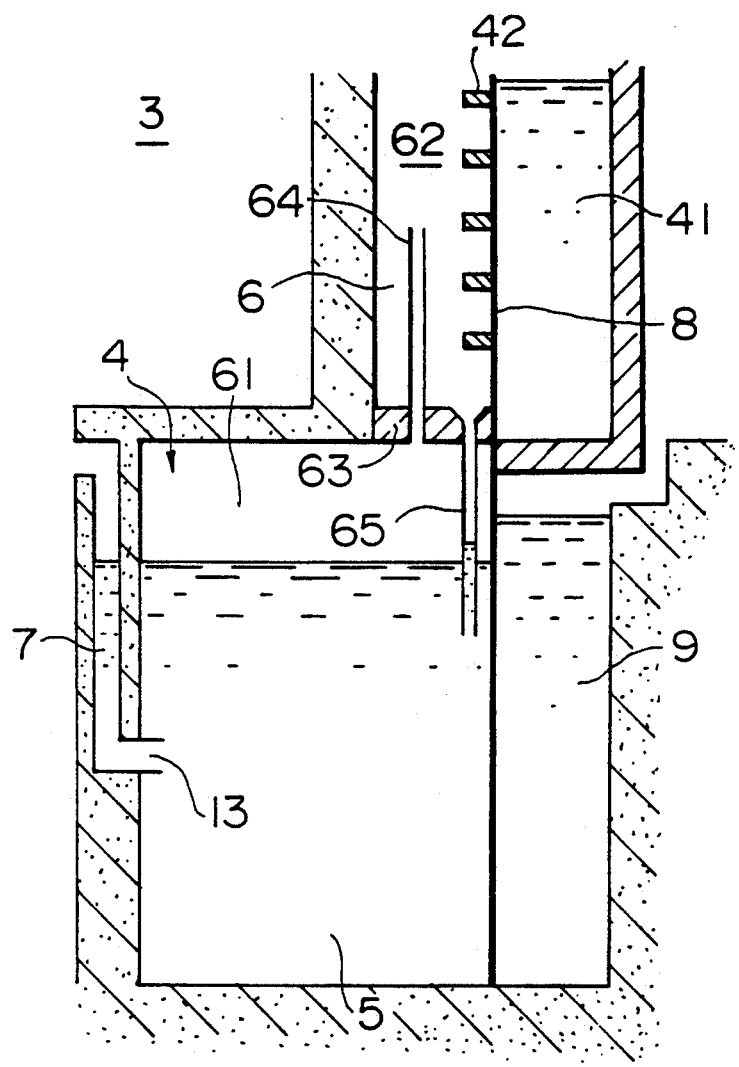
FIG. 5 is a longitudinal sectional view of a suppression chamber and an outer peripheral pool which are in accordance with another modification of the first embodiment.

A still another modification of the above embodiment will be described with reference to FIG. 5. This modification differs from the above embodiment in that it includes a wet-well-cooling-water pool 41, which is in contact with the outer periphery of the reactor-containment-vessel wall 8 so as to cool the wet well 6 and which is separate from the outer peripheral pool 9, as a means for cooling the second space 62 of the wet well 6, with a circumferential ring-like structure 42 being provided on that portion of the wet well 6 which constitutes the inner periphery of the reactor-containment-vessel wall 8.

With this modification, the second space is cooled by pool water, which provides a better heat dissipation as compared with natural air cooling, so that the requisite heat transfer area is reduced, thereby eliminating the need to install a cooling means at a position outside and relatively higher than the reactor containment vessel. This helps to attain an improvement in terms of the ease with which the reactor containment facility is constructed and maintained.

Further, by providing, as in this modification, a pool which is separate from the outer peripheral pool 9 situated below and which is intended for that portion of the cooling water which is excessively higher than the water level in the suppression pool 5, the suppression pool 5 can be protected from an excessive external pressure (water head) due to water-level difference during normal operation.

Further, as to the external pressure applied to the reactor-containment-vessel wall due to the water level of the wet-well-cooling-water pool 41 that is separately provided, it can be coped with by means of a ring-like structure 42 provided on that portion of the wet well 6 which constitutes the inner periphery of the reactor-containment vessel 8, without changing the thickness of the reactor containment vessel. It is only necessary for this ring-like structure to be installed in the region of the wet well 6, which is a gaseous-phase space; if arranged in water, such a structure would hinder the water convection. As it is, the structure does not hinder the condensation heat transfer at the wall surface, thus avoiding deterioration in heat dissipation characteristic. On the contrary, this ring-like structure helps to prevent the development of a condensate film on the wall surface, so that an improvement can be expected in terms of the heat transfer at the wall surface due to augmentation in liquid film thickness.

A second embodiment of this invention will be described with reference to FIG. 6. This embodiment differs from the one shown in FIG. 1 in that, instead of providing a partition structure dividing the wet well 6, there is provided on the water surface of the suppression pool 5 a layer 51 of a hydrophobic material, such as silicone oil or spindle oil, which exhibits a low saturation vapor pressure even at a temperature higher than 100° C. and whose density is smaller than that of water.

In this embodiment, the temperature in the suppression chamber is raised by the following principle to increase the difference in temperature between it and the outer periphery thereof, thereby making it possible to dissipate a greater quantity of heat to the outer periphery. By forming on the water surface of the suppression pool 5 a layer 51 of a hydrophobic material, such as silicone oil or spindle oil, which exhibits a low saturation vapor pressure and whose density is smaller than that of water, the pool water 5 is isolated from the wet well 6 by the hydrophobic-material layer 51. The temperature of the hydrophobic material is equal to the temperature of the water surface of the suppression pool; since, however, its saturation vapor pressure is low, the increase in the pressure in the wet well 6 is small. Since the temperature of the suppression pool 5 is raised and the pressure in the wet well 6 is kept at a low level, the water of the suppression pool will presently start boiling. The steam generated as a result of the boiling of the suppression pool passes through the hydrophobic-material layer 51 on the water surface to enter the wet well, thereby raising the pressure therein. Since, however, it is isolated from the pool surface, the wet well has a low humidity and is, consequently, in a superheated-steam condition (in which the temperature is higher than the saturation temperature corresponding to the vapor partial pressure). And when the total pressure in the wet well 6 (the sum of the noncondensing-gas partial pressure and the vapor partial pressure) attains the saturation pressure corresponding to the water temperature of the suppression pool, the suppression pool ceases to boil. This phenomenon repeats itself; that is, due to the formation of the hydrophobic-material layer 51 on the pool surface, the evaporation of the pool water, which, in the prior art, would start at the saturation temperature corresponding to the vapor partial pressure in the wet well, can be made to start at the saturation temperature corresponding to the total pressure in the wet well. In other words, the water temperature of the suppression pool can be kept at a higher level under the same wet-well pressure. In the case where the wet well is cooled, the hydrophobic material may be regarded as a substitute for the partition section dividing the wet well in the first embodiment. For the above reason, this embodiment makes it possible to raise the allowable suppression-pool-water temperature under the same allowable steam-partial pressure in the wet well (the same withstanding pressure of the vessel), thus helping to increase the difference in temperature between the suppression pool and the outer peripheral pool and attaining an improvement in terms of heat dissipation. Thus, the embodiment can be applied to a plant of a larger output power with the same reactor-containment-vessel configuration.

Next, the operation of this embodiment will be explained, partly repeating what has been described above. The noncondensing gas transferred from the dry well, along with the steam, during the initial period after the occurrence of an accident, is accumulated in the wet well 6 after having passed through the suppression pool 5 and the hydrophobic-material layer 51. On the other hand, the steam coming through the vent pipes 7 is condensed in the pool water, thereby heating the pool water and the hydrophobic-material layer 51. Since, however, the pool surface which is in contact with the wet well 6 consists of a hydrophobic material having a low saturation vapor pressure, the rise in the vapor partial pressure in the wet well 6 is small (practically zero) even if the pool-water temperature is raised, so that it is not necessary to take into account the vapor partial pressure of the hydrophobic material. And, by forming, as in this embodiment, a layer 51 of a hydrophobic material which exhibits a low saturation vapor pressure and whose density is smaller than water, the evaporation of the pool water at the surface of the suppression pool 5 can be restrained, as stated above. Accordingly, it is possible to realize a condition in which the water temperature of the suppression pool 5 is high, with the pressure in the wet well 6 being low. That is, the allowable temperature for the suppression pool can be raised without changing the size of the containment vessel. Further, in the case where the wet well is cooled by natural air cooling as in this embodiment, the hydrophobic material may, as stated above, be regarded as a substitute for the partition 63 and the pipes 64 and 65 of the embodiment shown in FIG. 1, so that the improvement in heat dissipation characteristic attained in this embodiment is the same as that shown in FIG. 3. That is, in this embodiment, the allowable temperature for the suppression pool can be raised from approx. 122° C. to approx. 144° C., and the applicable plant output power can be made 1.6 times larger.

Figure 7:
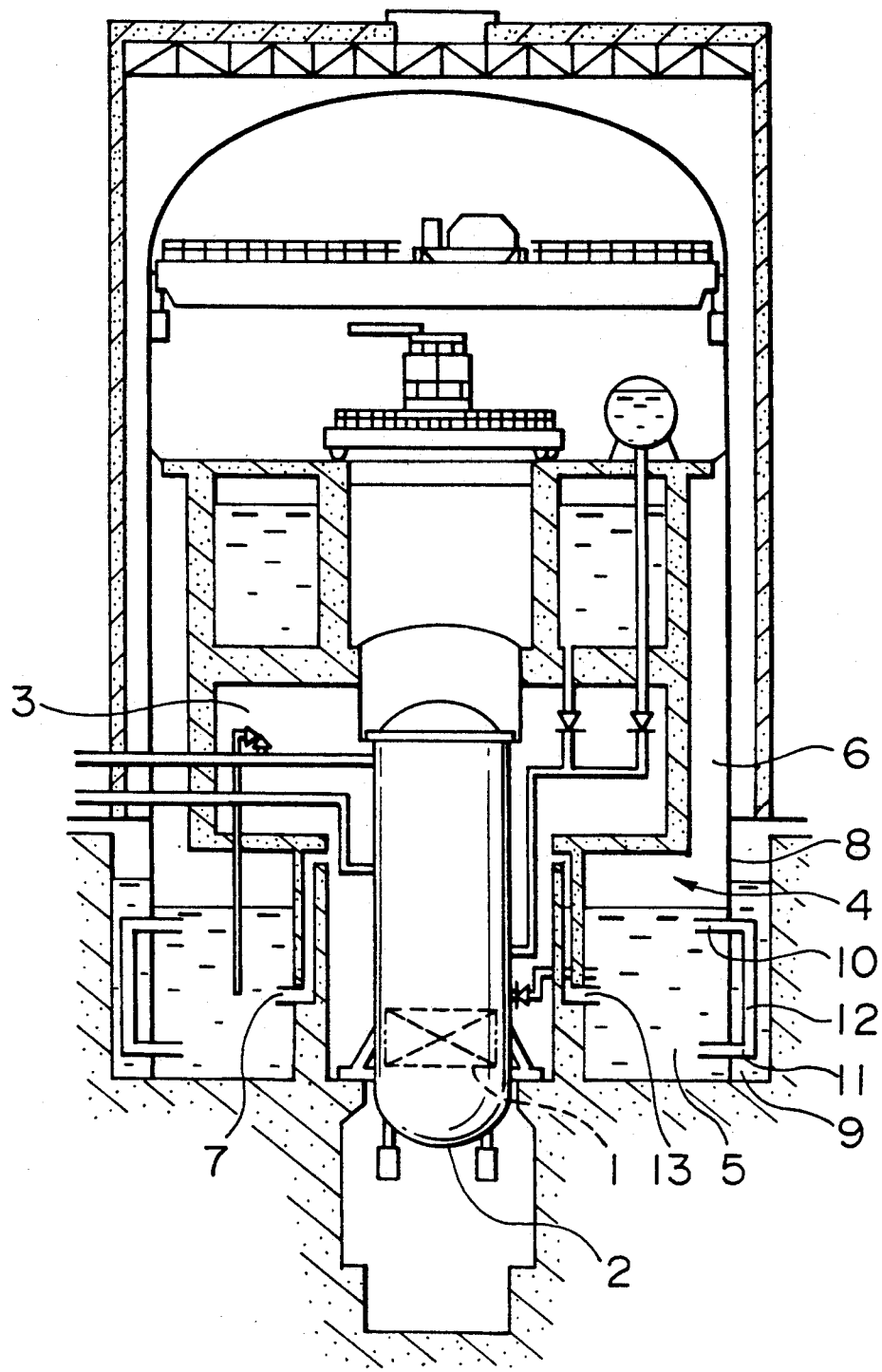
FIG. 7 is a longitudinal sectional view of a reactor containment facility in accordance with a third embodiment of this invention.

A third embodiment of this invention will be described with reference to FIG. 7. This embodiment is featured by upper and lower openings 10 and 11, which are provided in that portion of the steel containment-vessel wall 8 which is in the suppression-pool water, such as to be positioned with the vent-pipe outlets 13 therebetween, the upper and lower openings 10 and 11 being connected with each other through a plurality of convection promoting pipes 12 provided in the outer peripheral pool 9. Apart from this, the main components of this embodiment are the same as those of the embodiment shown in FIG. 1. In this embodiment, the vent-pipe outlets 13 and the upper and lower openings 10 and 11 are positioned in such a manner that the difference in height between the upper openings 10 and the vent-pipe outlets 13 is larger than the difference in height between the vent-pipe outlets 13 and the lower openings 11.

In this embodiment, it is possible to release a large quantity of heat from the reactor containment vessel by the following principle: The steam discharged from the pressure vessel 2 into the dry well 3 at the time of a loss-of-coolant accident is introduced into the suppression pool 5 through the vent pipes 7 and condensed in the pool water. As a result, the temperature of that portion of the suppression-pool water which is above the vent-pipe outlets 13 is raised, and, by virtue of the convection in the pool formed by the heating due to the steam condensation at the vent-pipe outlets, that region of the pool water attains a uniform high-temperature condition. On the other hand, the temperature of that portion of the suppression-pool water which is below the vent-pipe outlets 13 is not raised at this time, with the result that a temperature stratification occurs at the height of the vent-pipe outlets. Here, the density condition in that portion of the suppression pool which is between the upper and lower ends of the convection promoting pipes 12 and the density condition in the convection promoting pipes 12, will be considered. That portion of the suppression pool which is above the vent-pipe outlets is at a relatively high temperature and has a small density, whereas that portion thereof which is on the side of the convection promoting pipes is at a relatively low temperature and has a large density. As a result, the water head (production of density and height: $\rho g\ h$) at the lower end of the section being considered is larger on the side of the convection promoting pipes, so that a circulation is formed which flows downwards through the convection promoting pipes 12 to enter the suppression pool. This causes the high-temperature water of the upper portion of the suppression pool to enter the upper section of the convection promoting pipes; since, however, the convection promoting pipes are immersed in the outer peripheral pool 9, which is at low temperature, heat dissipation takes place through the pipe walls, and the temperature of the water is gradually lowered as it flows downwards through the convection promoting pipes. Due to this action, a condition is constantly maintained in the section above the vent-pipe outlets 13 in which the density and, consequently, the water head, are larger on the convection-promoting-pipe side, thereby forming a drive power for the circulation flowing downwards through the convection promoting pipes. In the section below the vent-pipe outlets 13, on the other hand, the portion on the side of the convection promoting pipes first attains high temperature as a result of the circulation, so that the density (water head) condition is such as to cancel the above-mentioned drive power for circulation; however, by appropriately setting the position of the lower ends of the convection promoting pipes (i.e., by setting the position of the lower ends of the convection promoting pipes 12 at such a position as will not completely cancel the downward drive power formed in the upper section), it is possible to cause water at a relatively high temperature to flow into the region below the vent-pipe outlets while maintaining the circulation flowing downwards through the convection promoting pipes. By virtue of this action, the hot water which has flowed into the region below the vent-pipe outlets causes the water temperature of this region to be raised, which helps to eliminate the density (water head) condition which would cancel the drive force for circulation formed in the region below the vent-pipe outlets, thus promoting the circulation. By repeating the above action, the water temperature of the region below the vent-pipe outlets can be continuously raised. At this time, the water temperature of the region below the vent-pipe outlets is substantially the same as the temperature of the water flowing in at the lower ends of the convection promoting pipes, so that it does not become lower than the water temperature of the outer peripheral pool. As a result, pool water at a relatively high temperature is constantly circulated in that region of the suppression pool 5 which is below the vent-pipe outlets 13 and which is at low temperature, thereby increasing the region for absorbing heat from the reactor core 1, and, at the same time, making it possible to utilize not only the reactor-containment-vessel wall 8 corresponding to the suppression-pool region which is at high temperature, but also the walls of the convection promoting pipes 12, as the heat transfer surface through which heat is dissipated to the outer peripheral pool 9. Since it is normal for the convection promoting pipes 12 to have a diameter smaller than that of the reactor containment vessel, the convection promoting pipes can be arbitrarily provided without influencing the withstanding pressure of the reactor containment vessel, so that the heat transfer area can be augmented without changing the size or the withstanding pressure of the reactor containment vessel, thus increasing the quantity of heat that can be dissipated. Accordingly, this embodiment can be applied to a plant of a larger output power with a reactor containment vessel of the same principal dimensions, etc.

Next, the operation of this embodiment will be explained, partly repeating what has been described above. The steam discharged from the reactor pressure vessel 2 at the time of an assumed loss-of-coolant accident flows through the vent-pipe outlets 13 into the suppression pool 5 to be condensed in the pool water. The pool water portion which is around the steam openings 13 is heated by the latent heat generated during the steam condensation in the suppression pool 5, and the temperature of the pool water portion which is above the vent-pipe outlets 13 is raised in a substantially uniform fashion. As a result, the density in the section where the convection promoting pipes 12 are arranged is low in the suppression-pool water, which has attained high temperature, and high in the convection promoting pipes 12, which are at low temperature. Due to this difference in density, a flow descending in the convection promoting pipes 12 is generated, and suppression-pool water which is at high temperature passes through the upper openings 10 and enters the upper sections of the convection promoting pipes 12. The high-temperature water which has thus flowed in is cooled inside the convection promoting pipes 12, which are immersed in the outer-peripheral-pool water, and becomes gradually cooler as it descends therein. As a result, a flow descending in the convection promoting pipes 12 is constantly formed, without changing the density condition in the section where the convection promoting pipes 12 are arranged. And, as stated above, water at a temperature higher than that of the water temperature of the outer peripheral pool passes through the lower openings 11 and enters that region of the suppression pool 5 which is below the vent-pipe outlets 13, thereby warming that region.

FIGS. 8A and 8B show the temperature distribution and density distribution in the height direction of the suppression pool 5 and the convection promoting pipes 12 at a time after the occurrence of an assumed loss-of-coolant accident. Regarding the temperature, that section of the suppression pool 5 which is above the vent-pipe outlets 13 is at a uniformly high temperature due to the steam from the vent pipes; since the water is cooled in the convection promoting pipes 12, its temperature exhibits a linear reduction toward the lower end; and, as since water at the temperature of this lower end flows in, that region of the suppression pool 5 which is below the vent-pipe outlets 13 attains a temperature substantially equal to that. Here, the reason for the linear reduction in temperature in the convection promoting pipes 12 is that the diameter of the convection promoting pipes is uniform and that, consequently, the cooling in the outer peripheral pool is also uniform in the height direction. Further, the reason for making the water temperature of that region of the suppression pool 5 which is below the vent-pipe outlets 13 substantially equal to the temperature of the water which has flowed in is that the phenomenon in question is a gentle one which covers a long period and, consequently, can be treated as one of a quasi-constant nature. As is known, the density of water is in inverse proportion to the temperature thereof, so that, as shown in FIG. 8B, the density distribution is reverse to the temperature distribution shown in FIG. 8A.

As can be seen from the drawing, in the section above the vent-pipe outlets 13, the density on the side of the convection promoting pipes 12 is larger, so that the drive force (water head) in each of the convection promoting pipes 12 works such as to cause a downward flow therein. The sum total of these downward drive forces corresponds to the area of the triangle a formed by the density lines of the two regions in the drawing. In the section below the vent-pipe outlets 13, in contrast, the density on the suppression-pool side is larger, so that the drive forces in this section work such as to cancel the downward drive force generated in the upper section. If the sum total of the drive forces generated in the section below the vent-pipe outlets (i.e., the area of the triangle b formed by the density lines in the drawing) is smaller than the sum total of the drive forces generated in the upper section, the flow in the convection promoting pipes 12 is generally a downward one. That is, if, in the drawing, the area of the triangle a is larger than that of the triangle b, a general flow descending in the convection promoting pipes 12 is constantly formed, thus enabling the present means to operate effectively. It may be concluded from this that, in the case where, as in this embodiment, the configuration of the convection promoting pipes 12 and the cooling condition are both uniform, the condition for the present means to work effectively is that the difference in height between the upper openings 10 and the vent-pipe outlets 13 (L1 in the drawing) be larger than the difference in height between the vent-pipe outlets 13 and the lower openings 11 (L2 in the drawing).

Thus, the area of the heat transfer surface through which heat is transferred from the suppression pool 5 to the outer peripheral pool 9 is enlarged, thereby attaining an improvement in heat dissipation characteristic.

Figure 9:
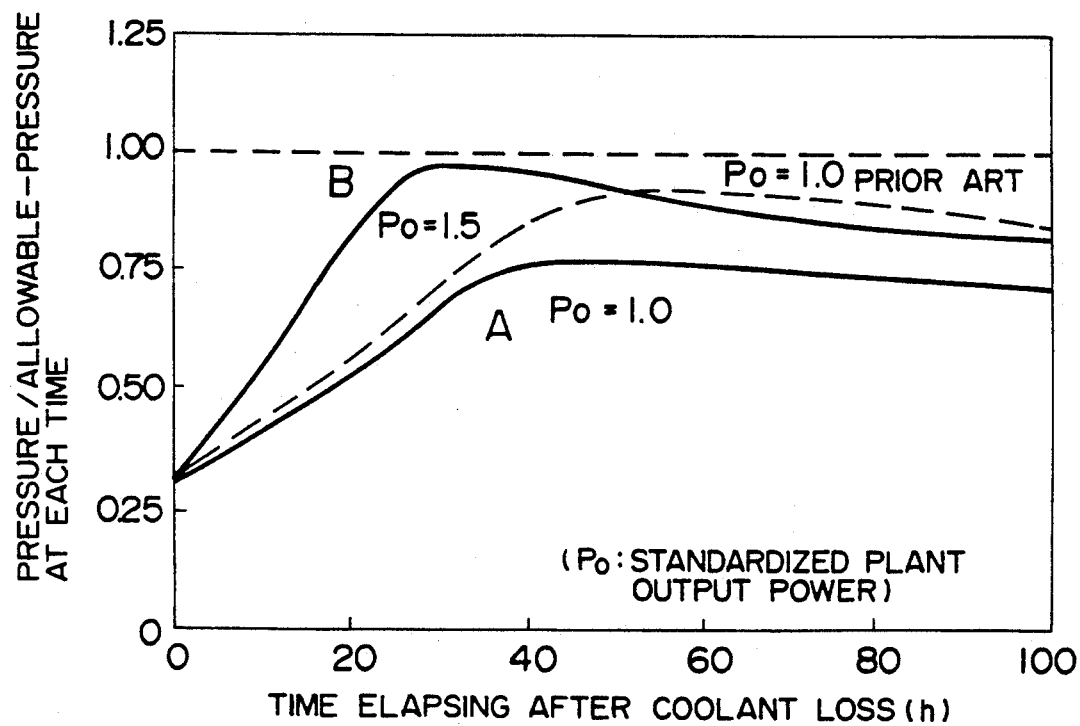
FIG. 9 is a graph showing the results of pressure analysis on a reactor containment vessel in accordance with the third embodiment.

The improvement in heat dissipation in this embodiment will be explained with reference to FIG. 9. In the drawing, changes in the containment-vessel pressure in process of time after the occurrence of an accident assumed in a case where this embodiment is applied, are, as in the case of FIG. 3, compared with those in a case where it is not. In the case where this embodiment is applied, which is represented by the solid lines in the drawing, it is assumed that approximately 500 convection promoting pipes 12 having a diameter of 50 mm are provided. Since the convection promoting pipes 12 can be arranged over the entire periphery of the containment vessel, no particular problem is involved in terms of practical application. In the case where a standardized plant output power of 1.0 is applied to this embodiment, the heat dissipation area is enlarged, as indicated by the solid line A in the drawing, so that the maximum pressure at the time of an assumed accident is lower than in the case where this embodiment is not applied (indicated by the broken line in the drawing). In correspondence with this reduction in pressure, this embodiment is more suitable for application to a plant of a larger output power. As indicated by the solid line B in the drawing, the applicable standard plant output power is 1.5; which means, this embodiment makes it possible to make the applicable plant output power 1.5 times larger.

Figure 10:
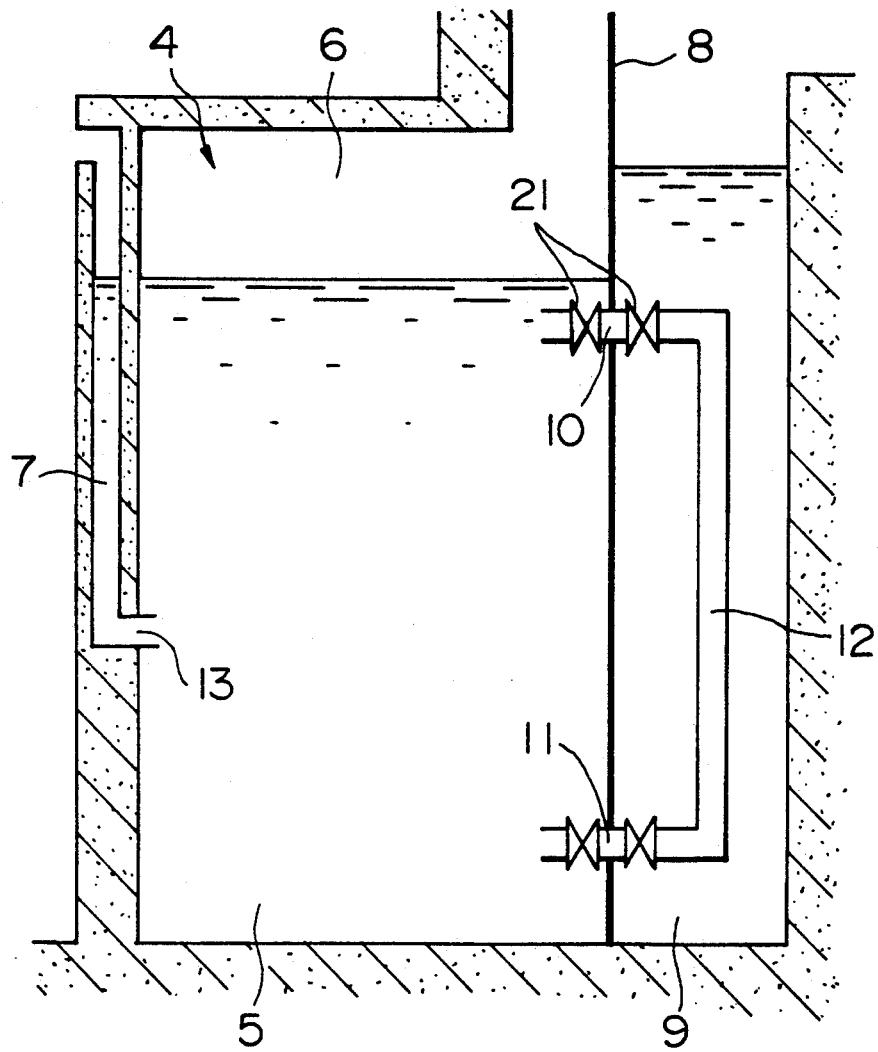
FIG. 10 is a longitudinal sectional view of a suppression chamber and an outer peripheral pool which are in accordance with a modification of the third embodiment.

A modification of the third embodiment will be described with reference to FIG. 10. This modification differs from the embodiment shown in FIG. 7 in that isolation valves 21 are provided on the outer and inner sides of the upper and outer openings 10 and 11 in the reactor-containment-vessel wall 8. FIG. 10 shows a part of this modification where the suppression pool and the outer peripheral pool are arranged. During normal operation, the isolation valves 21 are open; when performing periodical inspection, these isolation valves 21 are closed to isolate the reactor containment vessel from the convection promoting pipes 12, thereby facilitating maintenance operations, such as the replacement of the convection promoting pipes 12. Further, if, for some reason, a leak from the convection promoting pipes 12 should occur, the reactor containment vessel can be isolated more reliably by closing the isolation valves 21.

Figure 11:
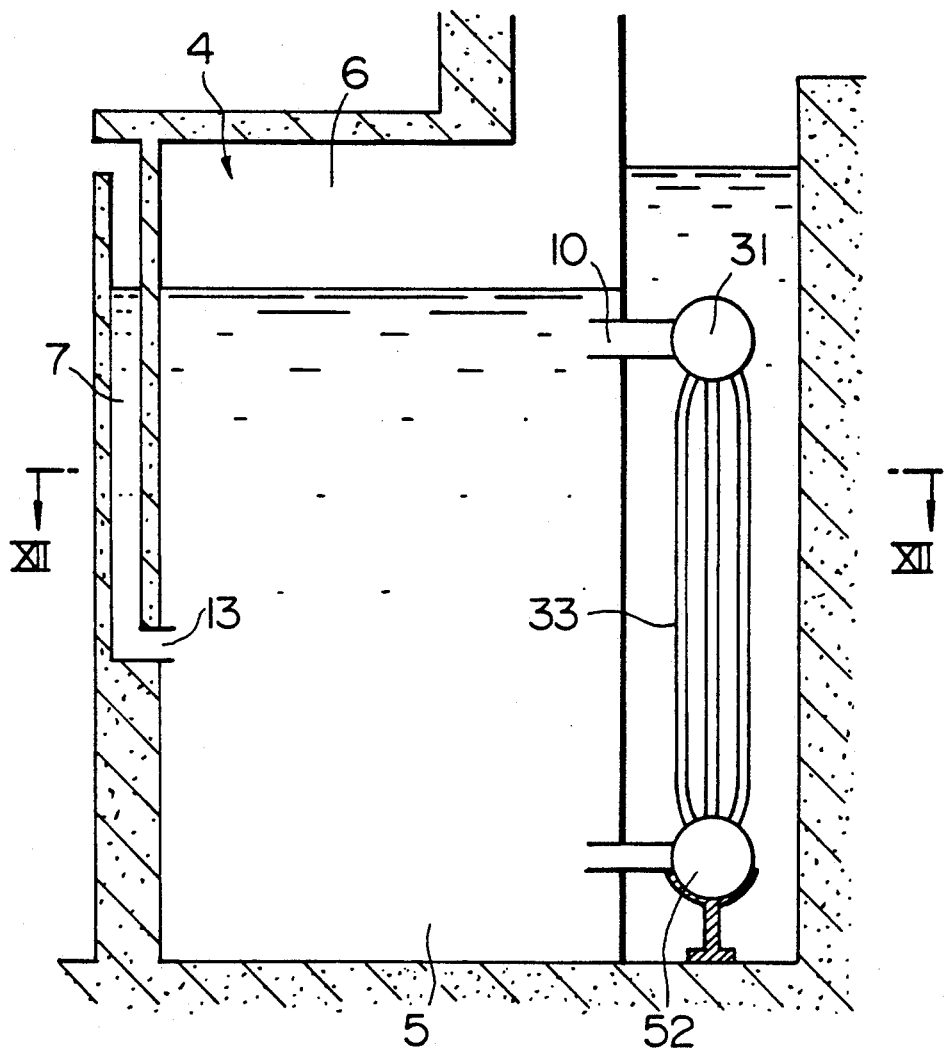
FIG. 11 is a longitudinal sectional view of a suppression chamber and an outer peripheral pool which are in accordance with another modification of the third embodiment.
Figure 12:
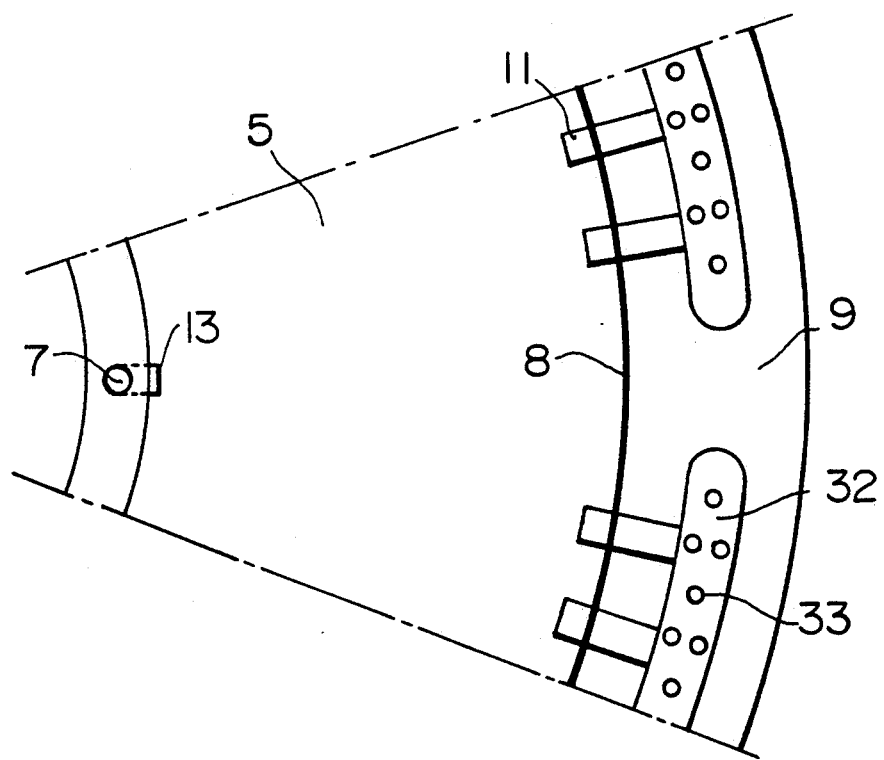
FIG. 12 is a sectional view taken along the line XII—XII of FIG. 11.

A still another modification of this embodiment will be described with reference to FIGS. 11 and 12. This modification differs from the above embodiments in that the convection promoting pipes are composed of upper header pipes 31 connected with the upper openings 10, lower header pipes 32 connected with the lower openings 11, and heat transfer pipes 33 connecting the upper and lower header pipes 31 and 32 with each other. FIG. 11 is a longitudinal sectional view showing a part of the suppression pool and the outer peripheral pool, and FIG. 12 is a cross-sectional view taken along the line A—A of FIG. 12. The water temperature in the upper header pipes 31 and that in the lower header pipes 32 are respectively made uniform by the water flowing in, so that the operation of this modification is the same as that of the above embodiment. This modification is advantageous in that the number of upper and lower openings 10 and 11 can be reduced, thereby attaining an improvement in terms of machinability and producibility. At the same time, by adjusting the diameter of the header pipes, it is possible to provide as many heat transfer pipes 33 as required, irrespective of the diameter of the reactor containment vessel. Further, by imparting a curved configuration to the heat transfer pipes 33, any expansion or contraction of the heat transfer pipes 33 due to temperature changes can be absorbed.

Figure 13:
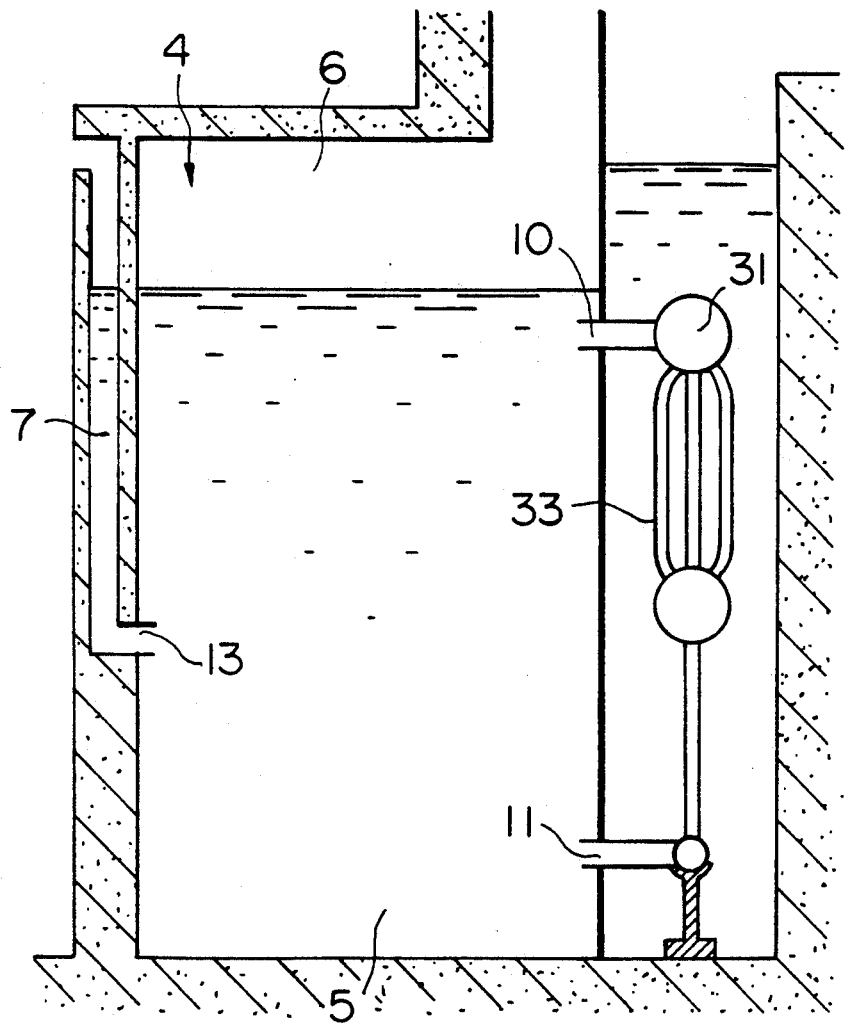
FIG. 13 is a longitudinal sectional view of a suppression chamber and an outer peripheral pool which are in accordance with still another modification of the third embodiment.

A further modification of this embodiment will be described with reference to FIG. 13. In this modification, the convection promoting pipes are divided into two sections: In the upper section, they are composed of upper header pipes 31 connected with the upper openings 10, lower header pipes 32, and a plurality of heat transfer pipes 33 connecting the upper and lower header pipes with each other; in the lower section, they are composed of the lower header pipes 32 and pipes 34 of a relatively large diameter which are less in number than the heat transfer pipes 33 and which connect the lower header pipes 32 with the lower openings 11.

FIGS. 14A and 14B show the temperature distribution and density distribution in the height direction in that section of the suppression pool and the convection promoting pipes which is between the upper and lower openings 10 and 11. In the case of this modification, the area of the contact surface with the outer peripheral pool is different between the upper and lower sections on the side of the convection promoting pipes, so that the cooling is effected to a larger degree in the upper section, which has a larger surface area. As a result, the temperature distribution in the convection promoting pipes is such that the temperature decreasing rate is high in the upper section and low in the lower section, with the density distribution being in correspondence therewith, as shown in the drawing. In this case, the generation of a drive force which would cancel the flow descending in the convection promoting pipes only occurs to a small degree, so that the lower openings 11 can be provided at a lower position as compared with the case of the embodiment shown in FIG. 7. Due to this arrangement, the region which can be effectively utilized can be enlarged in that section of the suppression pool 5 which is below the vent-pipe outlets 13.

An embodiment which consists of a combination of the first and third embodiments will be described with reference to FIG. 15. Basically, this embodiment is a combination of the embodiments described with reference to FIGS. 5 and 7. In this embodiment, the allowable temperature for the suppression pool is raised by dividing the wet well into first and second spaces 61 and 62; and the heat dissipation area is enlarged by providing convection promoting pipes 12 in the region corresponding to the suppression pool. Further, for the purpose of cooling the second space 62 of the wet well, there are provided a wet well cooling pool 41 which is separate from the outer peripheral pool 9 and a ring-like structure 42, thereby attaining an improvement in terms of the withstanding pressure of the vessel during normal operation and the ease with which it is built and maintained. As for the improvement in heat dissipation characteristic, the rise in the allowable temperature for the suppression pool and the enlargement of the heat transfer area are combined with each other to make it possible to make the applicable plant output power 2.3 times larger (i.e., to realize an established standard plant output power of 2.3), as shown in FIG. 16.

It is known from a presentation in the "Fall Meeting of the Atomic Energy Society of Japan in the Year 1989", mentioned in connection with the prior art, that an enlargement of the high-temperature region of the suppression pool can be realized by providing a convection promoting plate in the suppression pool. An embodiment which consists of a combination of this technique and the first embodiment will be described with reference to FIG. 17. In this embodiment, a convection promoting plate 70 is arranged in the suppression pool 5 of the embodiment shown in FIG. 1, along the reactor-containment-vessel wall 8. As stated in the above-mentioned presentation, this convection promoting plate 70 is arranged such that the vent-pipe outlets 13 are situated between the upper and lower ends of this plate, with the difference in height between the upper end and the vent-pipe outlets 13 being larger than the difference in height between the vent-pipe outlets 13 and the lower end, whereby the high-temperature region of the suppression pool is enlarged. According to this embodiment, the high-temperature region of the suppression pool is enlarged by the action of the convection promoting plate 70, and, though restricted to the section of the reactor-containment-vessel wall 8, the heat dissipation area can be enlarged. At the same time, the noncondensing gas in the wet well 6 can be concentrically collected in the second space 62, so that the allowable temperature for the suppression pool can be raised. Thus, with the enlargement of the heat dissipation area and the increase in temperature difference between the pools, it is possible to attain an enhancement in heat dissipation characteristic.

The above-described basic embodiments can also be applied to a plant whose reactor-containment-vessel wall is mainly formed of concrete by forming that region thereof which corresponds to the suppression pool and the wet well as a steel wall 8, which is a good conductor of heat. In this embodiment, the wall outside the outer peripheral pool 9 constitutes the principal structure wall of the building, so that, if the reactor-containment-vessel wall, which has conventionally been formed of concrete, is formed as a steel wall 8, no serious problem is involved in terms of the strength of the building. In this embodiment, the wet well in the suppression chamber, which is partly formed by the steel reactor-containment-vessel wall 8, is divided into first and second spaces 61 and 62, and convection promoting pipes 12 are provided on that portion of the steel reactor-containment-vessel wall 8 which is in the suppression pool. Further, a wet-well-cooling-water pool 41, which is in contact with the outer periphery of the reactor-containment-vessel wall 8, is provided as a cooling means for the second space 62, with a circumferential ring-like structure 42 being provided on the inner periphery of the reactor-containment-vessel wall 8 of the wet well 6. By virtue of this arrangement, the allowable temperature for the suppression pool is raised, and the area of the heat dissipation surface through which heat is dissipated to the outer peripheral pool 9 is enlarged.

Figure 6:
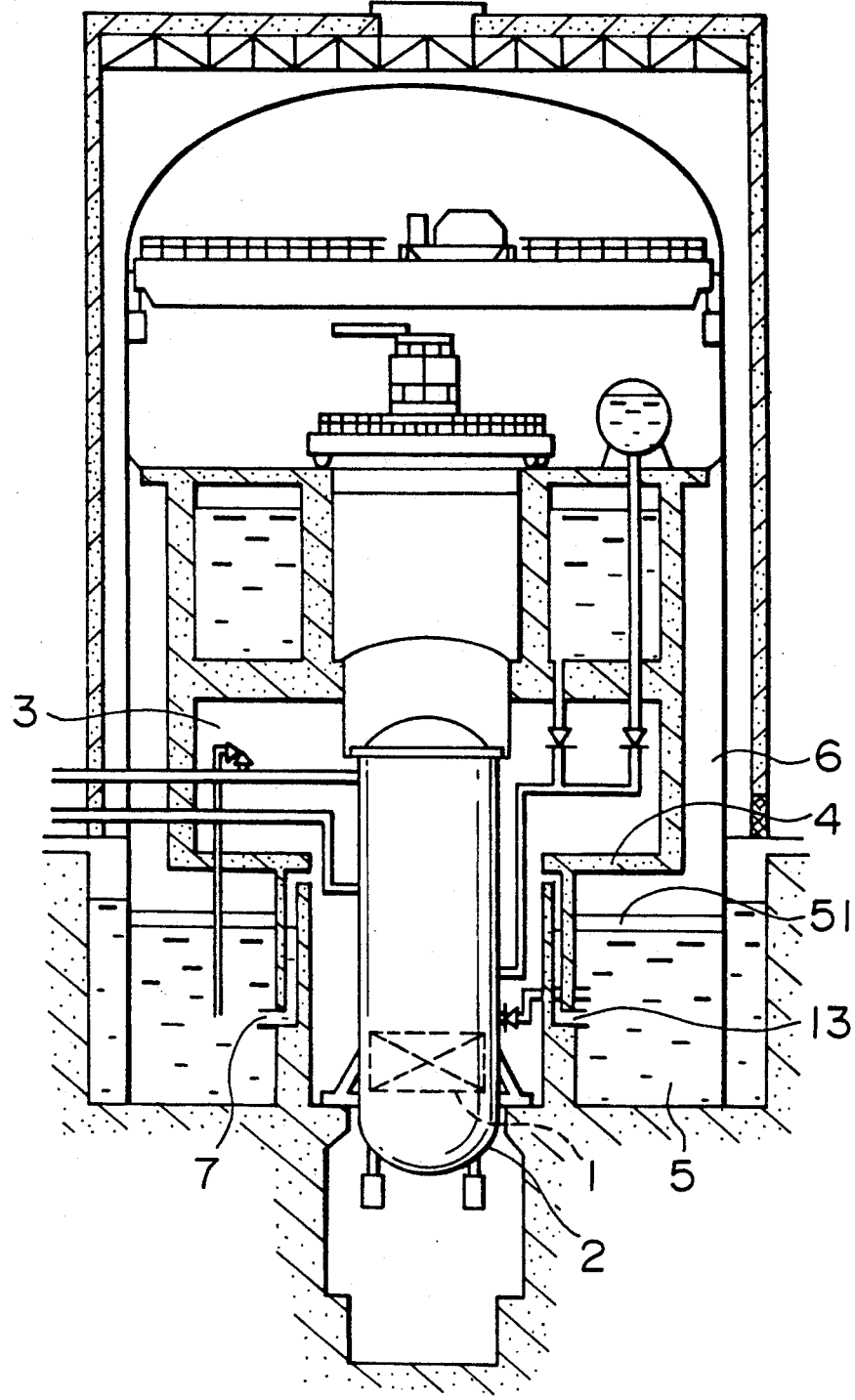
FIG. 6 is a longitudinal sectional view of a reactor containment facility in accordance with a second embodiment of this invention.
Figure 15:
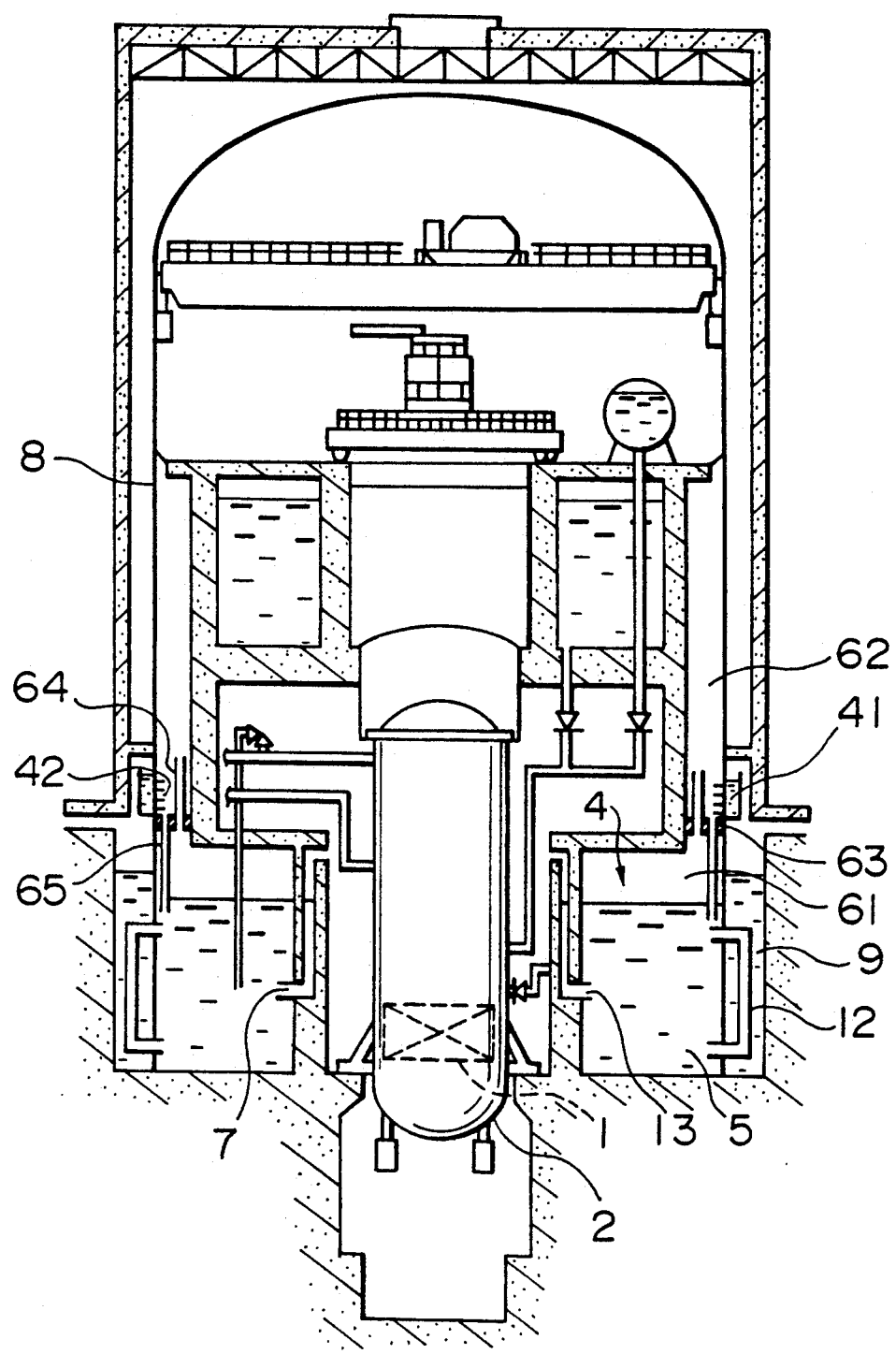
FIG. 15 is a vertical sectional view of a reactor containment facility in accordance with an embodiment which consists of a combination of the embodiments shown in FIGS. 5 and 7.
Figure 16:
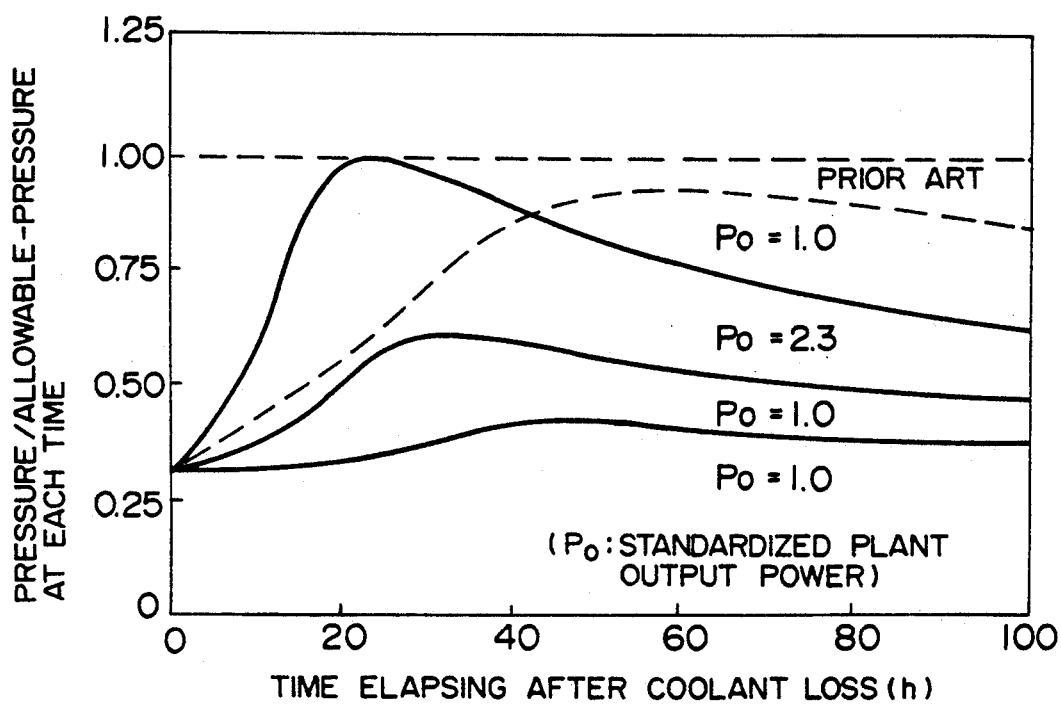
FIG. 16 is a graph showing the results of pressure analysis on a reactor containment vessel in accordance with the embodiment of FIG. 15.
Figure 17:
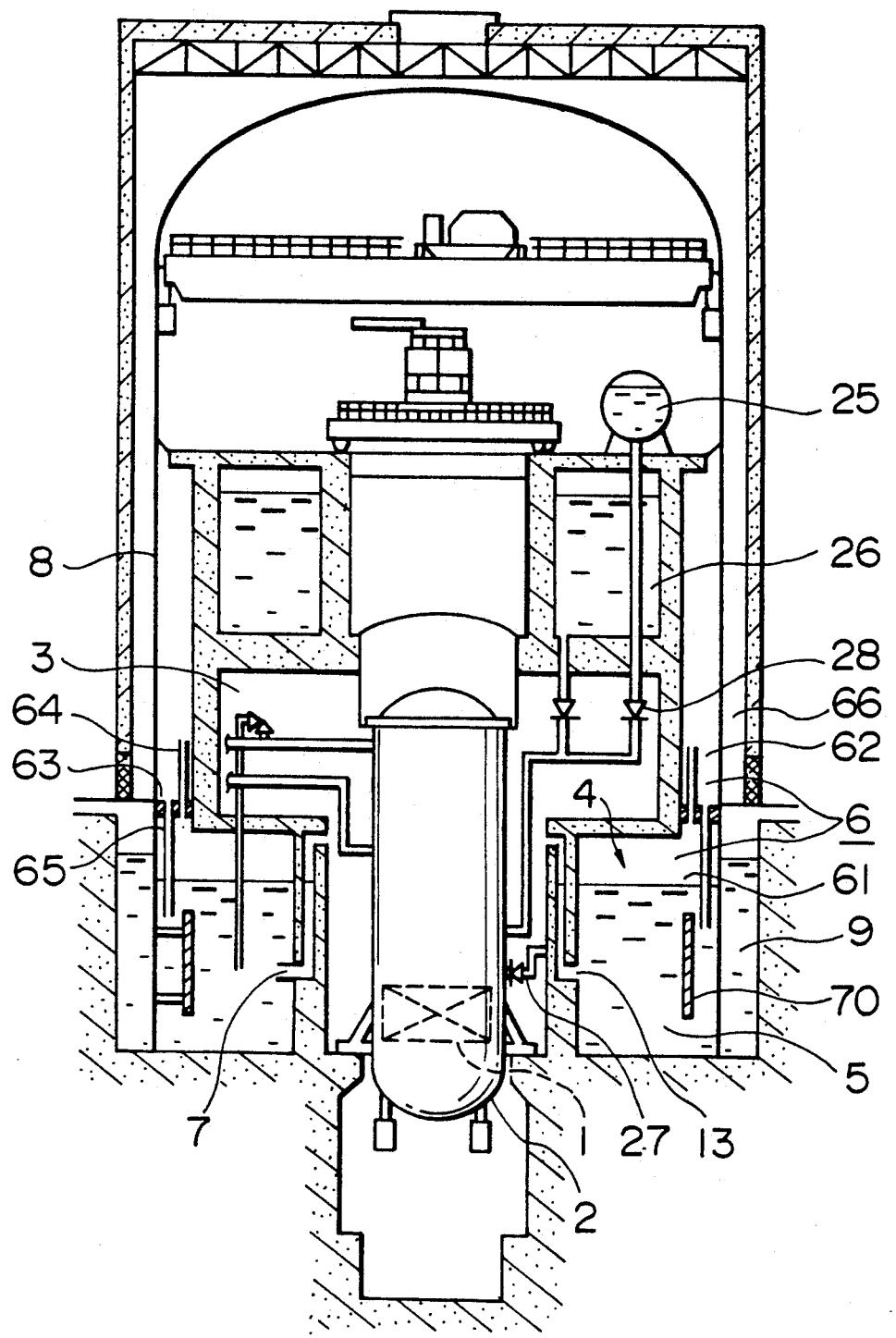
FIG. 17 is a longitudinal sectional view of a reactor containment facility consisting of the embodiment of FIG. 1 with a convection promoting plate incorporated into it.
Figure 18:
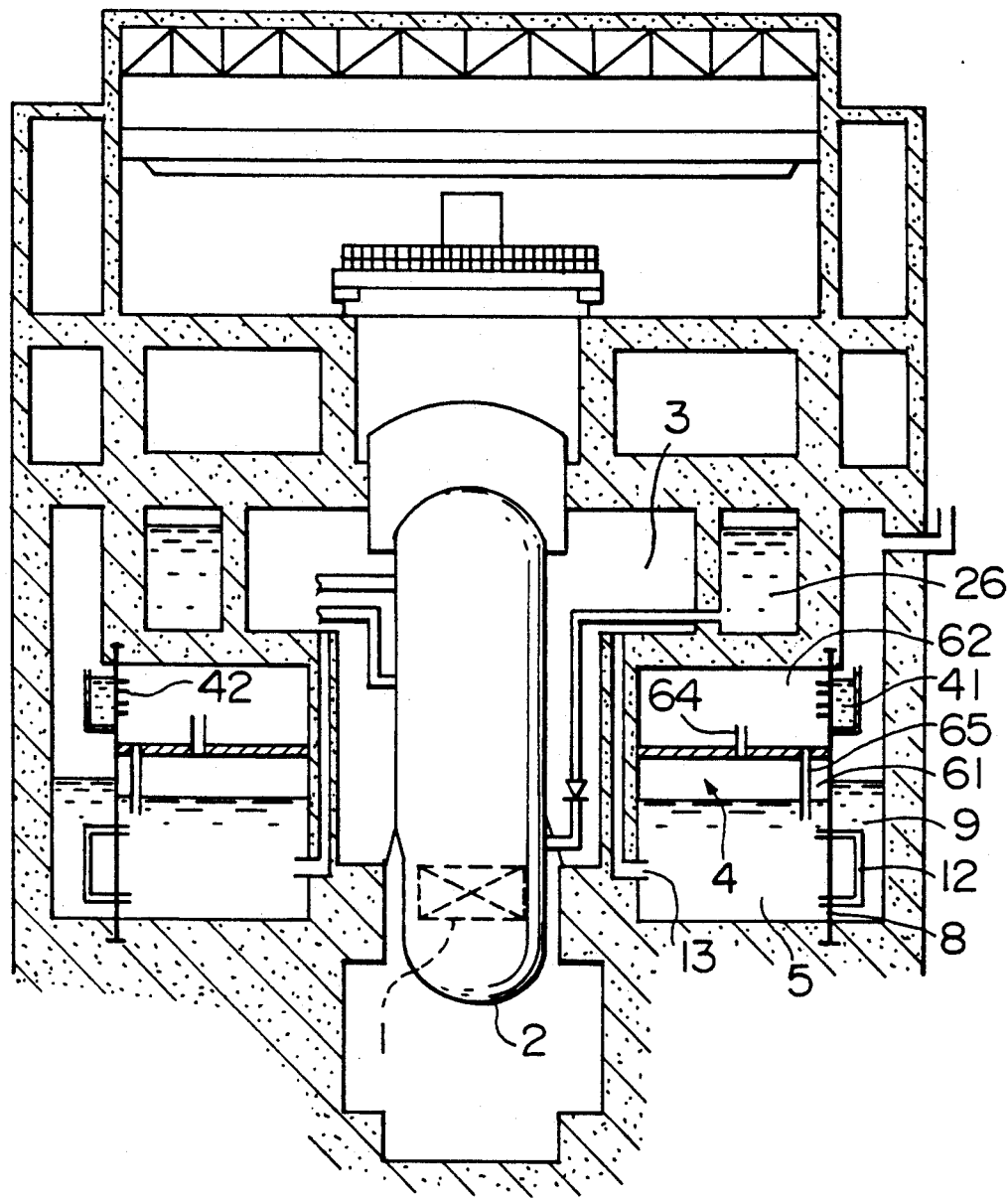
FIG. 18 is a longitudinal sectional view of a reactor containment facility consisting of the first and third embodiments incorporated into a concrete containment vessel.

While typical combinations of the different means have been presented, it is also possible realize other various combinations such as combinations of the embodiment shown in FIG. 6 similar to the examples shown in FIGS. 15, 17 and 18; such combinations do not involve any problems due to mutual interference in terms of practical application or effect.

A fourth embodiment of the present invention will be described with reference to FIG. 19.

Figure 19:
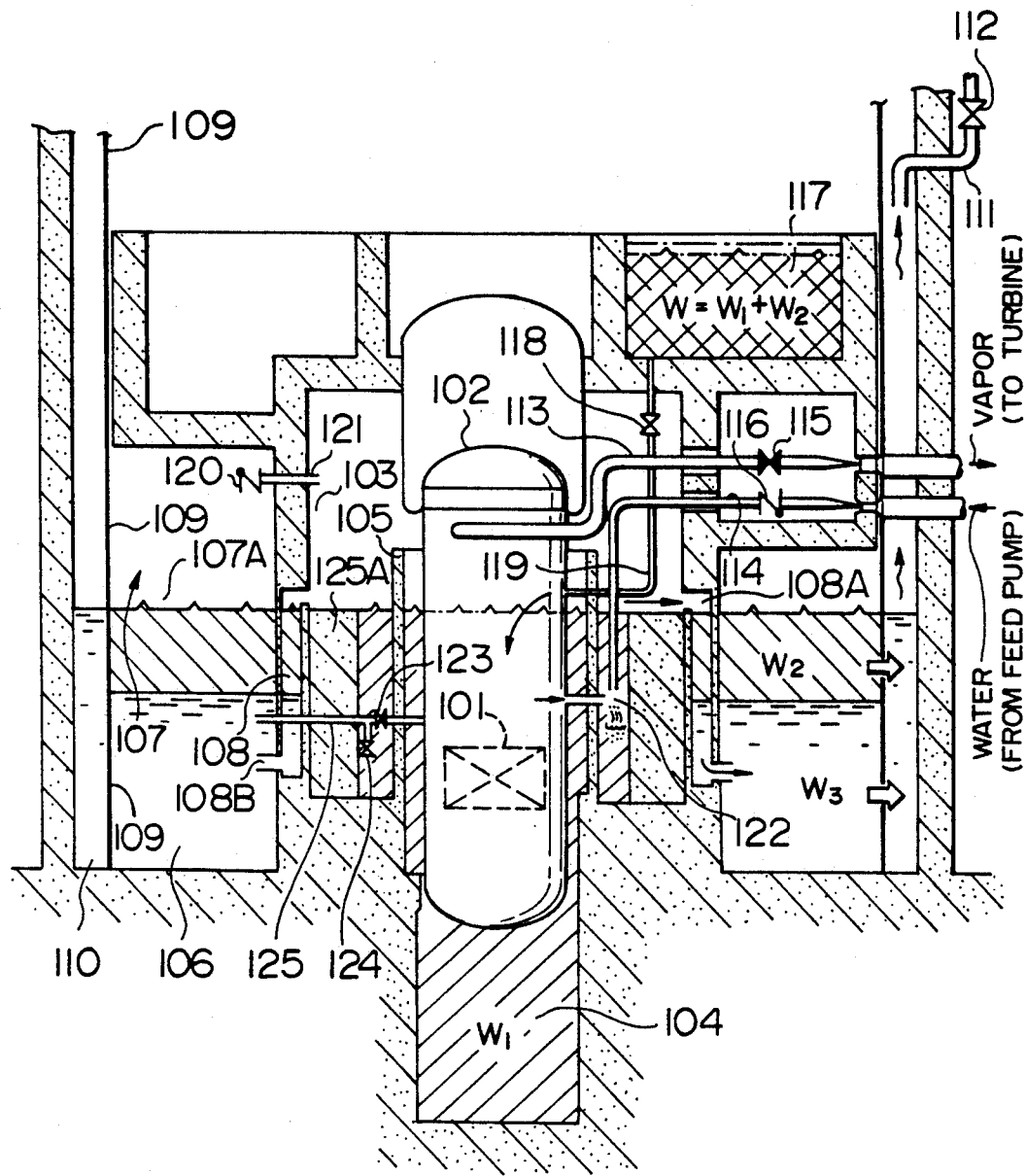
FIG. 19 is a longitudinal sectional view of a reactor containment facility in accordance with a fourth embodiment of this invention.

Referring to FIG. 19, a reactor containment vessel of natural cooling type contains a nuclear reactor pressure vessel 102 which accommodates a nuclear reactor core 101 and which is disposed in a dry well 103. The dry well 103 communicates with a CRD chamber 104 which is below the reactor pressure vessel 102 via the internal space of a gamma shield 105. A suppression chamber 107 having a suppression pool 106 is and wet well 107A above the suppression pool 106 disposed outside the dry well 103. The dry well 103 and the suppression pool 106 communicate with each other through a plurality of vent pipes 108. The level of the openings 108A of the vent pipes 108 opening to the dry well 103 is determined in conformity with the core submerging level which is set above the reactor core 101. The discharge opening 108B of the suppression pool 106 is set to a level which is at a suitable depth in water which is determined on the basis of the results of a steam condensation test.

The term "core submerging level" is used to mean the level which is reached by the water rushing from the nuclear reactor pressure vessel 102 into the dry well 103 in the event of a loss-of-coolant accident and which is high enough to ensure submerging cooling of the reactor core 101. Therefore, when the water level in the dry well has reached the core submerging level, the water starts to flood from the dry well into the suppression chamber 107 through the vent pipes 108, with the result that the water level rises in the suppression pool 106. The submerging level should be determined in consideration of factors such as the construction of the reactor pressure vessel, power of the nuclear reactor, and so forth. Practically, however, the submerging level is higher than the upper end of the reactor core 101 in the reactor pressure vessel by s suitable safety margin which is determined by possible fluctuation of the water level. For instance, the submerging level is set to be at least 50 cm higher than the upper end of the reactor core 101.

The containment vessel wall 109 made of steel serves as the outer wall which defines the radially outer end of the suppression pool 106 and the suppression chamber 107. The wall 109 is surrounded by a outer peripheral pool 110 The outer peripheral pool contains water to a level which high enough to measure itself with the depth of water in the suppression pool 106 after an accident, in order to ensure efficient transfer of heat from the suppression pool 106. A relief pipe 11 with a valve 112 leads from a space above the water surface in the outer peripheral pool 110, in order to relieve steam which is generated due to a temperature rise of the water in the pool 110 in the event of an accident.

The steam which is generated in the reactor pressure vessel 102 is transmitted through a main steam pipe 113 into a turbine (not shown) and is liquefied by condensation so as to be finally returned to the reactor pressure vessel 102 via a feedwater pipe 114. In case of an emergency, a main steam isolation valve (MSIV) 115 is closed and a check valve 116 in the feedwater pipe 114 prevents coolant in liquid or liquid/vapor mixed phase from flowing backward out of the reactor pressure vessel 102. However, in the event of a rupture taking place in a portion of the main steam line upstream of the MSIV 115 or in a portion of the feedwater line downstream of the check valve 116, the coolant would undesirably be allowed to flow from the reactor pressure vessel 102 into the dry well 106 so as to expose the reactor core 101, resulting in a serious accident, i.e., a loss-of-coolant accident. In order to obviate this problem, an injection line 119 having a valve 118 is provided for the purpose of injecting water from a pressure accumulator water tank 117 into the reactor pressure vessel 102.

Several types of water injection system using such a pressure accumulator water tank 117 are usable. For instance, the water in the pressure accumulator water tank 117 may always be pressurized. In another type, the pressure accumulator water tank 117 is brought into communication with the vapor space in the reactor pressure vessel 102 through a specific line only when the injection is required, so that water can flow into the reactor pressure vessel as a result of the difference in the water head between the pressure accumulator water tank 117 and the reactor pressure vessel 102. In still another type of the injection system, the internal pressure of the reactor pressure vessel 102 is relieved and reduced through a relief safety valve (not shown) and then introduced into the pressure accumulator water tank 117 so as to drive the water therefrom into the reactor pressure vessel 102. All these injection systems do not require any specific power source such as a pump and are operable just through a simple valve actuation. In the drawings, therefore, only the pressure accumulator water tank 117, the valve 118 and the injection line 119 are shown. Needless to say, an injection system employing a pump may be used equally, provided that the required injection rate is ensured.

The quantity W of water stored in the pressure accumulator water tank 117 is determined to be substantially equal to the sum of the water quantity W1 in the dry well 103 necessary for building up the water column up to the aforementioned submerging level and the water quantity W2 necessary for accumulating the water in the suppression pool 106 up to the submerging level, i.e., the level of the openings 108A of the vent pipes 108 opening in the dry well 103. That is, the condition of $W = W1 + W2$ is substantially met. Under this condition, the water level in the suppression pool 106 can rise up to the same level as the submerging level in the dry well, thus maximizing the area of heat transfer between the suppression pool 106 and the outer peripheral pool 110.

The suppression chamber 107 and the dry well 103 communicate with each other through a communication pipe 121 having a check valve 120 which permits fluid to flow only in a predetermined direction, i.e., from the suppression chamber 107 into the dry well 103.

A communication line 125 with valves 123, 124 is provided in order that the submerging water level is maintained both in the reactor pressure vessel 102 and the dry well 103 for a long time after the occurrence of the accident.

In this embodiment, a structure 125A of, for example, concrete is placed to fill a vacant space around the outer wall of the dry well 103 up to a level below the level of the openings 108A of the vent pipes 108 in the dry well 103, in such a manner as not to cause impediment to works such as installation and periodical survey. This arrangement enables the water level in the dry well 103 to rise up to the submerging level in a shorter time and also to reduce the internal volume of the pressure accumulator water tank 117, because the dead space which may otherwise be filled with water is filled by the concrete structure.

In the event of a rupture of the feedwater line 114, the coolant in liquid/vapor mixed phase is discharged from the interior of the reactor pressure vessel 102 into the dry well 103 through the fracture 122. The liquid phase portion of the hot coolant thus discharged flows into the CRD chamber 104 which is below the dry well 103 to raise the water level in this chamber 104. Meanwhile, the vapor phase portion of the coolant raises the pressure inside the dry well 103, which lowers the water level in the vent pipes 108 to allow the atmosphere in the dry well 103 to be transferred to the suppression chamber 107 through the water in the suppression pool 106. Since the vapor phase portion of the discharged coolant is condensed into liquid phase through the contact with the water in the suppression pool 106, only the air from the dry well 103 reaches the suppression chamber 107, with the result that the pressure rises in the suppression chamber 107. The nuclear reactor automatically stops in response to the rise in the internal pressure of the dry well 103 or the lowering of the water level in the reactor pressure vessel 102. At the same time, the MSIV 115 is closed to terminate the supply of steam. Supply of the condensate feedwater through the feedwater line also is stopped. Then, the valve 118 is opened to allow injection of water into the reactor pressure vessel 102 from the pressure accumulator water tank 117 so as to recover the water level in the reactor pressure vessel, thereby preventing damage to the reactor core which may otherwise be caused by overheat.

The water injected into the reactor pressure vessel 102 is heated to a high temperature by the decay heat derived from the reactor core 1 and rushes into the dry well 103 through the fracture 122, so that the water level in the CRD chamber 104 which is below the dry well 103 rises. A further rise of the water level in the CRD chamber 104 causes the water to flood into the dry well 103 to raise the water level therein nearly to the level of the openings 108A of the vent pipes 108. The discharge of hot water from the rupture continues further, so that hot water is introduced into the water in the suppression pool 106 from the dry well 103 via the vent pipes 108, causing both the level and temperature of the water in the suppression pool 106 to be raised. When the water level has been raised to a level near the level of the openings 108A of the vent pipes 108 in the dry well 102, the pressure accumulator water tank 117 becomes almost empty and the discharge of water through the fracture 22 is ceased. As a result, the rise in the water level inside the suppression pool 106 also ceases. The rise of the water level in the suppression pool 106 tends to cause a rise of the pressure inside the suppression chamber 107. This, however, does not hinder the rise of the water level in the suppression pool 106, because the check valve 120 is opened by the pressure differential between the suppression chamber 107 and the dry well 103, so that air returns from the suppression chamber 107 into the dry well 103 to attain a pressure equilibrium therebetween.

As a result of the rise of the water level in the suppression pool 106, heat is transferred from the suppression pool 106 to the outer peripheral pool 110 through the steel wall 109 of the containment vessel. As a consequence, the water in the outer peripheral pool 110 is boiled to generate vapor. The vapor is then relieved to the exterior through the relief pipe 111 by forcibly opening the valve 112.

When the water injection from the pressure accumulator water tank 117 is ceased, water levels which are almost the same are attained in the reactor pressure vessel 102, dry well 103 and in the suppression pool 106.

Generation of decay heat inside the reactor core 101 progressively decreases but is still effective in heating and evaporating water inside the reactor pressure vessel 102. Consequently, the pressure inside the reactor pressure vessel 102 continues to rise as a result of generation of heat. A further rise of the internal pressure of the reactor pressure vessel 102 due to generation of vapor causes the vapor to be relieved through a relief safety valve (not shown) or to be discharged together with hot water into the dry well 103 through the fracture. Consequently, the pressure rises in the dry well 103, which serves to lower the level of water in the vent pipes 108, so that the vapor component is discharged into the suppression pool 106 to be condensed into liquid phase through contact with the water in the pool 106. The heat given to the water as a result of the condensation is transferred to the water in the outer peripheral pool 110 so as to be dissipated therefrom.

Meanwhile, the level of the water inside the reactor pressure vessel 102 tends to progressively come down as a result of the evaporation. However, the valve 123 is opened when the reduction of the water level is sensed so that the water flows from the suppression pool 106 into the reactor pressure vessel 102 due to the difference in the water head, whereby the water level is recovered in the reactor pressure vessel 102. By opening the valve 124 simultaneously with the opening of the valve 123, it is possible to maintain the same submerging level in the reactor pressure vessel 102, dry well 103 and the suppression pool 106.

As will be understood from the foregoing description, the embodiment shown in FIG. 19 appreciably shortens the time required for the dry well 103 to be filled with water up to the submerging level in the event of an accident. In addition, submerging cooling of the reactor core can be started quickly because the water level in the suppression vessel 106 can be raised to the highest level without causing the openings 108A of the vent pipes 108 to be flooded by the water. Furthermore, the transfer of heat from the dry well 103 to the suppression pool 106 can be promoted by virtue of condensation of vapor component in contact with the water inside the suppression pool 106, partly because the upper hot portion of the water column in the dry well 103 first moves into the suppression pool 106 and partly because the water in the vent pipes 108 can easily be displaced as the time elapses to allow vapor component to flow from the dry well 103 into the suppression pool 106. In addition, transfer of heat from the suppression pool 106 to the outer peripheral pool 110 is promoted, because a large heat transfer area, as well as a large temperature differential, is provided between the water inside the suppression pool 106 and the water inside the outer peripheral pool 110.

Thus, the fourth embodiment described in connection with FIG. 19 performs quick and efficient cooling of the reactor core, as well as efficient transfer of heat from the dry well 103 to the suppression pool 106 and further to the outer peripheral pool 110 therefrom, thus offering a remarkable improvement in the safety of the natural cooling type reactor core containment vessel.

It is also to be noted that this embodiment makes it possible to set the initial water level in the dry well 103 to a level which is lower than that in existing equipment, which, in combination with the use of the structure 125A filling dead space inside the dry well 103, enables the capacity of the pressure accumulator water tank 117 to be reduced.

A fifth embodiment of the present invention will be described with reference to FIGS. 20 and 21.

Referring to these Figures, there is shown a natural cooling type reactor containment vessel having upper and lower suppression chambers. More specifically, a reactor pressure vessel 202 accommodating a reactor core 201 is placed in a dry well 203 which is surrounded by a lower suppression chamber 207 having a lower suppression pool 205 and a wet well 207A above the suppression pool 205. The dry well 203 and the lower suppression pool 205 are communicated with each other through a plurality of vent pipes 211.

An upper suppression chamber 206 provided on the upper side of the lower suppression chamber 207 has an upper suppression pool 204 which communicates with the dry well 203 through a plurality of vent pipes 208 and a wet well 206A above the suppression pool 204.

A water injection line 217 having a valve 216 leads from the upper suppression pool 204 to the reactor pressure vessel 202.

The steel wall 214 of the containment vessel serves also as an outer wall which defines the radially outer ends of the lower suppression pool 205 and the lower suppression chamber 207. This outer wall is surrounded by a containment vessel outer peripheral pool 215 which is filled with water up to a level high enough to cover the core submerging level of water inside the dry well. The term "submerged level" is used in the same sense as that explained in the description of the preceding embodiment. Namely, the core submerging level is a level which is higher than the top of the reactor pressure vessel 201 by a height, e.g., 50 cm, which provides a margin for fluctuation of the water level.

The quantity W of water in the upper suppression pool 205 is determined to be substantially equal to the sum of the water quantity W1 in the dry well 203 necessary for raising the water level therein to the aforementioned submerging level and the water quantity W2 which is required for raising the water level inside the lower suppression pool 205 to a level substantially equal to the aforementioned submerging level. That is, the condition of $W = W1 + W2$ is substantially met. As a consequence, the water level in the lower suppression pool 205 rises almost to the same level as the openings 212 of the vent pipes 211 opening to the dry well 212, so that the area for the transfer of heat from the lower suppression pool 205 to the outer peripheral pool 215 can be maximized.

Figure 20:
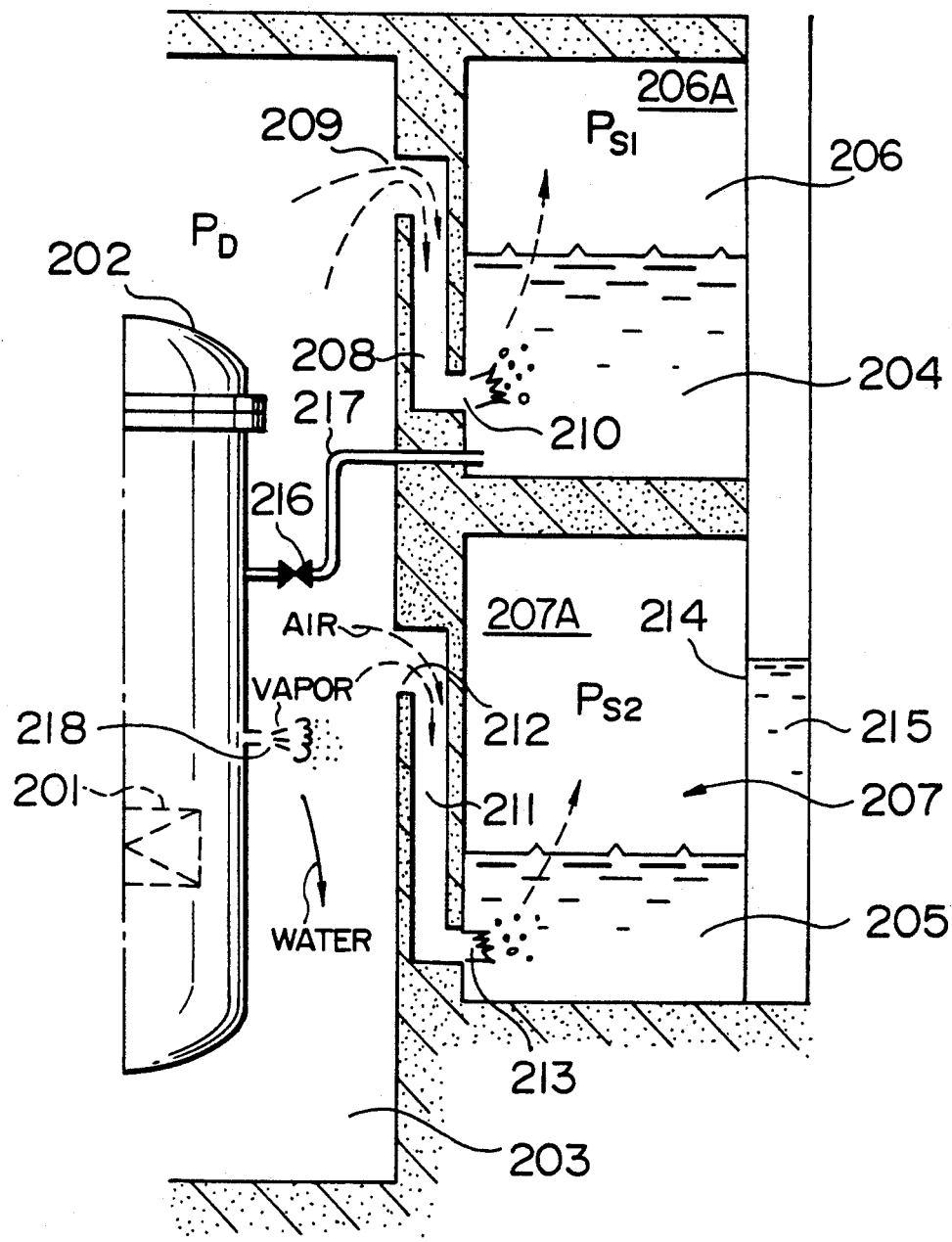
FIG. 20 is a longitudinal sectional view showing a reactor containment facility in accordance with a fifth embodiment of this invention in a condition immediately after the occurrence of an accident.
Figure 21:
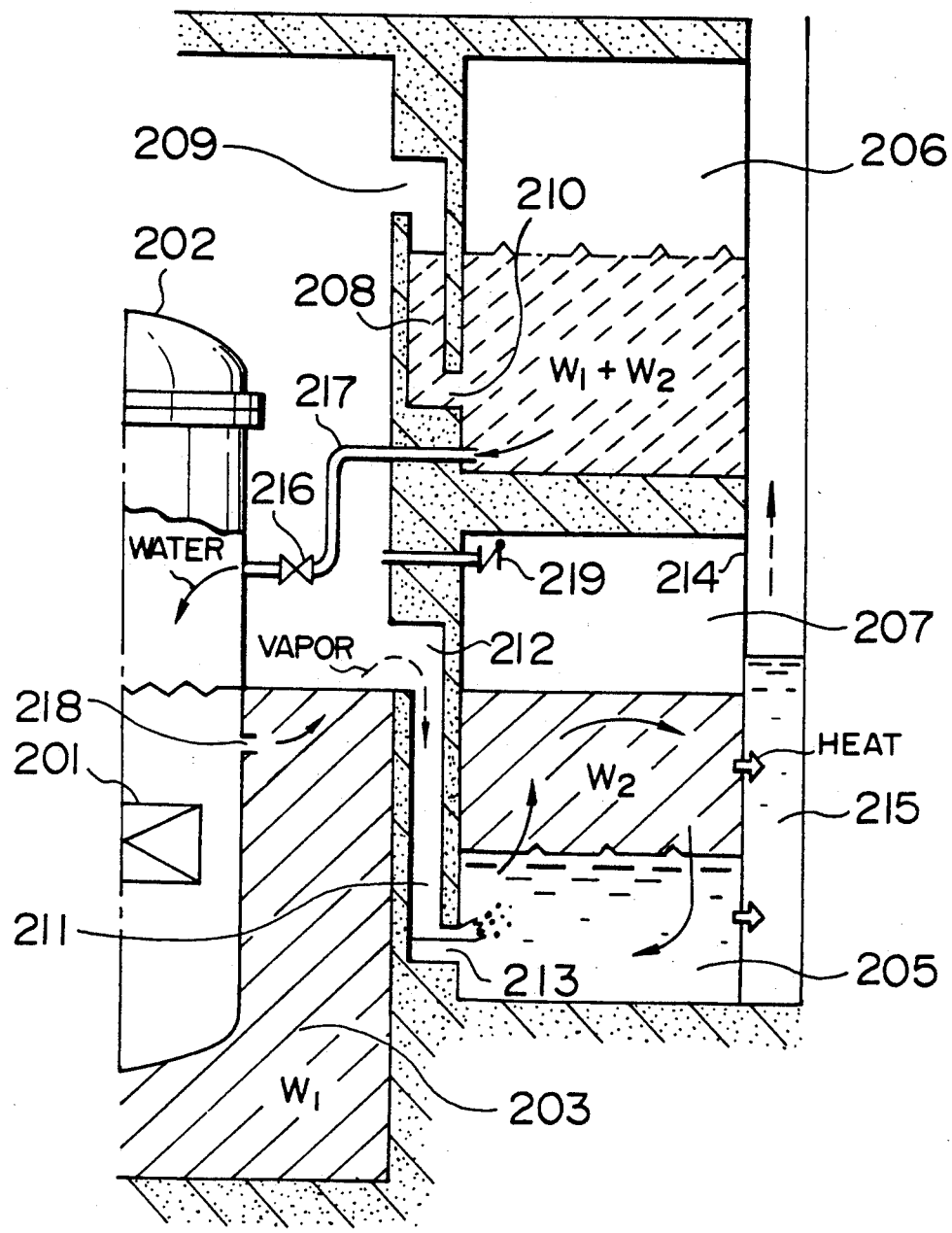
FIG. 21 is a longitudinal sectional view showing the reactor containment facility of FIG. 20 in a condition where a predetermined period time has elapsed after the occurrence of an accident.

Referring to FIG. 20, in the event of a rupture in a pipe which is directly connected to the reactor pressure vessel 202, a coolant in the form of a liquid/vapor mixed phase is discharged from the reactor pressure vessel 202 into the dry well 203. The liquid phase, i.e, water component, of the discharged hot coolant is accumulated on the bottom of the dry well 203, while the steam component of the same raises the pressure inside the dry well 203 so as to lower the water levels in the vent pipes 208, 211 Consequently, the atmosphere inside the dry well 203, composed of air and steam, is moved into the suppression chambers 206, 207 via the water in the respective suppression pools 204, 205. As the atmosphere passes through the water, the steam component of the same is condensed into liquid phase through contact with the water in the suppression pools 204, 205, so that only the air component of the atmosphere reaches the suppression chambers 206, 207 so as to contribute to the rise of the pressure in the suppression chambers 206, 207 and the dry well 203.

The nuclear reactor is automatically stopped and isolated when the rise of the pressure inside the dry well 203 or the lowering of water level inside the reactor pressure vessel 202 is sensed in the event of a rupture.

Only vapor phase is discharged from the fracture 218 after the water level inside the reactor pressure vessel has comedown below the level of the fracture 218. The pressure inside the reactor pressure vessel decreases accordingly. If the pressure does not decrease, a safety valve (not shown) operates to relief the pressure. When the pressure in the reactor pressure vessel has been lowered sufficiently, the valve 216 in the water injection line 217 leading from the upper suppression pool 204 is opened to allow injection of water into the reactor pressure vessel 202 thereby to cool the reactor core 201 by submerging.

The water injected into the reactor pressure vessel 202 is heated to a high temperature by the decay heat derived from the reactor core 201 so that hot water is discharged from the fracture 218 into the dry well 202.

As a consequence, the water level inside the dry well 202 is raised up to the level of the openings 212 of the vent pipes. As the discharge of hot water from the fracture 218 continues, hot water flows from the dry well 202 into the water in the lower suppression pool 205 via the vent pipes 211, causing rises of the water level and water temperature inside the lower suppression pool 205. The upper pressure suppression pool 204 becomes almost empty so that the discharge of hot water from the fracture 218 is materially ceased when the water level in the lower suppression chamber has been raised to the level of the openings 212 of the vent pipes. The rise of the water level in the lower suppression pool also is ceased accordingly. The rise of the water level inside the lower suppression pool 205 tends to cause a rise in the pressure inside the lower suppression chamber 207. This tendency, however, is canceled as the check valve 219 opens when the internal pressure of the lower suppression chamber 207 has become higher than that of the dry well 203, so as to attain a pressure equilibrium between the lower suppression chamber 207 and the dry well 203. The water level in the lower suppression chamber 205, therefore, can be raised without impediment.

As a result of the rise of the water temperature in the lower suppression pool 205, heat is transferred from the water in the lower suppression pool 205 to the water in the outer peripheral pool 215 through the steel wall 214 of the containment vessel, so that the water in the outer peripheral pool 215 is heated and evaporated to generate steam which is relieved to the exterior, so that the steel wall 214 of the containment vessel is cooled to and maintained at a certain temperature.

The water inside the reactor pressure vessel 202 progressively decreases as the time elapses. It is, however, possible to maintain a predetermined water level in the reactor pressure vessel, by providing a line (not shown) which interconnects the lower suppression pool 205 and the interior of the reactor pressure vessel 202 or a line (not shown) which interconnects a power portion of the dry well 203 and the interior of the reactor pressure vessel 202. In this regard, a reference be made to the communication line 125 with valves 123, 124 (see FIG. 19) or to a pressure equalizing system 313 which will be described later in connection with FIG. 23.

As will be seen from the foregoing description, the fifth embodiment offers the following advantages. In the event of an accident such as a rupture causing discharge of coolant into the dry well, the water component of the discharged coolant is accumulated on the bottom of the dry well but the steam component of the same is introduced via the upper and lower vent pipes 208, 211 into the upper and lower suppression pools 204, 205 so as to be condensed into liquid phase through contact wit water contained in these pools. This prevents overshoot of pressure rise in the dry well which may otherwise be caused due to flow resistance along the vent pipes immediately after the occurrence of the accident.

Furthermore, the time required for the water level inside the dry well 203 to reach the submerging level is shortened and the water level in the suppression pool 205 can be raised to the highest level without causing flooding of the openings 212 of the vent pipes 211 in the dry well 203. For these reasons, the submerge cooling of the reactor core can be commenced quickly. Furthermore, the transfer of heat from the dry well 203 to the suppression pool 205 can be promoted by virtue of condensation of vapor component in contact with the water inside the suppression pool 205, partly because the upper hot portion of the water column in the dry well 203 first moves into the suppression pool 205 and partly because for a long period of time the water in the vent pipes 211 can easily be displaced to allow vapor component to flow from the dry well 203 into the suppression pool 205. In addition, transfer of heat from the suppression pool 205 to the outer peripheral pool 215 is promoted, because a large heat transfer area, as well as a large temperature differential, is provided between the water inside the suppression pool 205 and the water inside the outer peripheral pool 215.

Thus, the fifth embodiment performs quick and efficient cooling of the reactor core, as well as efficient transfer of heat from the dry well 203 to the suppression pool 205 and further to the outer peripheral pool 215 therefrom, thus offering a remarkable improvement in the safety of the natural cooling type reactor core containment vessel.

The fifth embodiment offers an additional advantage in that, since the water required for suppression of pressure rise is stored partly in the upper suppression pool and partly in the lower suppression pool, the size of the suppression pools in terms of area or diameter can be reduced as compared with arrangements having only one suppression pool, provided that the depth of water in the pool is the same, which makes it possible to reduce the diameter of the containment vessel.

The described fifth embodiment may be modified such that water is initially charged only in the upper suppression pool 204 while the lower suppression pool 205 is kept empty. In such a modification, the water in the upper suppression pool 204 condenses and liquefied the vapor portion of the coolant discharged as a result of a rupture, while the lower suppression pool 207 directly receives the atmosphere of the dry well. Then, water is injected from the upper suppression pool 204 into the reactor pressure vessel 202, so that hot water is discharged from the fracture into the dry well 203 and then into the lower suppression chamber 207 so as to be accumulated in the lower suppression pool 205. Once the water level in the lower suppression pool 205 is raised above the level of the outlets 213 of the vent pipes 213, vapor component is steadily condensed by the water in the suppression pool 205 for a long time.

The merit of the fifth embodiment in regard to the reduction in the size of the containment vessel cannot be fully enjoyed with this modification because the area of the suppression pools cannot be reduced sufficiently. Reduction in the diameter of the containment vessel, however, is possible to a certain extent because the upper suppression pool 204 can be used as a water injection source which does not necessitate any additional equipment such as a pump and because the lower suppression pool 205 may be designed to have a smaller area than the upper suppression pool 204. In addition, the effect to cool the containment vessel is enhanced after the water level is raised in the lower suppression pool 205.

A sixth embodiment will be described with reference to FIGS. 22 to 27.

Figure 22:
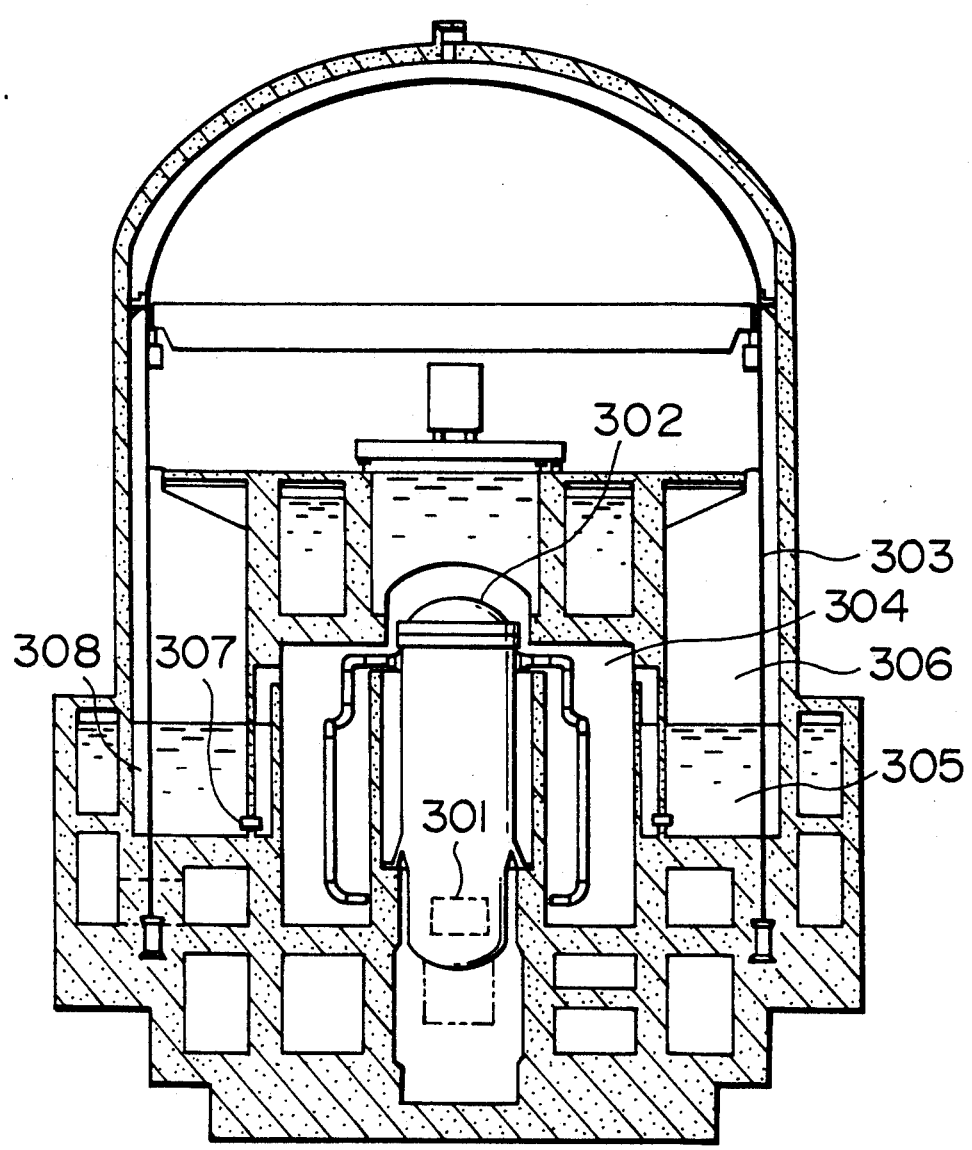
FIG. 22 is a longitudinal sectional view of a reactor containment facility in accordance with a sixth embodiment of this invention.

Referring to FIG. 22, a boiling water reactor has a pressure vessel 302 which accommodates a reactor core 301 and a containment vessel 303 which contains the pressure vessel 302. The containment vessel 303 has a dry well 302 and a suppression chamber 306. The dry well 302 receives the pressure vessel 302 and a primary line through which a fluid of high pressure and high temperature is circulated. The bottom portion of the suppression chamber 306 defines a suppression pool 305 with a wet well 306A being provided above the suppression pool 305. The dry well 304 and the suppressing pool 305 communicate with each other through a plurality of vent tubes 307 the lower ends of which are immersed in water.

The containment vessel 303 is made of a steel. In the event of a loss-of-coolant accident, decay heat is transferred to water in the suppression pool 305 and further to an outer peripheral pool 308 through the steel wall of the containment vessel 303.

Figure 23:
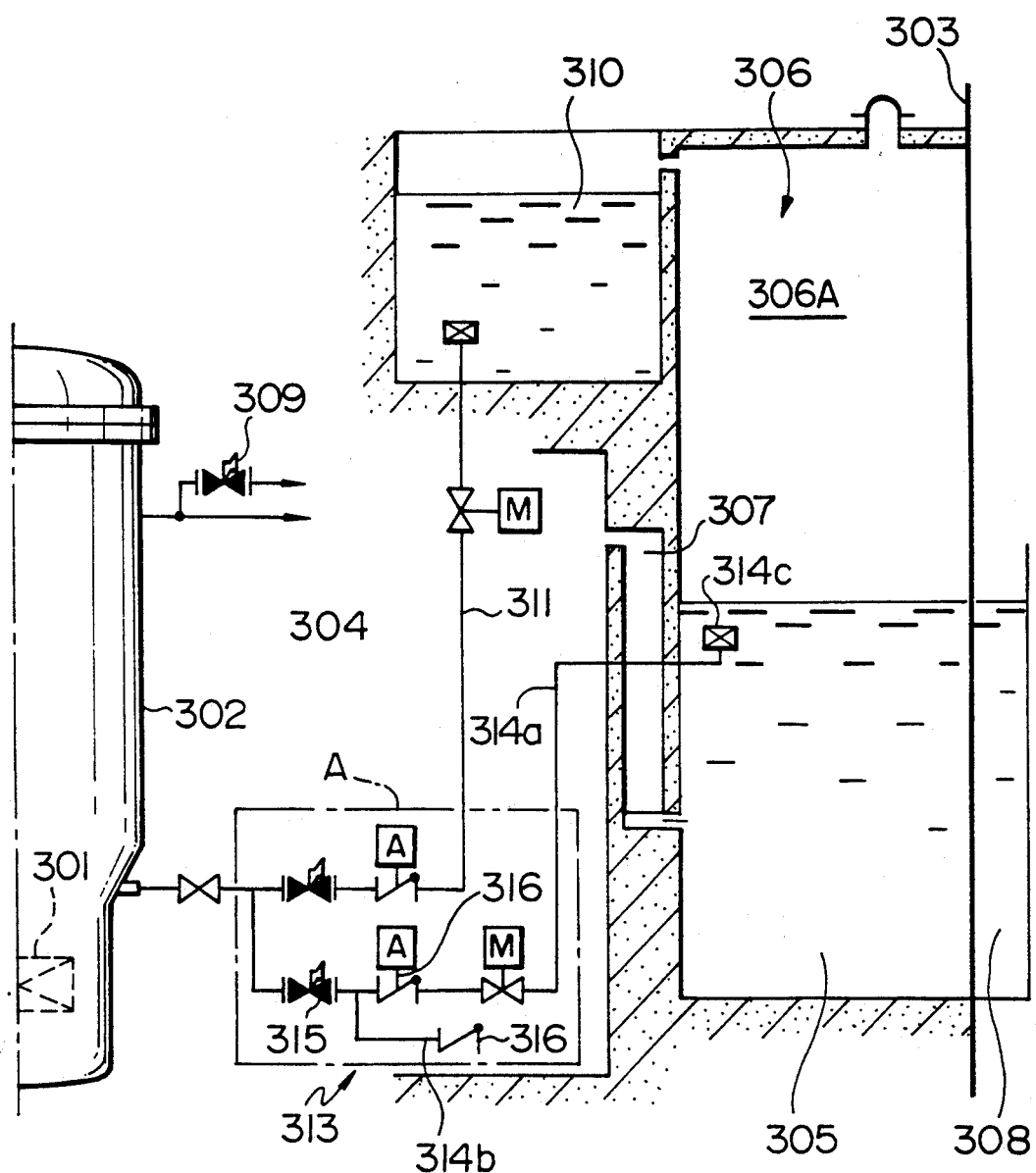
FIG. 23 is a sectional view showing the essential part of a reactor containment facility in accordance with the sixth embodiment, including an emergency core cooling system and an equalizing system.
Figure 24:
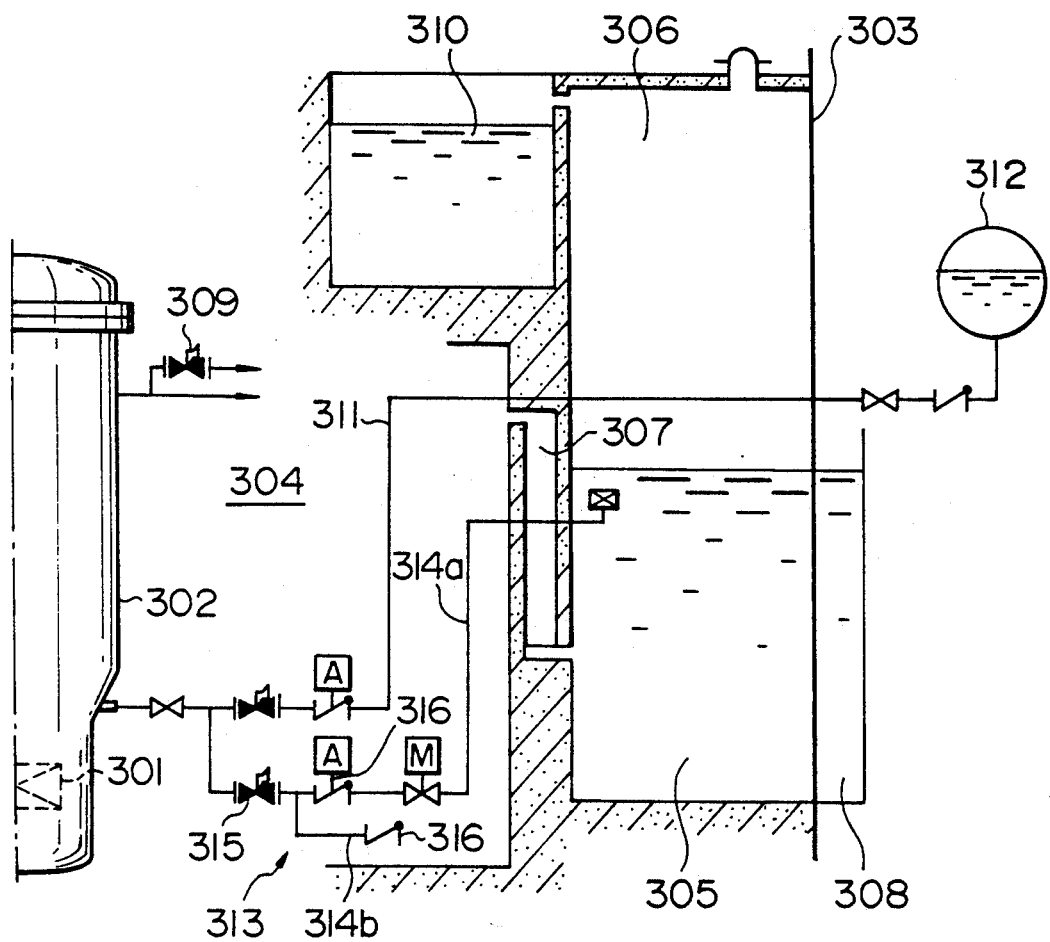
FIG. 24 is a sectional view similar to FIG. 23, showing a reactor containment facility equipped with an accumulator tank as the water source for the emergency core cooling system.

Referring to FIG. 23, the pressure vessel 302 is provided with a reducing valve 309. A gravity pool 310, which serves as the water supply source of an emergency core cooling system (ECCS) 311, is disposed in an upper portion of the space inside the containment vessel 303. In a short period immediately after occurrence of a loss-of-coolant accident, the reducing valve 309 is opened to relief vapor from the pressure vessel 302 so as to quickly reduce the pressure inside the pressure vessel 302, and the water in the gravity pool 310 is supplied by the force of gravity, i.e., by the difference in the water head, into the pressure vessel 302, thereby cooling the reactor core 301. As an alternative, the ECCS 311 may employ, in place of the gravity pool 310, a pressure accumulator tank 312 installed outside the containment vessel 303 as shown in FIG. 24. In case of a emergency, water is driven by the pressure accumulated in the pressure accumulator tank 312 so as to be supplied into the pressure vessel 302 to cool the reactor core 301. Thus, water is supplied into the pressure vessel 302 from the gravity pool 311 or from the pressure accumulator tank 312 for a short period immediately after the occurrence of the accident. The water thus supplied effectively cools the reactor core 301 and is discharged into the dry well 304 through the fracture (not shown) so as to fill the lower portion of the space inside the dry well 304 as denoted by 317 in FIG. 25. As a consequence, lower half part of the pressure vessel 302 is immersed.

The pressure vessel 302 also is equipped with an equalizing system 313 which utilizes, as water sources, the water pooled in the suppression pool 305 and the draw-down water accumulated on the bottom portion of the dry well 304. The equalizing system 313 serves to supply water from the suppressing pool 305 and/or the draw-down water 317 from the dry well 304 into the pressure vessel for a long period after the occurrence of the loss-of-coolant accident. More specifically, the equalizing system 313 includes a first equalizer line 314a having one end connected to the pressure vessel 302 and the other end opening in the suppression pool 305, a second equalizer line 314b shunting from the first equalizing line 314a and opening in a lower portion of the dry well 304, a blasting valve 315 disposed in the first equalizing line 314a at a portion between the pressure vessel 302 and the point where the second equalizer line 314b shunts from the first equalizing line 314a, and a check valve 316 provided in each of the equalizer lines 314a and 314b.

The height of the connection between the first equalizer line 314a and the pressure vessel 302 (referred to as "height of equalizer line connection") is so determined as to provide a sufficient margin for enabling submerging cooling of the reactor core for a long time after occurrence of a loss-of-coolant accident. Practically, the height of the equalizer line connection is determined to be 50 to 150 cm, preferably 100 cm or so, above the top of the reactor core. As will be described later, the force with which the water is driven from the suppression pool 305 is derived from the head difference between the outlets of the vent pipes 307 and the height of equalizer line connection. In order to obtain a sufficient force for driving the water, the outlets of the vent pipes 307 are set at a level which is 50 to 150 cm, preferably 70 cm or more, above the height of equalizer line connection and which is 100 to 200 cm above the top of the reactor core 301. The term "level of outlets of the vent pipes" means the level of the lower end openings of the vent pipes opening into the suppression pool. When vent pipes 307 have outlets at different levels, the highest one of these levels is determined as the level of outlets of the vent pipes.

The force for driving the draw-down water 317 from the dry well 304 is derived from the head difference between the level of the draw-down water 317 and the height of equalizer line connection at which the first equalizer line 314a is connected to the pressure vessel The opening of the second equalizer line 314b opening to the lower portion of the dry well is determined to be substantially the same as the level of the connection to the pressure vessel 302. In addition, the second equalizer line 314b is designed and laid to have minimum length including horizontal portion, and the check valve 316 is provided in the horizontal portion, in order to reduce loss of the water driving power due to stagnation of air in the second equalizer line 314b. In FIG. 23, the portion of the equalizer system inside the one-dot-and-dash line is shown in plan, for the purpose of easier understanding. This applies also to other Figures of the drawings. The quantity of water charged in the gravity pool 310 or the pressure accumulator tank 311 of the ECCS is so determined that the level of the draw-down water in the dry well is maintained above the level of the height of equalizer connection to the pressure vessel, i.e., above the level of the second equalizer line 314b, for a long time after occurrence of the loss-of-coolant accident.

Figure 25:
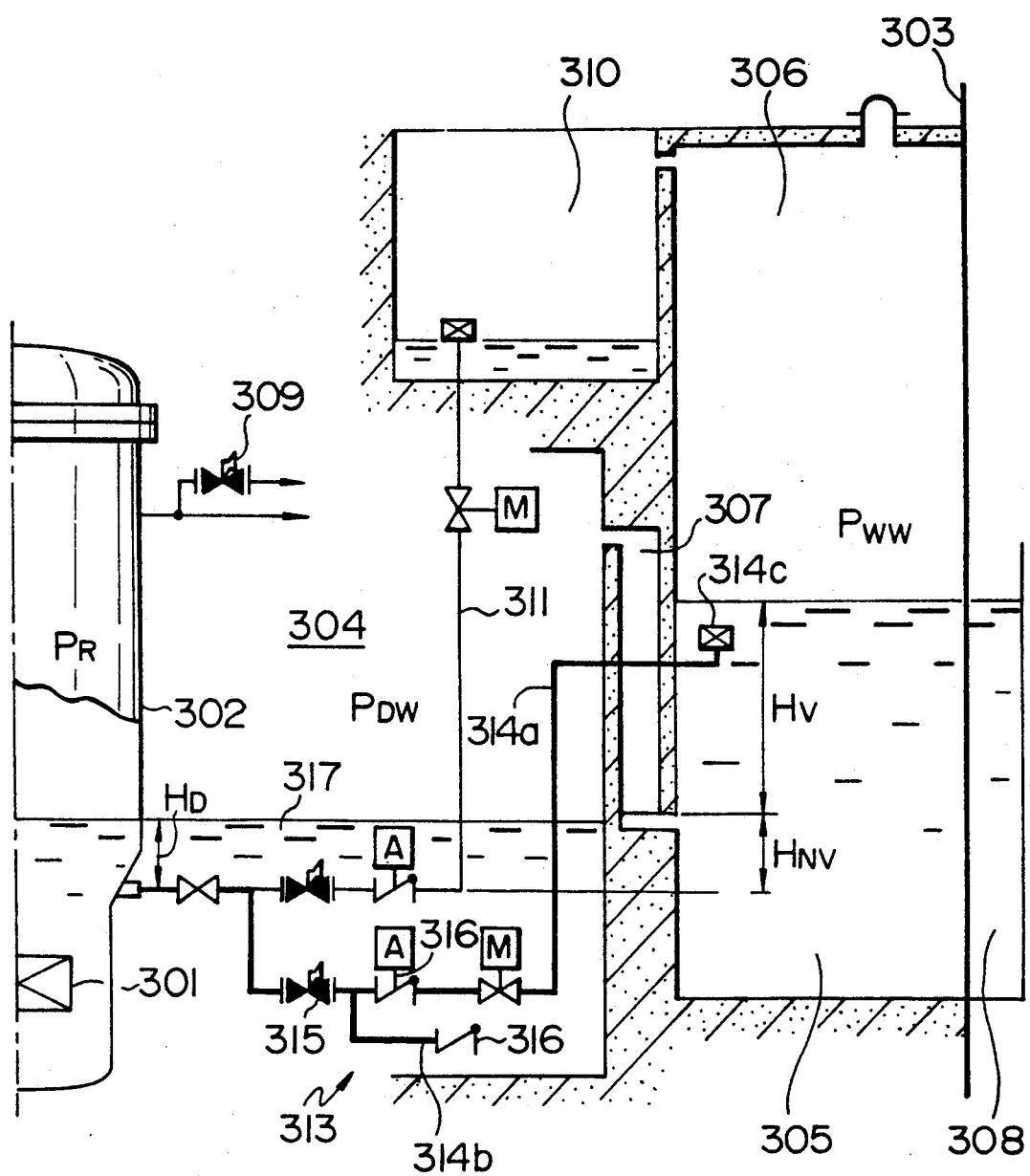
FIG. 25 is diagram showing how the equalizing system of the sixth embodiment operates.

In this embodiment, the wall of the containment vessel 303 functions as a heat-transmission wall through which heat is transferred from the water in the suppression pool 305 to the water in the outer peripheral pool 308. In order to obtain a large area of heat transfer through the containment vessel wall, the water level in the suppression pool 35 is set comparatively high. The operation of the equalizer system 313 should not draw water from the suppression pool 305 at such a large rate as to cause a reduction in the water level inside the suppression pool 305. In order to meet this requirement, the opening 314c of the first equalizer line 314a opening in the suppression pool 305 is set to a level near the initial water level in the suppression pool 305, e.g., 50 cm or so below the initial level, so that the water level in the suppression pool 305 does not come down below this level even when water is drawn through the equalizing system 313. To explain in more detail, in this embodiment of the present invention, the equalizer system 303 starts to operate when the pressure inside the pressure vessel 302, which progressively decreases in a long time after occurrence of the accident, is lowered to a level substantially equal to that in the dry well 304, so that water in the suppression pool 305 and the draw-down water 317 in the bottom portion of the dry well 304 are supplied into the pressure vessel 302, as shown in FIG. 25.

The power with which water is driven from the suppression pool 305 and the power with which draw-down water 317 is driven from the dry well 304 are respectively given by the following formulae:

(1) Power $\Delta P_1$ for driving water from suppression pool 305

$$\Delta P_1 = P_{NE} - P_R \quad (1)$$
$$= \{P_{WW} + (H_V + H_{NV}) \cdot \gamma\} - P_R$$
$$= H_{NV} \cdot \gamma$$

since, $$P_{WW} + H_V \gamma = P_R \quad (2)$$

(2) Power $\Delta P_2$ for driving draw-down water from dry well $$\Delta P_2 = P_{NE} - P_R \quad (3)$$
$$= \{P_{DW} + H_D \cdot \gamma\} - P_R$$
$$= H_D \cdot \gamma$$

where, $P_R$: pressure in pressure vessel
$P_{DW}$: pressure in dry well
$P_{WW}$: pressure in suppression chamber
$H_V$: depth of immersion of vent pipe
$H_{NV}$: height difference between vent pipe outlet and equalizer line connection to pressure vessel
$H_D$: height difference between drawn-down water level and equalizer line connection to pressure vessel
$\gamma$: density of water As will be seen from formula (1) above, the driving power $\Delta P_1$ for driving water from the suppressing pool 305 is derived from the water head difference between the level of the outlet of the vent pipe 307 and the level at which the equalizer line 314a is connected to the pressure vessel 302. It will also be seen from formula (3) that the driving power $\Delta P_2$ for driving the draw-down water 317 in the bottom of the dry well 304 is derived from the difference in the water head between the level of the draw-down water and the level at which the equalizer line 314b is connected to the pressure vessel 302.

A control system for controlling the above-described equalizer system will be described with reference to FIGS. 26 and 27.

Figure 26:
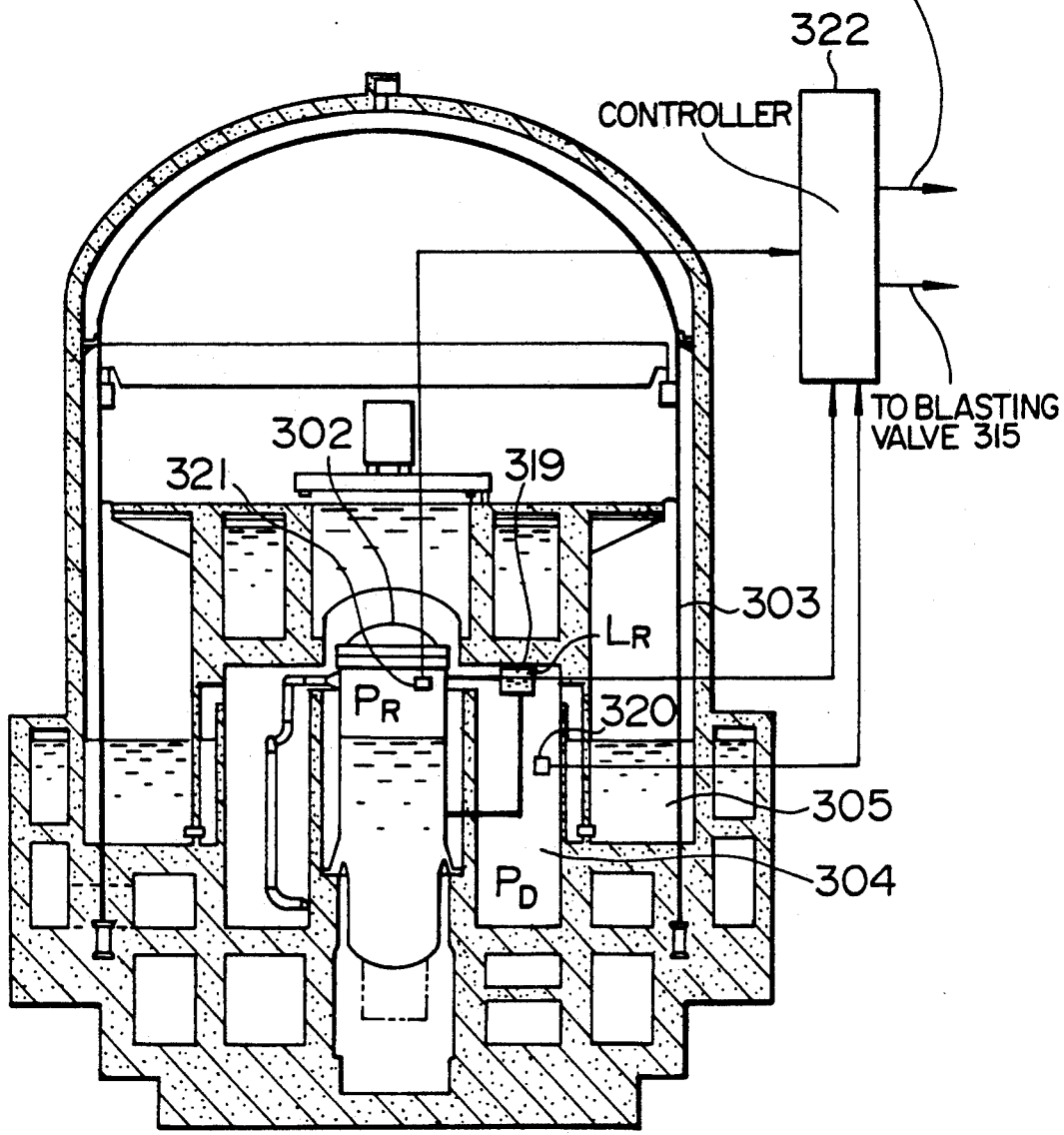
FIG. 26 is a diagram showing a controller for an emergency core cooling system and an equalizing system.
Figure 27:
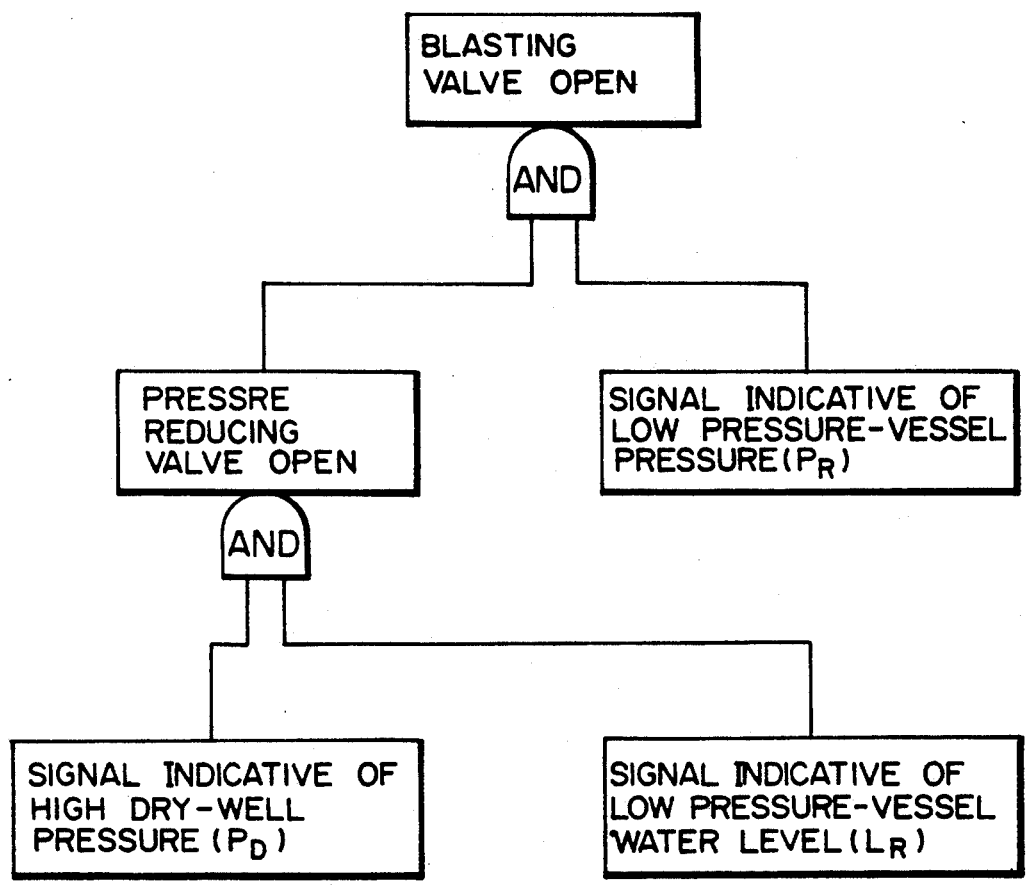
FIG. 27 is a diagram showing an equalizing-system starting logic for the controller shown in FIG. 26.

Referring first to FIG. 26, the control system includes a water level sensor 319 for sensing the water level $L_R$ in the pressure vessel 302, a pressure sensor 320 for sensing the internal pressure $P_D$ in the dry well, and a pressure sensor 321 for sensing the pressure $P_R$ inside the pressure vessel 302. Signals from the water level sensor 319 and pressure sensors 320, 321 are sent to a controller 322 which operates to activate the reducing valve 309 and the equalizer system 303 in accordance with an operation logic as shown in FIG. 27.

When a loss-of-coolant has taken place, the water level $L_R$ in the pressure vessel 302 is lowered while the pressure $P_D$ in the dry well is increased, whereby low-$L_R$ signal and high $P_D$ signal are transmitted from the respective sensors 319 and 320. Upon receipt of these signals, the controller 322 operates to open the reducing valve 309 so that the internal pressure $P_R$ of the pressure vessel 302 is drastically lowered and progressively approaches the level of the pressure inside the dry well 304. The controller 322, upon receipt of a signal indicative of the reduction in the internal pressure of the pressure vessel, operates to open the blast valve 315 in the equalizing system 313.

After the blast valve 315 is opened, the coolant is automatically injected when the conditions of the formulae (1) and (3) are met. When either one of these conditions is not met, the check valve 316 in the equalizer system 313 prevents water from being discharged through the equalizer system 313.

As will be understood from the foregoing description, in the described embodiment, the blasting valve 315 is opened in the course of the reduction in the internal pressure of the pressure vessel after occurrence of the loss-of-coolant accident, so that water in the suppression pool 305, as well as the draw-down water 317 in the dry well 304, is injected into the pressure vessel 302, thereby cooling the reactor core 301 for a long period after occurrence of a loss-of-coolant accident.

Furthermore, in this embodiment which utilizes both the water in the suppression pool 305 and the draw-down water 317 on the bottom of the dry well 304, injection of water into the pressure vessel 302 is performed when the dry well is filled to a level which is slightly higher, e.g., 100 cm or less above, the level at which the equalizer lines 314a and 314b are connected to the pressure vessel 302, without requiring that the lower portion of the dry well 304 is completely filled. It is therefore possible to effectively cool the reactor core 301 by submersion for a long time after occurrence of a loss-of-coolant accident. This makes it possible to reduce the quantity of water initially held in the gravity pool 310 or the pressure accumulator tank 312 of the ECCS. Consequently, the mass which is to be held by upper portion of the nuclear reactor building is reduced to facilitate anti-earthquake designing of the nuclear reactor system.

The wall of the containment vessel 303 provides surfaces through which heat is transmitted and transferred from the water in the suppression pool 305 to the water in the suppression pool 308. In the illustrated embodiment, the opening of the equalizer line 314a opening in the suppression pool 305 is set to a level which is only slightly below the initial water level so that the water level in the suppression pool 305 does not come down substantially below the initial level. As a consequence, high water level is maintained in the suppression pool 305 even during operation of the equalizer system 313 so that a large area is preserved for the heat transfer from the water in the suppression pool 305 and the water in the outer peripheral pool 308, thus attaining an improvement in the heat dissipation characteristic.

In the event that the quantity of water in the suppression pool 305 has come down to such a level that the opening 314c of the first equalizer line 314a is exposed, the inlet of the second equalizer line 314b is flooded with draw-down water which is necessarily charged into the dry well 304 due to the head balance of water in the containment vessel 303, so that cooling of the reactor core 301 is continued without fail. Consequently, a remarkable improvement in the safety is achieved by a combination of the static cooling of the containment vessel offered by the above-mentioned heat dissipation characteristic and the static cooling of the reactor core performed by the equalizer system 313.

Figure 28:
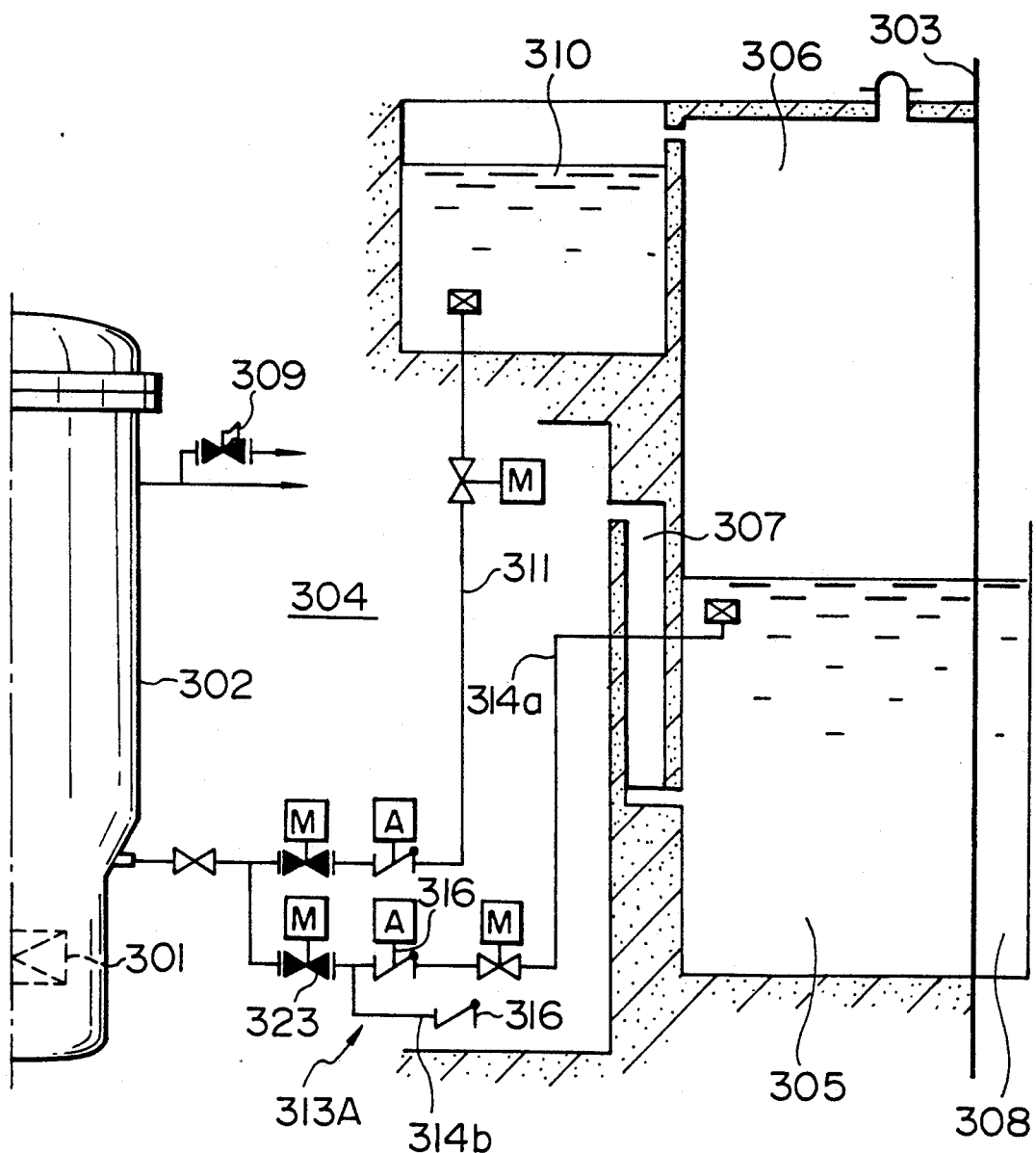
FIG. 28 is a sectional view similar to FIG. 23, showing a reactor containment facility in accordance with a modification of the sixth embodiment.

A modification of the sixth embodiment will be described with reference to FIG. 28. This modification employs, in place of the blasting valve 315 used as an isolation valve in the equalizer line 314a of the fifth embodiment shown in FIG. 23, a normally-closed electrically driven valve 323 disposed in an equalizer system 313A. The electrically driven valve 323 also is driven and controlled in accordance with a logic similar to that shown in FIG. 27.

This modification offers an advantage in that reliability of the isolation valve, which is an electrically driven valve, can easily be confirmed through a periodical check. In addition, operation and administration of the safety system are facilitated by virtue of the use of the electrically driven valve.

Figure 29:
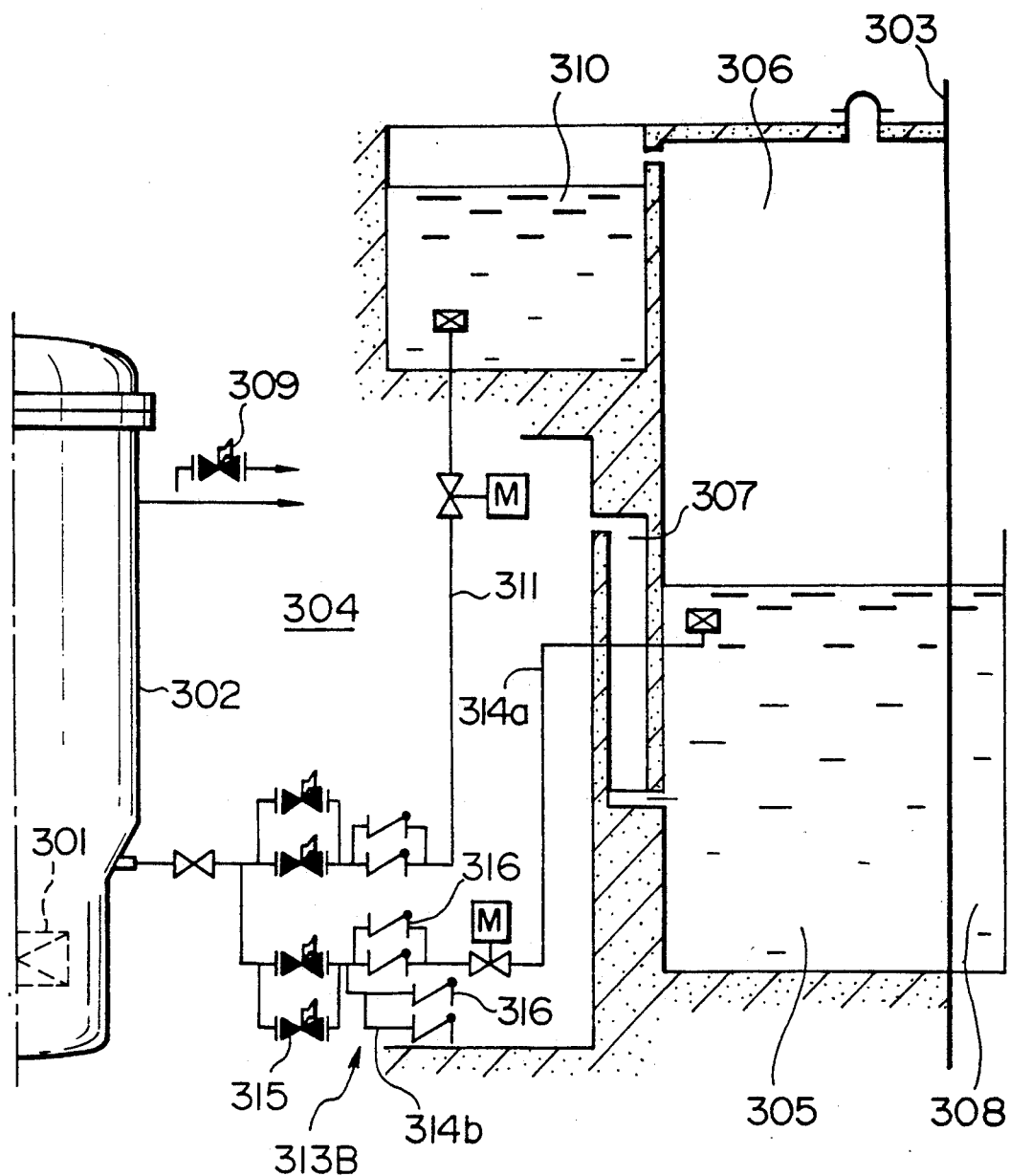
FIG. 29 is a sectional view similar to FIG. 23, showing a reactor containment facility in accordance with another modification of the sixth embodiment.

FIG. 29 shows another modification which is different from the sixth embodiment shown in FIG. 23 in that a parallel connection of a pair of blasting valves 315 and a parallel connection of a pair of check valve 316 are used in each line. In general, it is necessary to assume that a normally-closed valve which is expected to open in the event of a loss-of-coolant accident may fail to open due to an unexpected reason. With the dual valve arrangement employed in this modification, it is possible to supply emergency cooling water to the pressure vessel even when one of the dynamic components, e.g., valve, has failed to operate.

What is claimed is:

1. A reactor containment facility comprising: a reactor pressure vessel containing a core; a dry well in which said reactor pressure vessel is arranged; a containment vessel housing said dry well; means defining a suppression chamber holding a suppression-pool water and forming above the suppression-pool water a first wet well; and passage means allowing said dry well to communicate with said suppression-pool water; wherein said facility further comprises:
   (a) means for defining a second wet well communicating with said first wet well; and
   (b) cooling means for keeping said second wet well at a temperature lower than that of said first wet well at the time of a loss-of-coolant accident.

2. A reactor containment facility as claimed in claim 1, wherein said suppression chamber is divided into a first chamber containing said suppression-pool water and a second chamber, said second wet well being defined by said second chamber.

3. A reactor containment facility as claimed in claim 1, further comprising:
   (c) a steel wall which surrounds at least said suppression-pool water in contact therewith to provide said containment vessel; and
   (d) an outer peripheral pool containing a cooling water in contact with the outer peripheral surface of said steel wall.

4. A reactor containment facility comprising: a reactor pressure vessel containing a core; a dry well in which said rector pressure vessel is arranged; a containment vessel housing said dry well; means defining a suppression chamber holding a suppression-pool water and forming above the suppression-pool water a first wet well; and a passage means allowing said dry well to communicate with said suppression-pool water; wherein said facility further comprises:
   (a) means for defining a second wet well communicating with said first wet well; and
   (b) means for separating a mixture fluid consisting of a noncondensing gas in said suppression chamber and a steam from said suppression-pool water in the noncondensing gas and the steam and for causing the stem after the separation to remain in said first wet well and the noncondensing gas to be collected in said second wet well.

5. A reactor containment facility as claimed in claim 4, further comprising:
   (c) a steel wall which surrounds at least said suppression-pool water in contact therewith to provide said containment vessel; and
   (d) cooling means for cooling the outer peripheral surface of said steel wall.

6. A reactor containment facility comprising: a reactor pressure vessel containing a core; a dry well in which said reactor pressure vessel is arranged; means defining a suppression chamber holding a suppression-pool water and forming, in the space above the suppression-pool water, a wet well; a plurality of vent pipes allowing said dry well to communicate with said suppression-pool water of said suppression chamber in contact therewith to provide a containment vessel which houses said drywell and said suppression chamber; and an outer peripheral pool containing a cooling water in contact with the outer peripheral surface of said steel wall; wherein said facility further comprises:
   (a) dividing means for dividing the wet well of said suppression chamber into a first space which is in contact with the water surface of said suppression-pool water and a second space which is not in contact therewith;
   (b) first passage means which allows said first space to communicate with said second space and which has an area smaller than that of said dividing means; and
   (c) cooling means for keeping said second space at a temperature lower than that of said first space.

7. A reactor containment facility as claimed in claim 6, further comprising:
   (d) second passage means allowing a lower section of said second space to communicate with said suppression-pool water.

8. A reactor containment facility as claimed in claim 6, wherein said steel wall further surrounds said first and second spaces, said cooling means including an air passage formed outside said steel wall.

9. A reactor containment facility as claimed in claim 6, wherein said cooling means includes a recess region formed by extending downwards the outer peripheral section of said second space to be in thermal contact with the cooling water of said outer peripheral pool.

10. A reactor containment facility as claimed in claim 6, further comprising:
    (e) at least one convection promoting pipe which is arranged in said outer peripheral pool and which has at least one upper opening situated below the water surface of said suppression-pool water at a position above outlets of said vent pipes and at least one lower opening situated in the suppression-pool water at a position below the outlets of said vent pipes, with said upper and lower openings communicating with each other to allow said pool water to pass therethrough.

11. A reactor containment facility as claimed in claim 6, further comprising:
    (f) a convection promoting plate which is arranged in said suppression-pool water along said steel wall and which has an upper end positioned higher than outlets of said vent pipes and a lower end positioned lower than the outlets of said vent pipes, with the difference in height between said upper end and the outlets of said vent pipes being larger than the difference in height between the outlets of said vent pipes and said lower end.

12. A reactor containment facility comprising: a reactor pressure vessel containing a core; a drywell in which said reactor pressure vessel is arranged; a containment vessel housing said dry well; means defining a suppression chamber holding a suppression-pool water and forming, in the space above the suppression-pool water, a wet well; and passage means allowing said dry well to communicate with said suppression-pool water; wherein said facility further comprises:
 (a) means arranged on the water surface of the suppression-pool water of said suppression chamber for serving to restrain evaporation of the suppression-pool water.

13. A reactor containment facility as claimed in 12, further comprising:
 (b) a steel wall surrounding at least said suppression-pool water in contact therewith to provide said containment vessel; and
 (c) cooling means for cooling the outer peripheral surface of said steel wall.

14. A reactor containment facility comprising: a reactor pressure vessel containing a core; a dry well in which said reactor pressure vessel is arranged; means defining a suppression chamber holding a suppression-pool water and forming, in the space above the suppression-pool water, a wet well; a plurality of vent pipes allowing said dry well to communicate with said suppression-pool water; a steel wall which surrounds at least the suppression-pool water of said suppression chamber in contact therewith to provide a containment vessel which houses said dry well and said suppression chamber; and an outer peripheral pool containing a cooling water in contact with the outer peripheral surface of said steel wall; wherein said facility further comprises:
 (a) a hydrophobic-material layer which is formed on the water surface of said suppression-pool water and which has a saturation vapor pressure and a density that are lower than those of the suppression-pool water.

15. A reactor containment facility comprising: a reactor pressure vessel containing a core; a dry well in which said reactor pressure vessel is arranged; a containment vessel housing said dry well; means defining a suppression chamber holding a suppression-pool water and forming, in the space above the suppression-pool water a wet well; and passage means allowing said dry well to communicate with said suppression-pool water; wherein said facility further comprises:
 (a) circulation passage means which has an intake opening situated in said suppression-pool water at a position higher that the suppression-pool water side outlet of the passage means and a discharge opening situated in said suppression-pool water at a position lower than the same, with at least a part of said circulation passage means being situated outside said suppression chamber.

16. A reactor containment facility as claimed in claim 15, further comprising:

(b) cooling means provided in that portion of said circulation passage means which is situated outside said suppression chamber.

17. A reactor containment facility comprising: a reactor pressure vessel containing a core; a drywell in which said reactor pressure vessel is arranged; a containment vessel housing said dry well; means defining a suppression chamber holding a suppression-pool water and forming, in the space above the suppression-pool water, a wet well; and passage means allowing said dry well to communicate with said suppression-pool water; wherein said facility further comprises:
 (a) circulation passage means at least a part of which is situated outside said suppression chamber for causing the suppression-pool water to be circulated from a position higher than the suppression-pool water side outlet of the passage means to a position lower than the same.

18. A reactor containment facility as claimed in claim 17, further comprising:
 (b) cooling means provided in that portion of said circulation passage means which is situated outside said suppression chamber.

19. A reactor containment facility comprising: a reactor pressure vessel containing a core; a dry well in which said reactor pressure vessel is arranged; means defining a suppression chamber holding a suppression-pool water and forming, in the space above the suppression-pool water, a wet well; a plurality of vent pipes allowing said dry well to communicate with said suppression-pool water; a steel wall which surrounds at least the suppression-pool water of said suppression chamber in contact therewith to provide a containment vessel which houses said dry well and said suppression chamber; and an outer peripheral pool containing a cooling water in contact with the outer peripheral surface of said steel wall; wherein said facility further comprises:
 (a) at least one convection promoting pipe which is arranged in said outer peripheral pool and which has at least one upper opening situated below the water surface of said suppression-pool water at a position above outlets of said vent pipes and at least one lower opening situated in the suppression-pool water at a position below the outlets of said vent pipes, with said upper and lower openings communicating with each other to allow said suppression-pool water to pass therethrough.

20. A reactor containment facility as claimed in claim 19, wherein the difference in height between said upper opening and the outlets of said vent pipes is larger than the difference in height between the outlets of said vent pipes and said lower opening.

21. A reactor containment facility as claimed in claim 19, wherein said convection promoting pipe includes upper and lower header pipes respectively arranged at upper and lower positions in said outer peripheral pool and a plurality of heat transfer pipes allowing said upper and lower header pipes to communicate with each other.

22. A reactor containment facility comprising: a reactor pressure vessel containing a core; a dry well in which said reactor pressure vessel is arranged; means defining a first suppression chamber holding a suppression-pool water and forming, in the space above the same, a wet well; a plurality of first vent pipes allowing said dry well to communicate with said suppression-pool water; a steel wall which surrounds at least the suppression-pool water of said suppression chamber contact therewith to provide a containment vessel which houses said dry well and said first suppression chamber; an outer peripheral pool containing a cooling water in contact with the outer peripheral surface of said steel wall; and an emergency core cooling system adapted to cool the core by supplying a water into said pressure vessel at the time of a loss-of-coolant accident;

wherein the height of the dry-well-side openings of said first vent pipes is so determined that when the water level in the dry well, in which water overflowing from said reactor pressure vessel accumulates at the time of a loss-of-coolant accident, has attained a core submerging level which allows submergence cooling of said core, the water in the dry well starts to flow into said first suppression chamber through said first vent pipes.

23. A reactor containment facility as claimed in claim 22, wherein the amount of coolant stored in a water source of said emergency core cooling system is set such as to be substantially equal to the sum of the amount of coolant needed for raising the water level in the dry well up to said core submerging level and the amount of coolant required for making the water level of said suppression-pool water equal to said core submerging level.

24. A reactor containment facility as claimed in claim 22, wherein a structure for reducing the amount of coolant when the water level in said dry well has been raised to said core submerging level is provided in that portion of the space in said dry well which is below said core submerging level.

25. A reactor containment facility as claimed in claim 22, further comprising means defining a second suppression chamber situated above said first suppression chamber and including a suppression pool containing pool water, said suppression pool communicating with said dry well through a plurality of second vent pipes, said second suppression chamber being connected with said reactor pressure vessel through a line equipped with a valve for allowing the pool water of the second suppression chamber to be used as a water source for said emergency core cooling system.

26. A reactor containment facility as claimed in claim 25, wherein the amount of coolant of said second suppression chamber is set such as to be substantially equal to the sum of the amount of coolant needed for raising the water level in the dry well up to said core submerging level and the amount of coolant required for making the water level of said suppression-pool water equal to said core submerging level.

27. A reactor containment facility comprising: a reactor pressure vessel containing a core; a dry well in which said reactor pressure vessel is arranged; a first suppression chamber holding a suppression-pool water and forming, in the space above the suppression-pool water, a wet well; a plurality of first vent pipes allowing said dry well to communicate with said pool water; a steel wall which surrounds at least the suppression-pool water of said suppression chamber in contact therewith to provide a containment vessel which houses said dry well and said first suppression chamber; and an outer peripheral pool containing cooling water in contact with the outer peripheral surface of said steel wall; wherein said facility further comprises:

(a) a second suppression chamber situated above said first suppression chamber and including a suppression pool and a wet well, said suppression pool communicating with said dry well through a plurality of second vent pipes; and (b) a line equipped with a valve and connecting said second suppression chamber with said reactor pressure vessel to provide an emergency core cooling system.

28. A reactor containment facility as claimed in claim 27, wherein the height of the dry-well-side openings of said first vent pipes is set at a level substantially equal to a core submerging level which is that water-level in the dry well at which submergence cooling of said core can be effected with the water in the dry well, having overflowed from said reactor pressure vessel and accumulated in the dry well at the time of a loss-of-coolant accident.

29. A reactor containment facility as claimed in claim 28, wherein the amount of coolant of said second suppression chamber is set such as to be substantially equal to the sum of the amount of coolant needed for raising the water level in the dry well up to said core submerging level and the amount of coolant required for making the water level of said suppression-pool water equal to said core submerging level.

30. A reactor containment facility comprising: a reactor pressure vessel containing a core; a dry well in which said reactor pressure vessel is arranged; mean defining a suppression chamber holding a suppression-pool water and forming, in the space above the suppression-pool water, a wet well; a plurality of vent pipes allowing said dry well to communicate with said suppression-pool water; a steel wall which surrounds at least the suppression-pool water of said suppression chamber in contact therewith to provide a containment vessel which houses said dry well and said suppression chamber; an outer peripheral pool containing cooling water in contact with the outer peripheral surface of said steel wall; and an emergency core cooling system adapted to cool the core by supplying water into said pressure vessel at the time of a loss-of-coolant accident; wherein said facility further comprises:

(a) equalizing means which, for a long period of time after a loss-of-coolant accident, cools the core by supplying water into said pressure vessel, utilizing said suppression-pool water and the drawdown water accumulated in said dry well as a water source.

31. A reactor containment facility as claimed in claim 30, wherein the opening in said suppression-pool water of said equalizing means is near the water surface of the pool water.

32. A reactor containment facility as claimed in claim 30, wherein said equalizing means includes: a first equalizing line connecting said suppression-pool water with said pressure vessel; a second equalizing line branching off from said first equalizing line and opening at a position below said dry well; an isolation valve provided between a point at which said first equalizing line is connected with said pressure vessel and a branching point at which said second equalizing line branches off; and check valves respectively provided in said first and second equalizing lines, said check valve in the first equalizing line being positioned between said branching point and the point at which the first equalizing line is connected with said suppression-pool water.

33. A reactor containment facility as claimed in claim 32, wherein the opening in said suppression-pool water of said first equalizing line is near the water surface of the suppression-pool water.

34. A reactor containment facility as claimed in claim 32, further comprising:
- (b) first detection means for detecting a pressure in said pressure vessel;
- (c) second detection means for detecting a water level in said pressure vessel;
- (d) third detection means for detecting a pressure in said dry well;
- (e) a pressure reducing valve connected with said pressure vessel and adapted to allow the steam in said pressure vessel to escape to said dry well; and
- (f) control means which is adapted to open said pressure reducing valve, in response to a low-water-level signal indicative of low water level in said pressure vessel and supplied from said second detection means and to a high-pressure signal indicative of high pressure in said dry well and supplied from said third detection means, so as to allow the steam in said pressure vessel to escape therefrom, and which, afterwards, opens said isolation valve to operate said equalizing means, in response to a low-pressure signal indicative of low pressure in said pressure vessel.

35. A reactor containment facility as claimed in claim 32, wherein said isolation valve comprises a blasting valve or an electrically operated valve.

36. A reactor containment facility as claimed in claim 32, wherein said first and second equalizing lines are respectively equipped with each two of said isolation valves and check valves arranged in parallel.

* * * * *